United States Patent
Saida

(10) Patent No.: US 7,489,414 B2
(45) Date of Patent: Feb. 10, 2009

(54) IMAGE FORMING SYSTEM AND IMAGE FORMING APPARATUS

(75) Inventor: Yukihiro Saida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 803 days.

(21) Appl. No.: 10/645,400

(22) Filed: Aug. 21, 2003

(65) Prior Publication Data

US 2004/0036911 A1  Feb. 26, 2004

(30) Foreign Application Priority Data

Aug. 22, 2002 (JP) .............................. 2002-241864

(51) Int. Cl.
 *G06F 3/12* (2006.01)
 *G06F 13/00* (2006.01)
 *G06F 15/00* (2006.01)
 *G06F 15/16* (2006.01)

(52) U.S. Cl. ................. 358/1.15; 358/1.1; 358/1.16; 709/247; 709/249; 709/250

(58) Field of Classification Search ............... 358/1.15; 455/67.11; 707/520
See application file for complete search history.

(56) References Cited

U.S. PATENT DOCUMENTS

| | | | |
|---|---|---|---|
| 5,239,621 A * | 8/1993 | Brown et al. ............... | 358/1.16 |
| 6,084,688 A * | 7/2000 | Stumbo et al. ............. | 358/1.17 |
| 6,791,703 B1 * | 9/2004 | Maeda et al. ............... | 358/1.15 |
| 6,914,687 B1 * | 7/2005 | Hosoda et al. .............. | 358/1.1 |
| 6,940,615 B1 * | 9/2005 | Shima ....................... | 358/1.15 |
| 7,173,723 B1 * | 2/2007 | Ando ........................ | 358/1.15 |
| 2002/0015171 A1 * | 2/2002 | Tsunekawa ................. | 358/1.13 |
| 2003/0227641 A1 * | 12/2003 | Edmonds et al. ........... | 358/1.13 |
| 2004/0105116 A1 * | 6/2004 | Kim .......................... | 358/1.14 |

FOREIGN PATENT DOCUMENTS

JP  2001018492 A  *  1/2001

* cited by examiner

Primary Examiner—David K Moore
Assistant Examiner—Hilina S Kassa
(74) Attorney, Agent, or Firm—Panitch Schwarze Belisario & Nadel LLP

(57) ABSTRACT

Real-time printer status information according to the USB standard can be obtained during a print data process. The printing can be forcedly stopped during reception of the print data. Normal data and packet data can be easily handled and PDL data can be also easily handled. An image forming system has: a host having a communication function unit; and an image forming apparatus having first and second communication units and a relay unit, wherein the first communication unit communicates data with the communication function unit via the relay unit and the second communication unit communicates the data with the communication function unit via the relay unit.

22 Claims, 48 Drawing Sheets

Fig.6

| | | | |
|---|---|---|---|
| PORT INFORMATION 15 FOR USB DEVICE 81 | END POINT INFORMATION 28 | PORT NO. | 10: PORT NO. WHICH IS RELEASED TO UPPER APPARATUS |
| | | END POINT ADDRESS | END POINT INFORMATION OF PIPE #0 OF USB DEVICE 81 |
| | | TRANSFER METHOD | 0: CONTROL TRANSFER |
| | | MaxPacKetSize | MAX. SIZE OF PACKET WHICH CAN BE TRANSMITTED TO PIPE #0 OF USB DEVICE 81 |
| | | END POINT ADDRESS | END POINT INFORMATION OF PIPE #2 OF USB DEVICE 81 |
| | | TRANSFER METHOD | 1: BULK-OUT TRANSFER |
| | | MaxPacKetSize | MAX. SIZE OF PACKET WHICH CAN BE TRANSMITTED TO PIPE #1 OF USB DEVICE 81 |
| | | END POINT ADDRESS | END POINT INFORMATION OF PIPE #2 OF USB DEVICE 81 |
| | | TRANSFER METHOD | 2: BULK-IN TRANSFER |
| | | MaxPacKetSize | MAX. SIZE OF PACKET WHICH CAN BE TRANSMITTED TO PIPE #2 OF USB DEVICE 81 |
| PORT INFORMATION 15 FOR USB DEVICE 82 | | PORT NO. | 11: PORT NO. WHICH IS RELEASED TO UPPER APPARATUS |
| | | END POINT ADDRESS | END POINT INFORMATION OF PIPE #0 OF USB DEVICE 82 |
| | | TRANSFER METHOD | 0: CONTROL TRANSFER |
| | | MaxPacKetSize | MAX. SIZE OF PACKET WHICH CAN BE TRANSMITTED TO PIPE #0 OF USB DEVICE 82 |
| | | END POINT ADDRESS | END POINT INFORMATION OF PIPE #1 OF USB DEVICE 82 |
| | | TRANSFER METHOD | 1: BULK-OUT TRANSFER |
| | | MaxPacKetSize | MAX. SIZE OF PACKET WHICH CAN BE TRANSMITTED TO PIPE #1 OF USB DEVICE 82 |
| | | END POINT ADDRESS | END POINT INFORMATION OF PIPE #2 OF USB DEVICE 82 |
| | | TRANSFER METHOD | 2: BULK-IN TRANSFER |
| | | MaxPacKetSize | MAX. SIZE OF PACKET WHICH CAN BE TRANSMITTED TO PIPE #1 OF USB DEVICE 82 |

Fig.32

| | | | |
|---|---|---|---|
| PORT INFORMATION 121 FOR USB DEVICE 135 | PORT INFORMATION | | PORT NO. — 10: PORT NO. WHICH IS RELEASED TO UPPER APPARATUS |
| | | END POINT INFORMATION 133 | END POINT ADDRESS — END POINT INFORMATION OF PIPE #0 OF USB DEVICE 135 |
| | | | TRANSFER METHOD — 0: CONTROL TRANSFER |
| | | | MaxPacKetSize — MAX. SIZE OF PACKET WHICH CAN BE TRANSMITTED TO PIPE #0 OF USB DEVICE 135 |
| | | | END POINT ADDRESS — END POINT INFORMATION OF PIPE #2 OF USB DEVICE 135 |
| | | | TRANSFER METHOD — 1: BULK-OUT TRANSFER |
| | | | MaxPacKetSize — MAX. SIZE OF PACKET WHICH CAN BE TRANSMITTED TO PIPE #1 OF USB DEVICE 135 |
| | | | END POINT ADDRESS — END POINT INFORMATION OF PIPE #2 OF USB DEVICE 135 |
| | | | TRANSFER METHOD — 2: BULK-IN TRANSFER |
| | | | MaxPacKetSize — MAX. SIZE OF PACKET WHICH CAN BE TRANSMITTED TO PIPE #2 OF USB DEVICE 135 |
| | | | PORT NO. — 11: PORT NO. WHICH IS RELEASED TO UPPER APPARATUS |
| | | | END POINT ADDRESS — END POINT INFORMATION OF PIPE #2 OF USB DEVICE 82 |
| | | | TRANSFER METHOD — 0: CONTROL TRANSFER |
| | | | MaxPacKetSize — MAX. SIZE OF PACKET WHICH CAN BE TRANSMITTED TO PIPE #0 OF USB DEVICE 135 |
| | | | END POINT ADDRESS — END POINT INFORMATION OF PIPE #1 OF USB DEVICE 135 |
| | | | TRANSFER METHOD — 1: BULK-OUT TRANSFER |
| | | | MaxPacKetSize — MAX. SIZE OF PACKET WHICH CAN BE TRANSMITTED TO PIPE #1 OF USB DEVICE 135 |
| | | | END POINT ADDRESS — END POINT INFORMATION OF PIPE #2 OF USB DEVICE 135 |
| | | | TRANSFER METHOD — 2: BULK-IN TRANSFER |
| | | | MaxPacKetSize — MAX. SIZE OF PACKET WHICH CAN BE TRANSMITTED TO PIPE #2 OF USB DEVICE 135 |

Fig.35

PORT INFORMATION 121 FOR USB DEVICE 135

END POINT INFORMATION 133

| Field | Description |
|---|---|
| PIPE INFORMATION | INFORMATION OF PIPE #0 OF USB DEVICE 135 |
| MaxPacKetSize | MAX. SIZE OF PACKET WHICH CAN BE TRANSMITTED/RECEIVED BY PIPE #0 OF USB DEVICE 135 |
| Call Back Function | RECEIVING FUNCTION FOR SETUP PROCESS WHICH IS CALLED WHEN THERE IS DATA COMMUNICATION WITH PIPE #0 OF USB DEVICE 135 |
| PIPE INFORMATION | INFORMATION OF PIPE #1 OF USB DEVICE 135 |
| MaxPacKetSize | MAX. SIZE OF PACKET WHICH CAN BE RECEIVED BY PIPE #1 OF USB DEVICE 135 |
| Call Back Function | RECEIVING FUNCTION FOR PCL DATA PROCESS WHICH IS CALLED WHEN THERE IS DATA COMMUNICATION WITH PIPE #1 OF USB DEVICE 135 |
| PIPE INFORMATION | INFORMATION OF PIPE #2 OF USB DEVICE 135 |
| MaxPacKetSize | MAX. SIZE OF PACKET WHICH CAN BE TRANSMITTED BY PIPE #2 OF USB DEVICE 135 |
| Call Back Function | TRANSMITTING FUNCTION FOR PCL DATA PROCESS WHICH IS CALLED WHEN THERE IS DATA COMMUNICATION WITH PIPE #2 OF USB DEVICE 135 |
| PIPE INFORMATION | INFORMATION OF PIPE #3 OF USB DEVICE 135 |
| MaxPacKetSize | MAX. SIZE OF PACKET WHICH CAN BE RECEIVED BY PIPE #3 OF USB DEVICE 135 |
| Call Back Function | RECEIVING FUNCTION FOR PS DATA PROCESS WHICH IS CALLED WHEN THERE IS DATA COMMUNICATION WITH PIPE #3 OF USB DEVICE 135 |
| PIPE INFORMATION | INFORMATION OF PIPE #4 OF USB DEVICE 135 |
| MaxPacKetSize | MAX. SIZE OF PACKET WHICH CAN BE TRANSMITTED BY PIPE #4 OF USB DEVICE 135 |
| Call Back Function | TRANSMITTING FUNCTION FOR PS DATA PROCESS WHICH IS CALLED WHEN THERE IS DATA COMMUNICATION WITH PIPE #4 OF USB DEVICE 135 | ial
IMAGE FORMING SYSTEM AND IMAGE FORMING APPARATUS

BACKGROUND OF THE INVENTION

1. Field of the Invention

The invention relates to an image forming system and an image forming apparatus.

2. Related Background Art

Hitherto, in a printer system as an image forming system, an image is formed onto a print medium such as paper or the like by an image forming apparatus such as a printer or the like on the basis of image data such as print data or the like formed by a host apparatus such as personal computer, server, or the like.

FIG. 2 is a schematic diagram of a conventional printer system.

As shown in the diagram, a host 210 as a host apparatus and a printer 221 as an image forming apparatus are connected by a USB (Universal Serial Bus) cable 238.

The host 210 has: an application 211; a printer driver 212 for converting data outputted from the application 211 into a printer language; a setup process 213 for obtaining construction information from the printer 221 upon occurrence of a bus reset and deciding an interface with the printer 221; a transfer control unit 214 for registering a device and specifying a reception destination and a transmission destination on the basis of USB descriptor information obtained by the setup process 213 and transmitting and receiving the data; port information 215 for storing reception destination information and transmission destination information of each port and information such as transfer means or the like; a transmission buffer 216 for temporarily storing transmission data; a reception buffer 217 for temporarily storing the data received from the printer 221; a DMA (Direct Memory Access) controller 219 for transferring the data between the transmission buffer 216 and a USB chip 220, which will be explained hereinlater, and between the reception buffer 217 and the USB chip 220; and the USB chip 220 for outputting the data transmitted by the DMA controller 219 to the printer 221 and receiving the data from the printer 221.

The printer 221 has: a USB chip 222 for storing the data received from the host 210 into a transmission/reception buffer 224 and a reception buffer 225, which will be explained hereinlater, and outputting transmission data sent by a DMA controller 223, which will be explained hereinlater, to the host 210; the DMA controller 223 for transferring data between the USB chip 222 and the transmission/reception buffer 224 and between the reception buffer 225 and a transmission buffer 226, which will be explained hereinlater; the transmission/reception buffer 224 for temporarily storing transmission/reception data of a setup process 229, which will be explained hereinlater; the reception buffer 225 for temporarily storing the print data which is outputted from the host 210; the transmission buffer 226 for temporarily storing reverse information received from a PDL (Page Description Language) discrimination processing unit 230, which will be explained hereinlater; a transfer control unit 227 for specifying a reception destination and a transmission destination and distributing the data; end point information 228 for storing reception destination information, transmission destination information, and the like of each end point; the setup process 229 for transmitting and receiving control information to/from the host 210 upon occurrence of the bus reset; the PDL discrimination processing unit 230 for sensing the received data, discriminating the PDL language, and distributing the data to proper PDL processes; USB descriptor information 231 which is returned by the printer 221 at the time of the bus reset or at the time of inquiring about setup information from the host 210; PnP (Plug and Play) information 232 which is returned by the printer 221 when there is an inquiry about Plug and Play from the host 210; an edit processing unit 233 for converting the printer language into a display list and notifying a development processing unit 236, which will be explained hereinlater, of the display list; the development processing unit 236 for converting the data to which the display list has been transferred into image data and sending the image data to an engine 237, which will be explained hereinlater; and the engine 237 for printing the image data.

The edit processing unit 233 of the printer 221 comprises a PCL language process 234, a PS language process 235, and the like.

Subsequently, constructions of the USB chip 220 of the host 210 and the USB chip 222 of the printer 221 will be described.

FIG. 3 is a diagram showing a structure of a conventional USB chip.

As shown in FIG. 3, a USB device 240 in the USB chip 220 on the host 210 has an FIFO (First-In First-Out) 240a for transmission as a queue for data storage and an FIFO 240b for reception.

The FIFO 240a for transmission is used for transmitting control data which is handled in control transfer or transmitting application data which is handled in bulk-out transfer. The FIFO 240b for reception is used for receiving response data to a control transfer inquiry from the host 210 or receiving printer status information or the like which is transmitted from the printer 221 by bulk-in transfer.

Further, a USB device 250 of the USB chip 222 on the printer 221 supports functions of the USB device 250 and has an FIFO 250a for control transfer, an FIFO 250b for bulk-out transfer, and an FIFO 250c for bulk-in transfer, respectively.

The FIFO 250a for control transfer is used for receiving commands or various information from the host 210 or transmitting responses to the commands or various information from the host 210. The FIFO 250b for bulk-out transfer is used for receiving the print data from the host 210. The FIFO 250c for bulk-in transfer is used for transmitting a response to transmission permission from the host 210.

Communication data which is transmitted and received on the USB has a packet structure including end point information comprising a pipe number consisting of 4 bits and address information consisting of 7 bits for identifying a specific device. Each packet data is distributed to the relevant FIFO on the basis of the end point information.

Subsequently, the USB data transfer operation in the printer system with the above construction will be described.

FIG. 4 is a flowchart showing the USB data transfer operation in the conventional printer system.

First, when the bus reset is detected, the setup process 213 of the host 210 inquires of the USB device 250 of the printer 221 about USB descriptor information by using the control transfer (step S1). Thus, the printer 221 returns the USB descriptor information 231 to the host 210 in response to the inquiry about the USB descriptor information from the host 210 (step S2). The setup process 213 of the host 210 recognizes device information of a connected device and a supporting state of transfer means by the obtained USB descriptor information 231, decides an interface to be used, and notifies the printer 221 of interface ID information which is used (step S3).

Subsequently, the setup process 229 of the printer 221 sets the USB chip 222 by the notified interface ID information (step S4). After that, the transfer control unit 227 obtains the PnP information 232 of the printer 221 from the printer 221 by using the control transfer and registers port information. If the driver which coincides with the registered port information does not exist, the user is notified that a new device has been detected (step S5). The application 211 to which the printing has been instructed by the user instructs the printer driver 212 to print (step S6).

Subsequently, the printer driver 212 to which the printing has been instructed forms print data and requests the transfer control unit 214 to transmit (step S7). The transfer control unit 214 of which the transmission has been requested notifies the printer 221 of the print data by using the bulk-out transfer (step S8). If the application 211 wants to obtain the status of the printer 221, it instructs the printer driver 212 to request for obtainment of the status (step S9).

Subsequently, the printer driver 212 of which the obtainment of the status has been requested forms a status inquiry command and requests the transfer control unit 214 to transmit (step S10). The transfer control unit 214 of which the transmission has been requested notifies the printer 221 of the status inquiry command by using the bulk-out transfer (step S11). The printer 221 which received the status inquiry command forms status information (step S12).

Subsequently, the printer driver 212 requests the transfer control unit 214 to read the printer reverse information (step S13). The transfer control unit 214 of which the reading has been requested allows the printer 221 to start the bulk-in transfer and permits the printer 221 to transmit reverse data (step S14). Thus, the printer 221 transfers the reverse data to the host 210 by the bulk-in transfer in response to the permission of the transfer of the reverse data (step S15). The transfer control unit 214 receives the reverse data, transfers it to the printer driver 212, and displays the status information (step S16).

To make it possible to forcedly stop the print even during the printing and to obtain a real-time status during the printing in the printer system, a technique for dividing the print data and control data into different channels by introducing a protocol of the IEEE1284.4 standard which can realize virtual channels has been proposed (refer to JP-A-2001-18492 and JP-A-2001-22542).

To distinguish ordinary normal data from packet data to which a packet of the IEEE1284.4 standard has been added, a technique for discriminating them by a setting of a menu, discriminating them by a communication mode such as compatibility mode, ECP mode, or the like, or discriminating them by a change in signal line during data communication has also been proposed (refer to JP-A-11-168524).

Since the IEEE1284.4 standard is used for obtaining the real-time status in the above conventional printer system, however, header information of 6 bytes is added on a packet unit basis of the IEEE1284.4 standard. Therefore, an amount of data which is transmitted and received between the devices is large and throughput of the printer system deteriorates.

Since the mechanism for distinguishing the normal data from the packet data corresponds only to the IEEE1284.4 standard, it cannot cope with the USB standard.

Further, since the print data transmitted from the host 210 is discriminated by the PDL discrimination processing unit 230 and distributed to the relevant PDL process, when the number of PDLs which are installed increases, the operation of the PDL discrimination processing unit 230 becomes complicated and each time a new PDL is added, the number of installing steps increases and it takes time to evaluate.

SUMMARY OF THE INVENTION

It is an object of the invention to solve the conventional problems and provide an image forming system and an image forming apparatus in which they conform with the USB standard, read-time printer status information can be obtained during a print data process, the print can be forcedly stopped during print data reception, normal data and packet data can be easily handled, and a PDL language can be also easily handled.

According to a preferred aspect of the invention, therefore, there is provided an image forming system comprising: a host having a communication function unit; and an image forming apparatus having a first communication unit, a second communication unit, and a relay unit, wherein the first communication unit communicates data with the communication function unit via the relay unit and the second communication unit communicates the data with the communication function unit via the relay unit.

The above and other objects and features of the present invention will become apparent from the following detailed description and the appended claims with reference to the accompanying drawings.

BRIEF DESCRIPTION OF THE DRAWINGS

FIG. 6 is a diagram showing a construction of port information in the first embodiment of the invention;

FIG. 32 is a diagram showing a construction of port information in the fourth embodiment of the invention;

FIG. 35 is a diagram showing a construction of end point information in the fourth embodiment of the invention;

DETAILED DESCRIPTION OF THE PREFERRED EMBODIMENTS

Embodiments of the invention will be described in detail hereinbelow with reference to the drawings.

Figure 1:
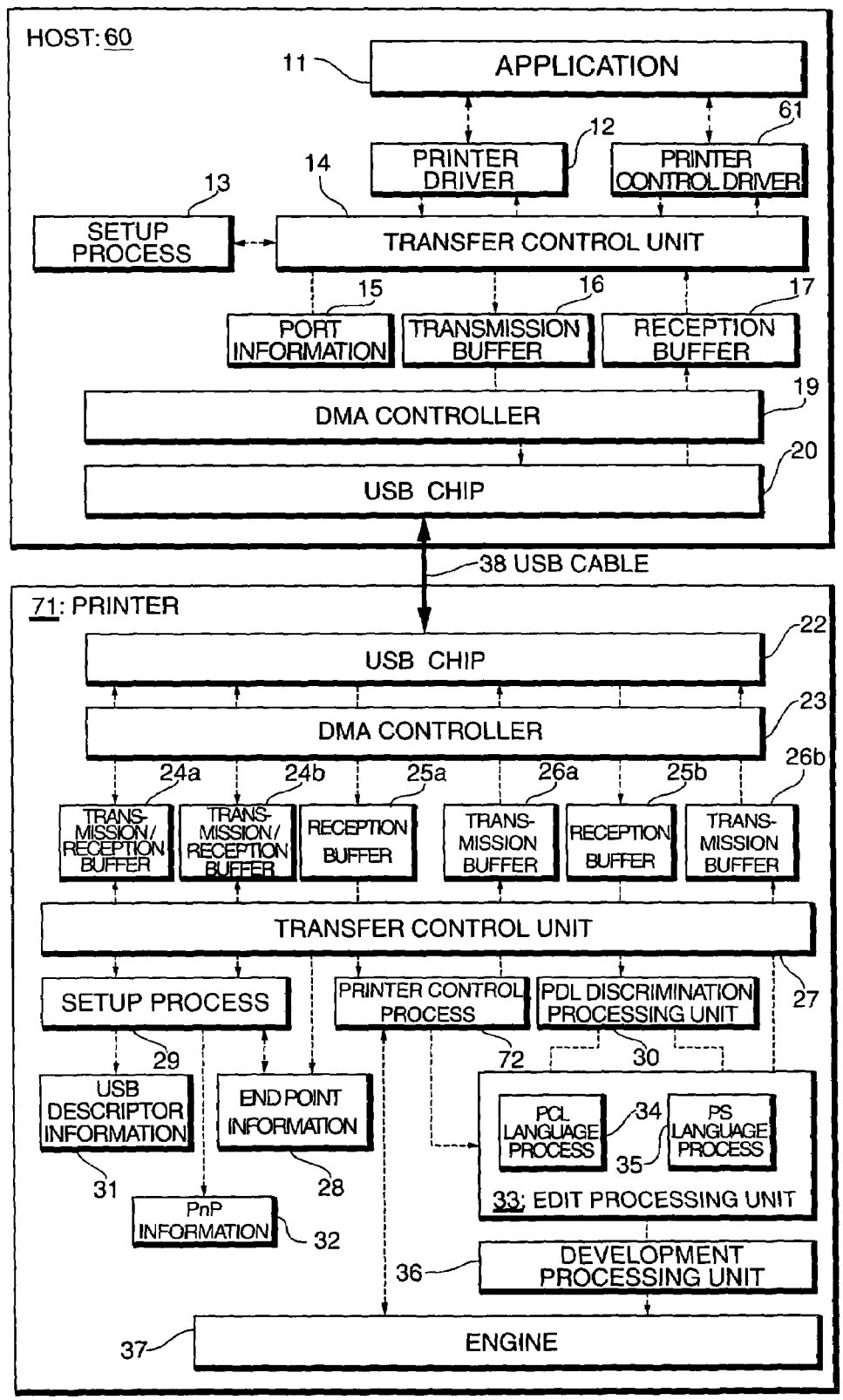
FIG. 1 is a schematic diagram of a printer system in the first embodiment of the invention.
Figure 2:
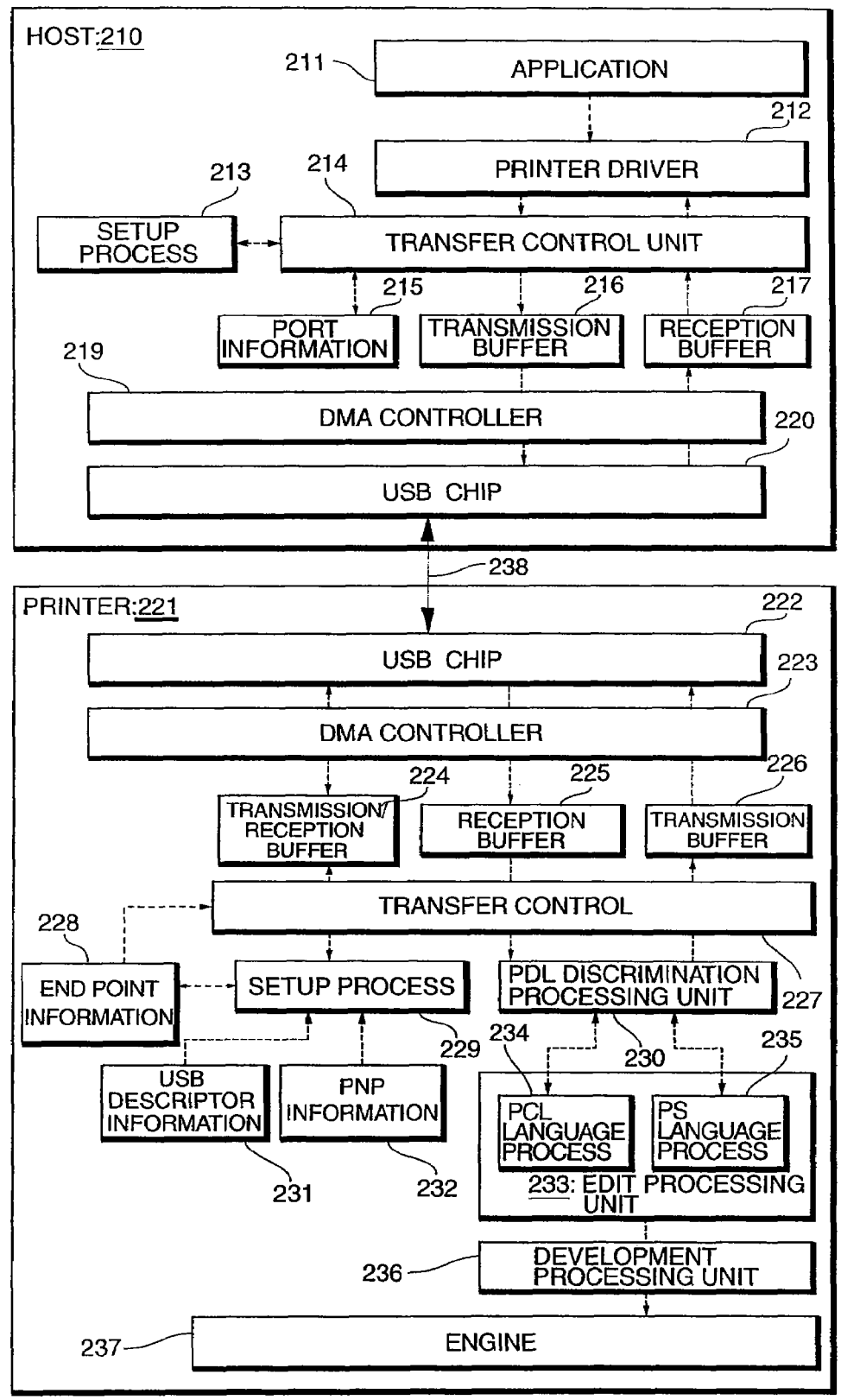
FIG. 2 is a schematic diagram of a conventional printer system.
Figure 3:
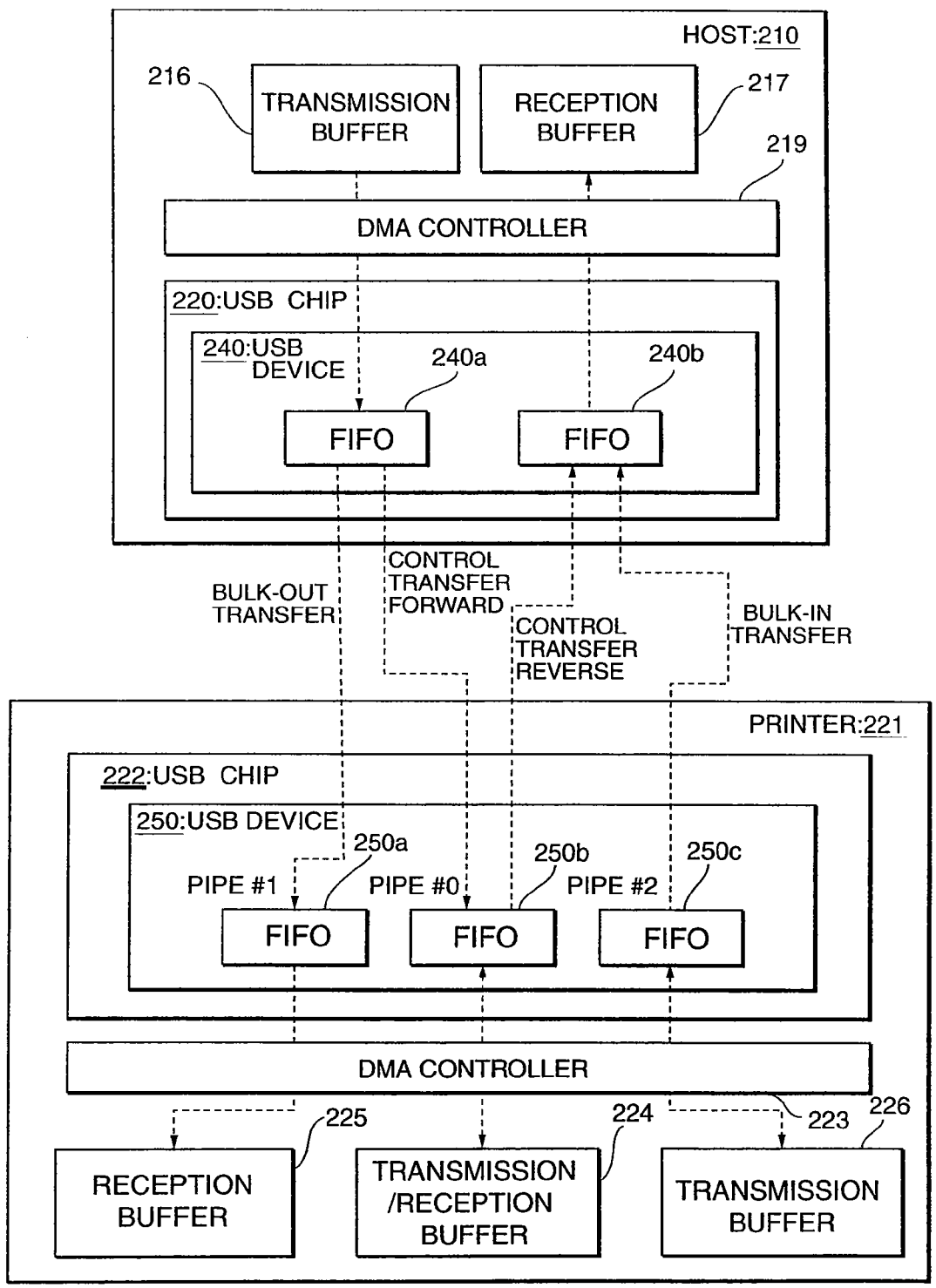
FIG. 3 is a diagram showing a structure of a conventional USB chip.
Figure 4:
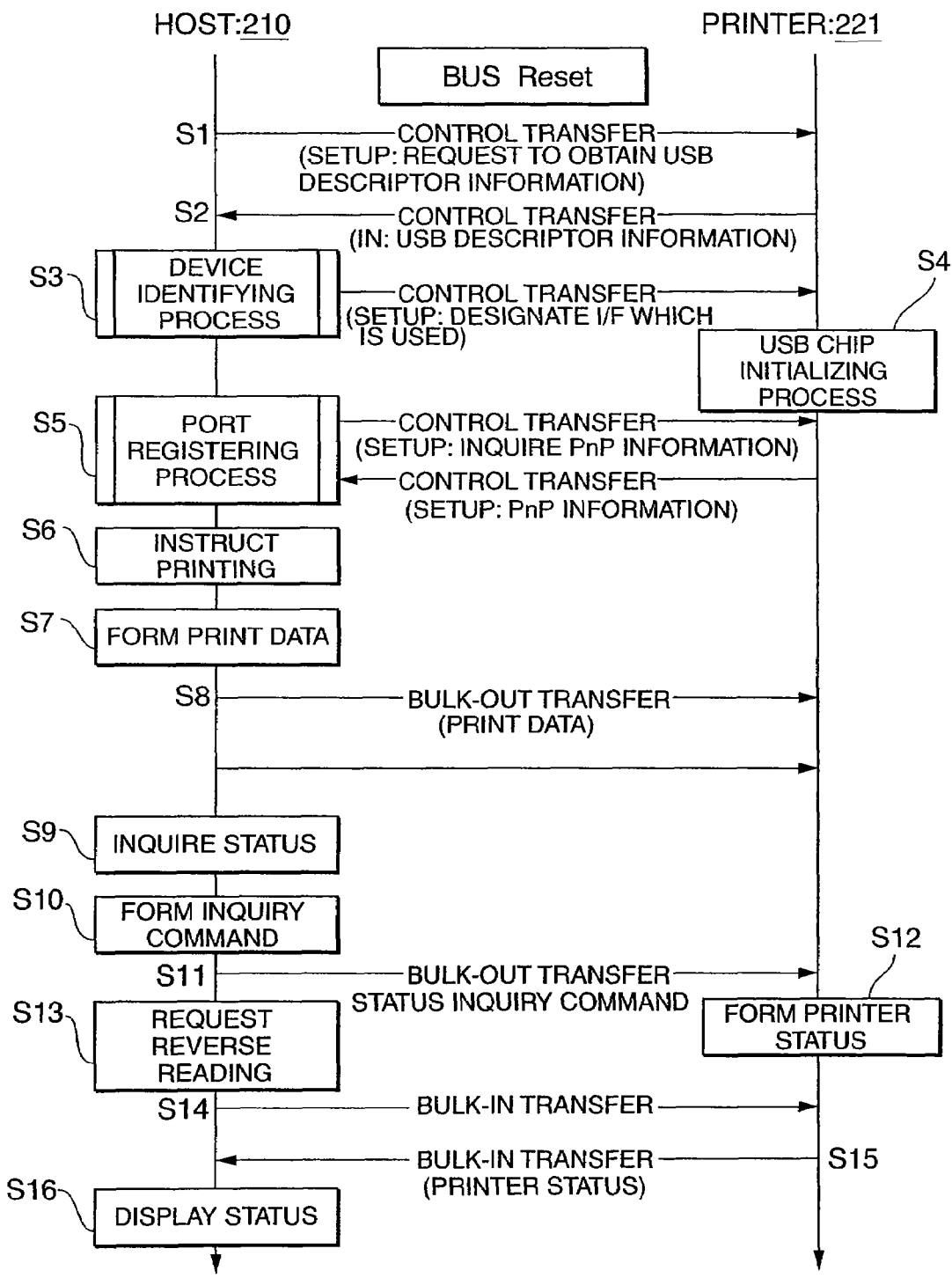
FIG. 4 is a flowchart showing the operation of USB data transfer in the conventional printer system.

FIG. 1 is a schematic diagram of a printer system in the first embodiment of the invention.

In the diagram, reference numeral 60 denotes a host serving as a host apparatus such as personal computer, server, or the like. The host 60 is connected to a printer 71 serving as an image forming apparatus as a peripheral device via a USB cable 38.

In the embodiment, the printer system serving as an image forming system transmits print data formed in the host 60 to the printer 71 and forms an image onto a print medium such as paper or the like on the basis of the print data, that is, prints it. Data is transmitted and received between the host 60 and the printer 71 in accordance with the USB standard.

The host 60 has: an application 11; a printer driver 12 for converting data outputted from the application 11 into a printer language; a printer control driver 61 for controlling obtainment of a status of the printer 71, forced stop of printing, or the like in accordance with an instruction from the application 11; a setup process 13 for deciding communicating means with the printer 71 upon occurrence of a bus reset; a transfer control unit 14 for registering a device and specifying a reception destination and a transmission destination on the basis of USB descriptor information obtained by the setup process 13 and transmitting and receiving the data; port information 15 for storing reception destination information and transmission destination information of each port and information such as transfer means or the like; a transmission buffer 16 for temporarily storing transmission data; a reception buffer 17 for temporarily storing the data received from the printer 71; a DMA controller 19 for transferring the data between the transmission buffer 16 and a USB chip 20, which will be explained hereinlater, and between the reception buffer 17 and the USB chip 20; and the USB chip 20 for outputting the data transmitted by the DMA controller 19 to the printer 71 and receiving the data from the printer 71.

The printer 71 has: a USB chip 22 for storing the data received from the host 60 into a transmission/reception buffer 24a, a transmission/reception buffer 24b, a reception buffer 25a, and a reception buffer 25b, which will be explained hereinlater, and outputting transmission data sent by a DMA controller 23, which will be explained hereinlater, to the host

60; the DMA controller 23 for transferring data between the USB chip 22 and each of the transmission/reception buffer 24a, transmission/reception buffer 24b, reception buffer 25a, reception buffer 25b, and transmission buffers 26a and 26b, which will be explained hereinlater; the transmission/reception buffers 24a and 24b for temporarily storing transmission/reception data of a setup process 29, which will be explained hereinlater; the reception buffer 25a for receiving a printer control command which is outputted from the host 60; the transmission buffers 26a for storing data which is transmitted from a printer control process 72, which will be explained hereinlater, to the host 60; the reception buffer 25a for temporarily storing the print data which is outputted from the host 60; the transmission buffer 26b for temporarily storing reverse information which is transmitted from a PDL discrimination processing unit 30, which will be explained hereinlater, to the host 60; a transfer control unit 27 for specifying a reception destination and a transmission destination and distributing the data; end point information 28 for storing reception destination information, transmission destination information, and the like of each end point; the setup process 29 for deciding communicating means with the host 60 upon occurrence of the bus reset; the printer control process 72 for analyzing a command such as status inquiry from the host 60, forced stop of the printing, or the like and executing the relevant process; the PDL discrimination processing unit 30 for sensing the received data, discriminating the PDL language, and distributing the data to proper PDL processes; USB descriptor information 31 which is returned by the printer 71 at the time of the bus reset or at the time of inquiring about setup information from the host 60; PnP information 32 which is returned by the printer 71 when there is an inquiry about Plug and Play from the host 60; an edit processing unit 33 for converting the printer language into a display list and notifying a development processing unit 36, which will be explained hereinlater, of the display list; the development processing unit 36 for converting the data to which the display list has been transferred into image data and sending the image data to an engine 37, which will be explained hereinlater; and the engine 37 for printing the image data.

The edit processing unit 33 of the printer 71 has a PCL language processing unit 34, a PS language processing unit 35, and the like.

Subsequently, a construction of the USB chip 22 of the printer 71 will be described.

Figure 5:
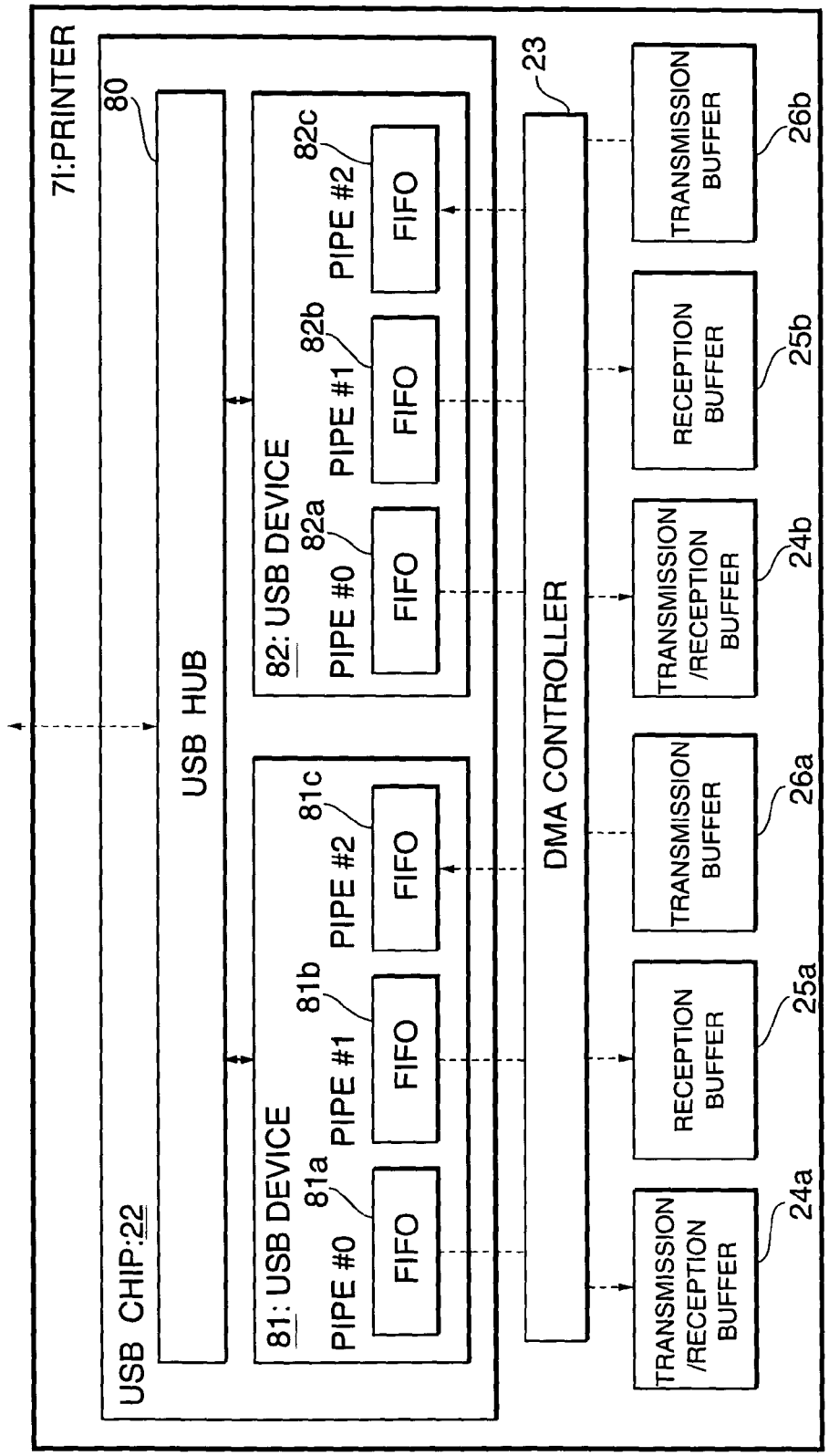
FIG. 5 is a diagram showing a structure of a USB chip in the first embodiment of the invention.

FIG. 5 is a diagram showing a structure of the USB chip in the first embodiment of the invention.

As shown in FIG. 5, the USB chip 22 on the printer 71 is constructed by: a USB device 81; a USB device 82; and a USB hub (HUB) 80 having a function for expanding the two USB devices 81 and 82.

The USB device 81 has: an FIFO 81a as a queue for data storage associated with the transmission/reception buffer 24a for transmitting/receiving the data of the setup process 29; an FIFO 81b associated with the reception buffer 25a for receiving the data of the printer control process 72; and an FIFO 81c associated with the transmission buffer 26a for transmitting the data of the printer control process 72.

The USB device 82 has: an FIFO 82a associated with the transmission/reception buffer 24b for transmitting/receiving the data of the setup process 29; an FIFO 82b associated with the reception buffer 25b for receiving the data of the PDL discrimination processing unit 30; and an FIFO 82c associated with the transmission buffer 26b for transmitting the data of the PDL discrimination processing unit 30.

It is recognized from the host 60 as if the different devices such as USB device 81 and USB device 82 were connected.

Subsequently, a construction of the port information 15 will be described.

FIG. 6 is a diagram showing a construction of the port information in the first embodiment of the invention.

As shown in FIG. 6, the port information 15 is used for the transfer control unit 27 to determine to which end point of the USB devices 81 and 82 the data is transmitted in response to a writing request from an upper process (printer driver 12, setup process 13, etc.) or determine to which end point of the USB devices 81 and 82 an inquiry is made in response to a reading request. The port information 15 has: port number information which is used for the upper process to designate a specific one of the USB devices 81 and 82; and each end point information installed in the USB devices 81 and 82, respectively.

The end point information 28 has: an end point address for designating pipe information of a specific one of the USB devices 81 and 82; a transfer method indicative of a kind of USB data transfer at the end point; and "Max Packet Size" (maximum packet size) for storing maximum packet size information of a packet which can be transmitted and received at the end point.

Subsequently, a construction of the USB descriptor information 31 in the printer 71 will be described.

Figure 7:
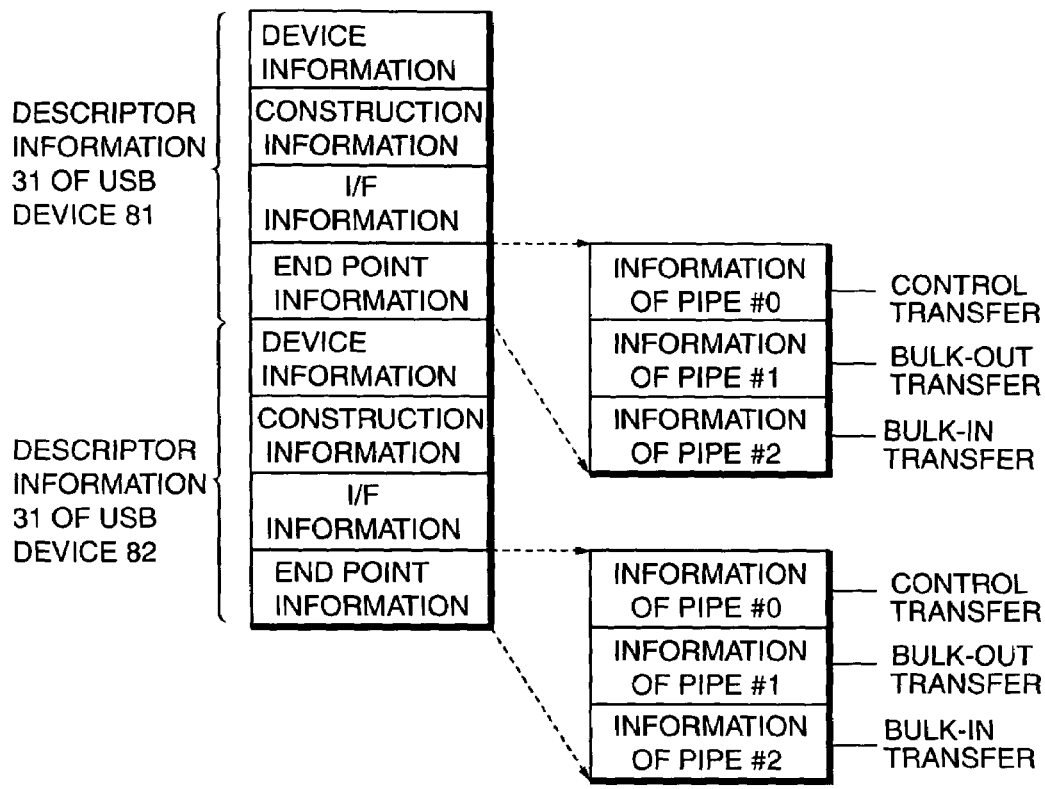
FIG. 7 is a diagram showing a construction of USB descriptor information in the first embodiment of the invention.

FIG. 7 is a diagram showing the construction of the USB descriptor information in the first embodiment of the invention.

As shown in FIG. 7, the USB descriptor information 31 has: device information comprising vendor information of the device, product ID information, etc.; construction information comprising the number of interfaces which are supported by the device, power specification information, etc.; interface information comprising a type (printer, storage device, etc.) of the device, in the case where the printer 71 has a plurality of interfaces, ID information for enabling the host 60 to designate the specific interface, information indicative of the number of end points, etc.; end point information showing address information of the end point, a support transferring method, maximum packet size information, etc. every end point. In the embodiment, the USB descriptor information 31 is constructed by: USB descriptor information 31 for the USB device 81; and USB descriptor information 31 for the USB device 82.

Subsequently, a construction of the PnP information 32 will be described.

Figure 8:
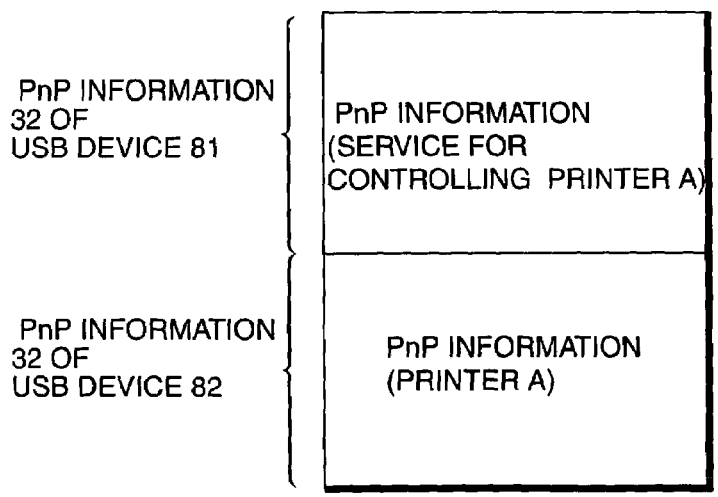
FIG. 8 is a diagram showing a construction of PnP information in the first embodiment of the invention.

FIG. 8 is a diagram showing the construction of the PnP information in the first embodiment of the invention.

As shown in FIG. 8, in the embodiment, the PnP information 32 is constructed by: PnP information 32 of a service for controlling a printer A for the USB device 81; and PnP information 32 of a printer A for the USB device 82.

Subsequently, a construction of the end point information 28 will be described.

Figure 9:
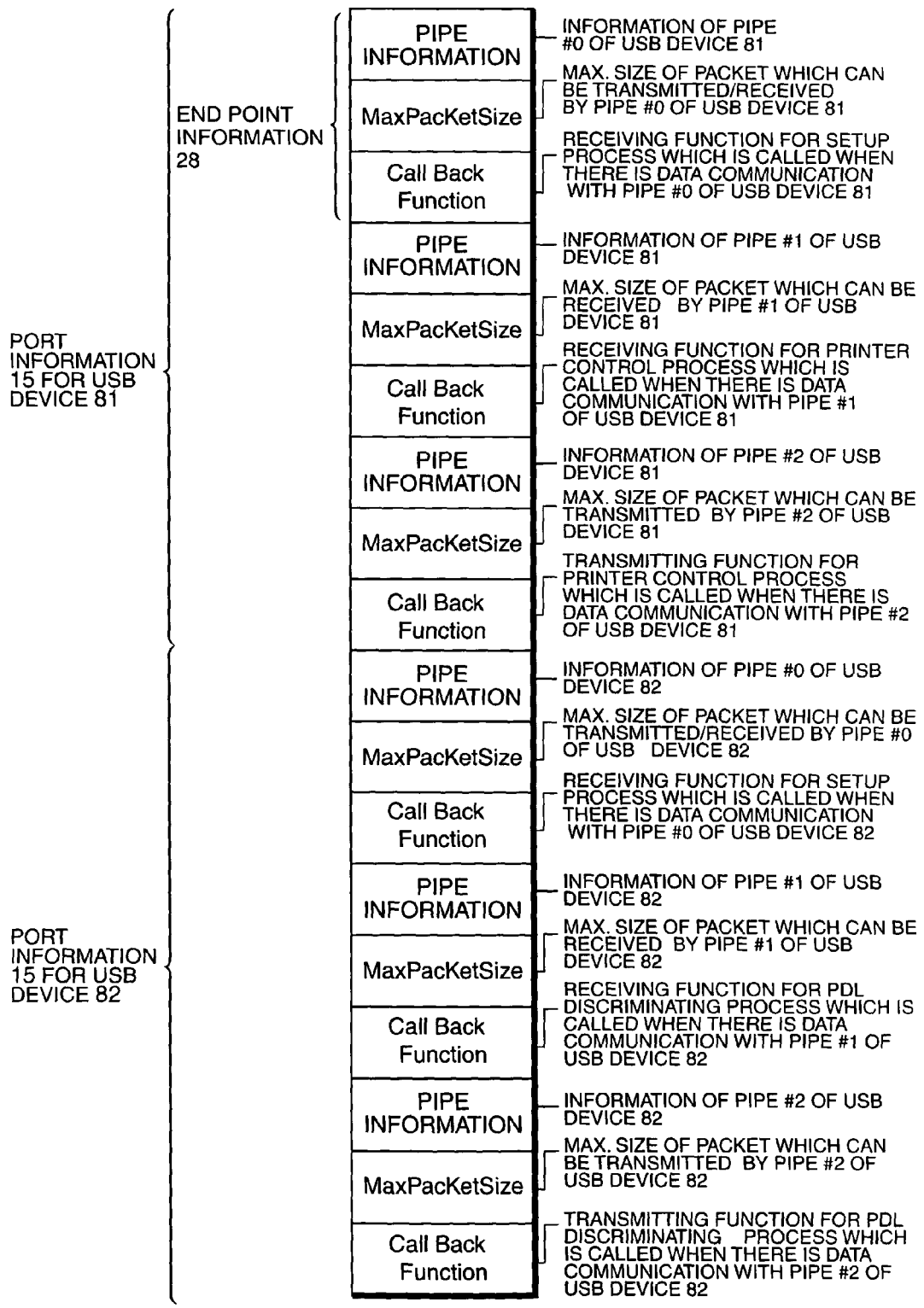
FIG. 9 is a diagram showing a construction of end point information in the first embodiment of the invention.

FIG. 9 is a diagram showing the construction of the end point information in the first embodiment of the invention.

As shown in FIG. 9, when the data from the host 60 is received, information for distributing the data to the relevant process on the basis of the notified end point information is stored in the end point information 28. The end point information 28 has end point information as many as the number of USB devices. Each end point information comprises: pipe information associated to the end point; "Max Packet Size" for storing maximum packet size information of the packet which can be transmitted and received; and "Call Back Function" (call back function) for calling when the data is received to the end point.

Subsequently, the operation of USB data transfer in the printer system of the construction will be described.

Figure 10:
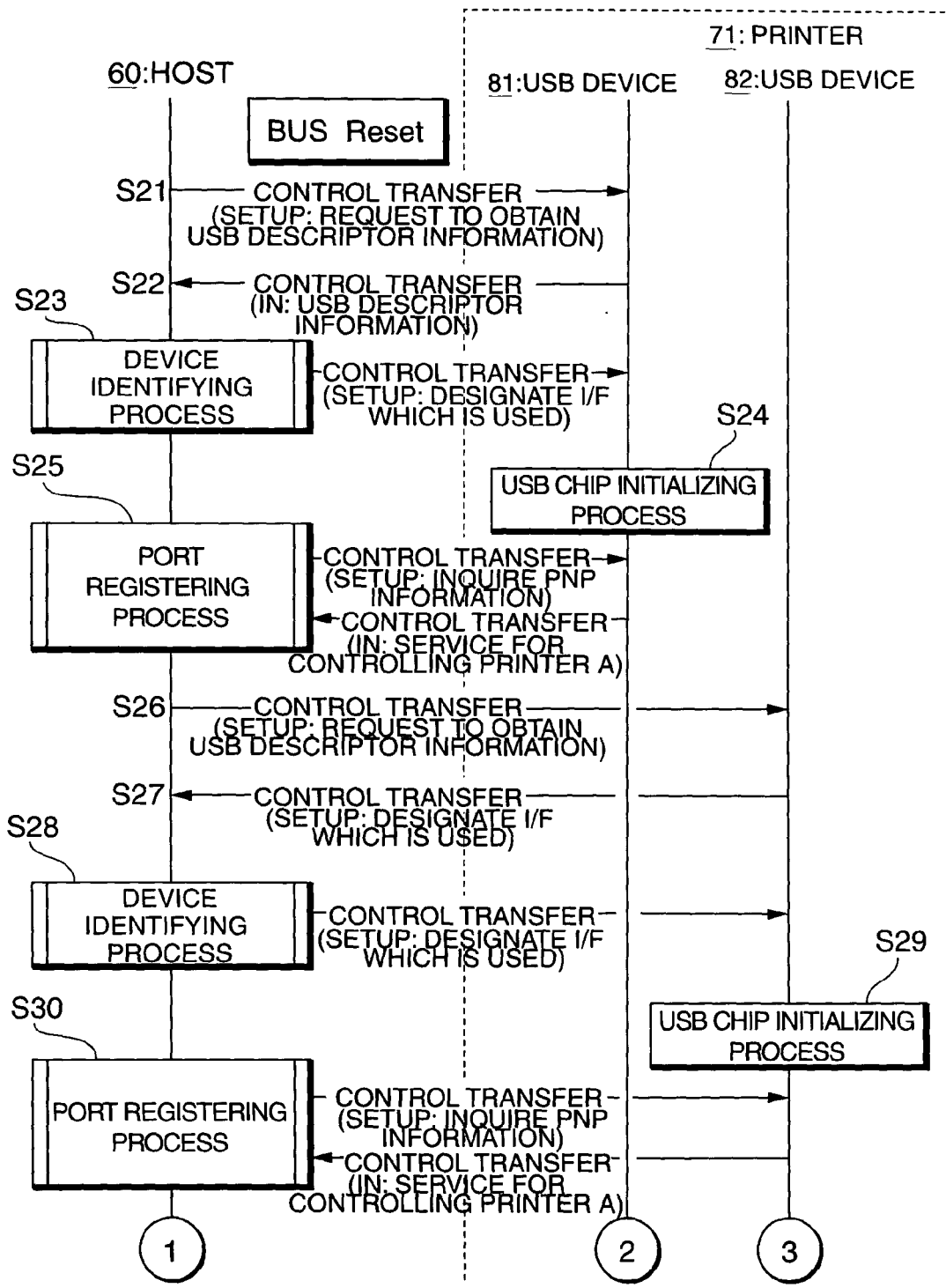
FIG. 10 is a first flowchart showing the operation of USB data transfer in the printer system in the first embodiment of the invention.
Figure 11:
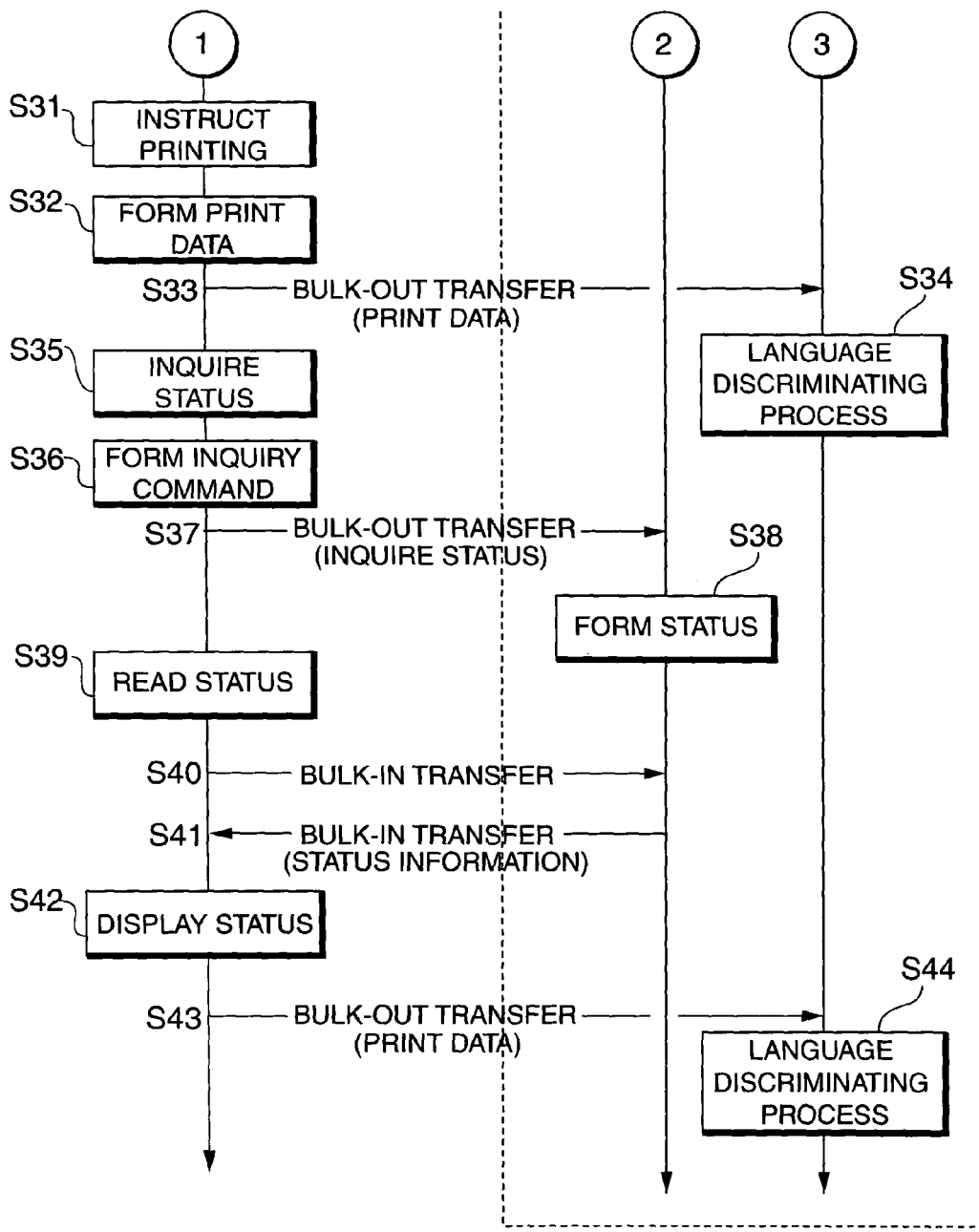
FIG. 11 is a second flowchart showing the operation of USB data transfer in the printer system in the first embodiment of the invention.

FIG. 10 is a first flowchart showing the operation of the USB data transfer in the printer system in the first embodiment of the invention. FIG. 11 is a second flowchart showing the operation of the USB data transfer in the printer system in the first embodiment of the invention.

First, when the bus reset is detected, the setup process 13 of the host 60 inquires of the USB device 81 about the USB descriptor information 31 by using control transfer (step S21). Thus, in response to the inquiry about the USB descriptor information 31 from the host 60, the USB device 81 of the printer 71 returns the USB descriptor information 31 prepared for the USB device 81 to the host 60 by using the control transfer (step S22). The setup process 13 of the host 60 recognizes device information of the connected device and a supporting state of the transfer means by the obtained USB descriptor information 31, determines the interface which is used, and notifies the printer 71 of the ID information of the interface which is used (step S23).

Subsequently, the setup process 29 of the printer 71 sets the USB device 81 by the notified interface ID information (step S24). After that, the transfer control unit 14 obtains the PnP information 32 prepared for the printer control process 72 in the USB device 81 from the printer 71 by using the control transfer and registers the port information 15. If the driver which coincides with the registered port information 15 does not exist, the user is notified that the new device has been detected (step S25). The setup process 13 of the host 60 inquires of the USB device 82 about the USB descriptor information 31 by using the control transfer (step S26). Thus, in response to the inquiry about the USB descriptor information 31 from the host 60, the USB device 82 returns the USB descriptor information 31 prepared for the USB device 82 to the host 60 by using the control transfer (step S27).

Subsequently, the setup process 13 of the host 60 recognizes the device information of the connected device and the supporting state of the transfer means by the obtained USB descriptor information 31, determines the interface which is used, and notifies the printer 71 of the ID information of the interface which is used (step S28). The setup process 29 of the printer 71 sets the USB device 82 by the notified interface ID information (step S29). After that, the transfer control unit 14 obtains the PnP information 32 prepared for the PDL discrimination processing unit 30 in the USB device 82 from the printer 71 by using the control transfer and registers the port information 15. If the driver which coincides with the registered port information 15 does not exist, the user is notified that the new device has been detected (step S30).

The application 11 to which the printing has been instructed by the user instructs the printer driver 12 to print (step S31).

Subsequently, the printer driver 12 to which the printing has been instructed forms print data and requests the transfer control unit 14 to transmit it (step S32). The transfer control unit 14 of which the transmission has been requested specifies a transfer destination and notifies the USB device 82 of the print data by the bulk-out transfer (step S33). The notified print data is transmitted to the PDL discrimination processing unit 30 by the transfer control unit 27 (step S34). If the application 11 wants to obtain the status of the printer 71 during the printing, the transfer of the print data is temporarily interrupted and requests the printer control driver 61 to obtain the status (step S35).

Subsequently, the printer control driver 61 of which the obtainment of the status has been requested forms a status inquiry command and requests the transfer control unit 14 to transmit it (step S36). The transfer control unit 14 of which the transmission has been requested specifies the transfer destination and notifies the USB device 81 of the status inquiry command by the bulk-out transfer (step S37). The printer 71 of which the status has been inquired forms status information here (step S38). The transfer control unit 14 requests the USB chip 20 to read the printer reverse information (step S39).

Subsequently, the transfer control unit 14 of which the reading has been requested allows the printer 71 to start the bulk-in transfer and permits the printer 71 to transmit the reverse data (step S40). In response to the permission of the transmission of the reverse data, the printer 71 transfers the formed status information to the host 60 by the bulk-in transfer (step S41). The transfer control unit 14 receives the status information, sends the data to the printer control driver 61, and displays the status (step S42). If the print data still remains, the transfer control unit 14 again notifies the USB device 82 of the print data by the bulk-out transfer (step S43). The notified data is sent to the PDL discrimination processing unit 30 by the transfer control unit 27 (step S44).

Subsequently, the operation of a host data transmitting process which is used in common when the host 60 transmits the data to the printer 71 will be described.

Figure 12:
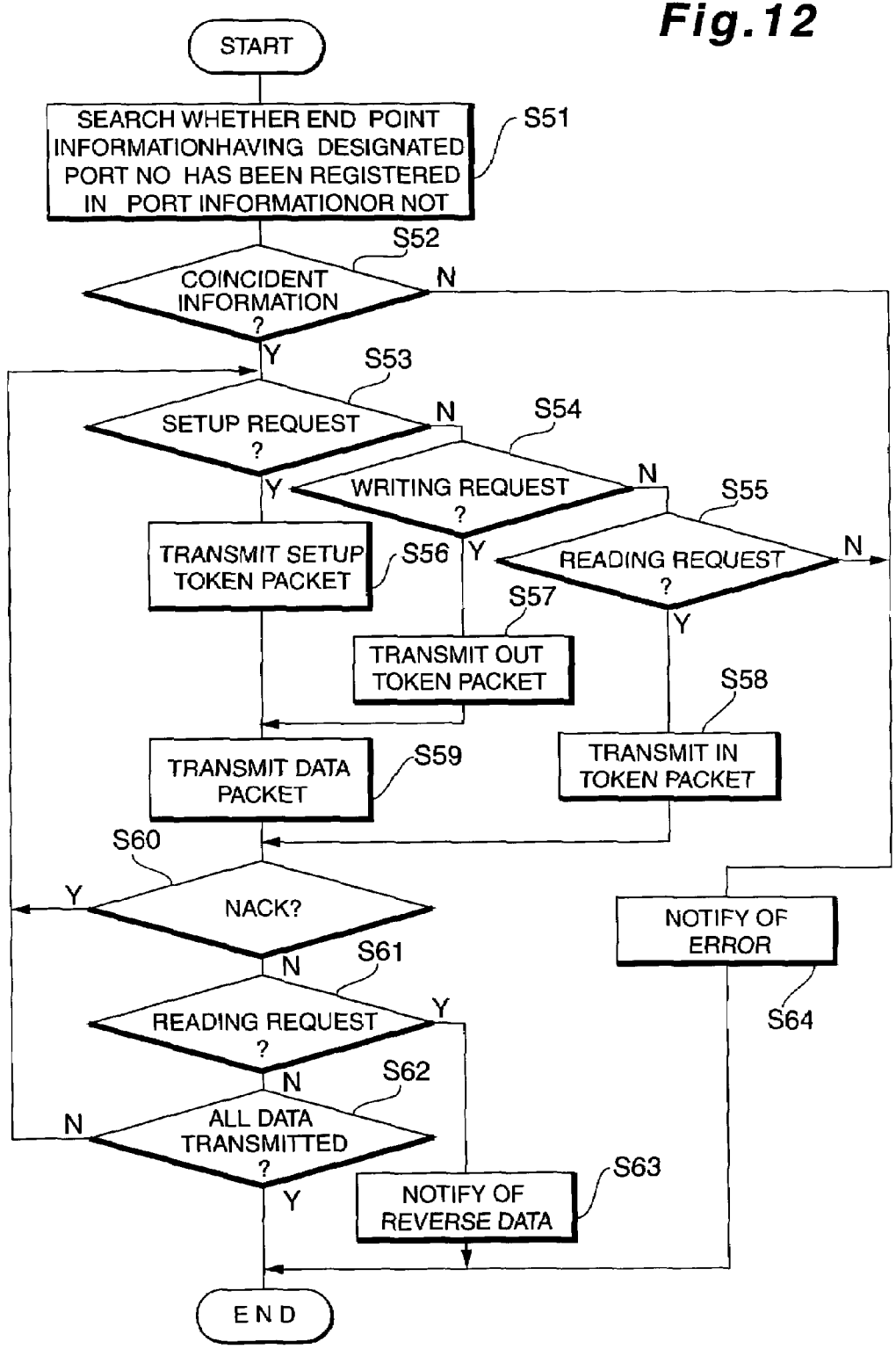
FIG. 12 is a flowchart showing the operation of host data transmitting/receiving processes in the first embodiment of the invention.

FIG. 12 is a flowchart showing the operation of host data transmitting/receiving processes in the first embodiment of the invention.

First, when a request to the printer 71 is made, the transfer control unit 14 of the host 60 searches whether the port which coincides with the number of the requested port has been registered in the port information 15 or not (step S51). The transfer control unit 14 discriminates whether the port which coincides with the number of the requested port exists or not (step S52). If the coincident port exists, whether the request to the printer 71 is a setup request or not is discriminated (step S53). If the coincident port does not exist, since this means that the designated parameter is wrong, an error request is notified (step S64). The processing routine is finished.

Subsequently, the transfer control unit 14 discriminates whether the request to the printer 71 is the setup request or not (step S53). If it is the setup request, the transfer control unit 14 forms a SETUP token packet and requests the transmission of it (step S56). If it is not the setup request, whether the request to the printer 71 is a writing request or not is discriminated (step S54). If it is the writing request, the transfer control unit 14 forms an OUT token packet and requests the transmission of it (step S57). If it is not the writing request, whether the request to the printer 71 is a reading request or not is discriminated (step S55). If it is the reading request, the transfer control unit 14 forms an IN token packet and requests the transmission of it (step S58). If it is not the reading request, the error request is notified (step S64). The processing routine is finished.

Subsequently, the transfer control unit 14 forms a data packet and requests the transmission of it (step S59). The transfer control unit 14 which requested the transmission discriminates whether a response from the printer 71 is NACK or not (step S60). If it is NACK here, whether the request to the printer 71 is the setup request or not is discriminated (step S53). If the response is ACK, the transfer control unit 14 discriminates whether the request to the printer 71 is the reading request or not (step S61). If it is the reading request, the data is extracted from the reception buffer and notified to the process to which the reading request has been made. The reverse data is notified (step S63) and the processing routine is finished. If it is not the reading request, whether all of the data to be transferred has been transmitted or not is discriminated (step S62). Finally, if it has fully been transmitted, the processing routine is finished. If all the data is not transmitted, whether the request to the printer 71 is the setup request or not is discriminated (step S53).

Subsequently, the operation of a printer data receiving process which is used in common when the notified data is received from the host 60 will be described.

Figure 13:
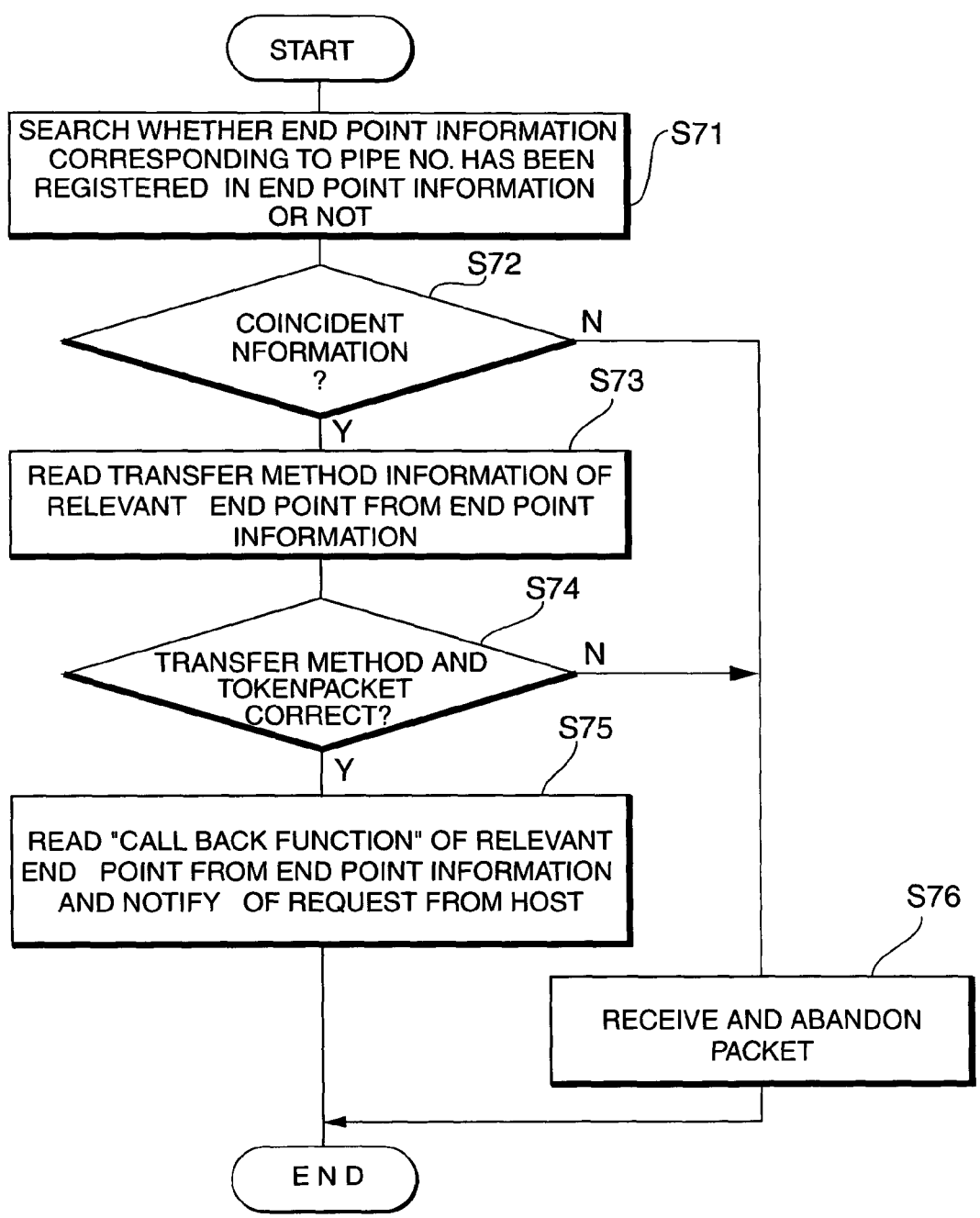
FIG. 13 is a flowchart showing the operation of printer data transmitting/receiving processes in the first embodiment of the invention.

FIG. 13 is a flowchart showing the operation of the printer data transmitting/receiving processes in the first embodiment of the invention.

First, when the data reception from the host 60 is recognized, the transfer control unit 27 searches whether the end point information corresponding to pipe number information which the received end point has has been registered in the end point information 28 or not (step S71). Whether the end point information which coincides with the end point information 28 exists or not is discriminated (step S72). If the coincident end point information exists, transfer method information of the relevant end point is read out from the end point information 28 (step S73). If the coincident end point information does not exist, since this means that the packet is an illegal packet, the packet data is received and abandoned (step S76) and the processing routine is finished.

Subsequently, whether the transfer control unit 27 discriminates whether the read-out transfer method and the designation of the token packet received from the host 60 are correct or not (step S74). If they are correct, the relevant process is notified of the request command and the data by using "Call Back Function" of the relevant end point in the end point information 28 (step S75) and the processing routine is finished. If they are incorrect, since the packet is an illegal packet, the packet data is received and abandoned (step S76) and the processing routine is finished.

Subsequently, a subroutine of the device identifying process in step S23 in FIG. 10 will be described.

Figure 14:
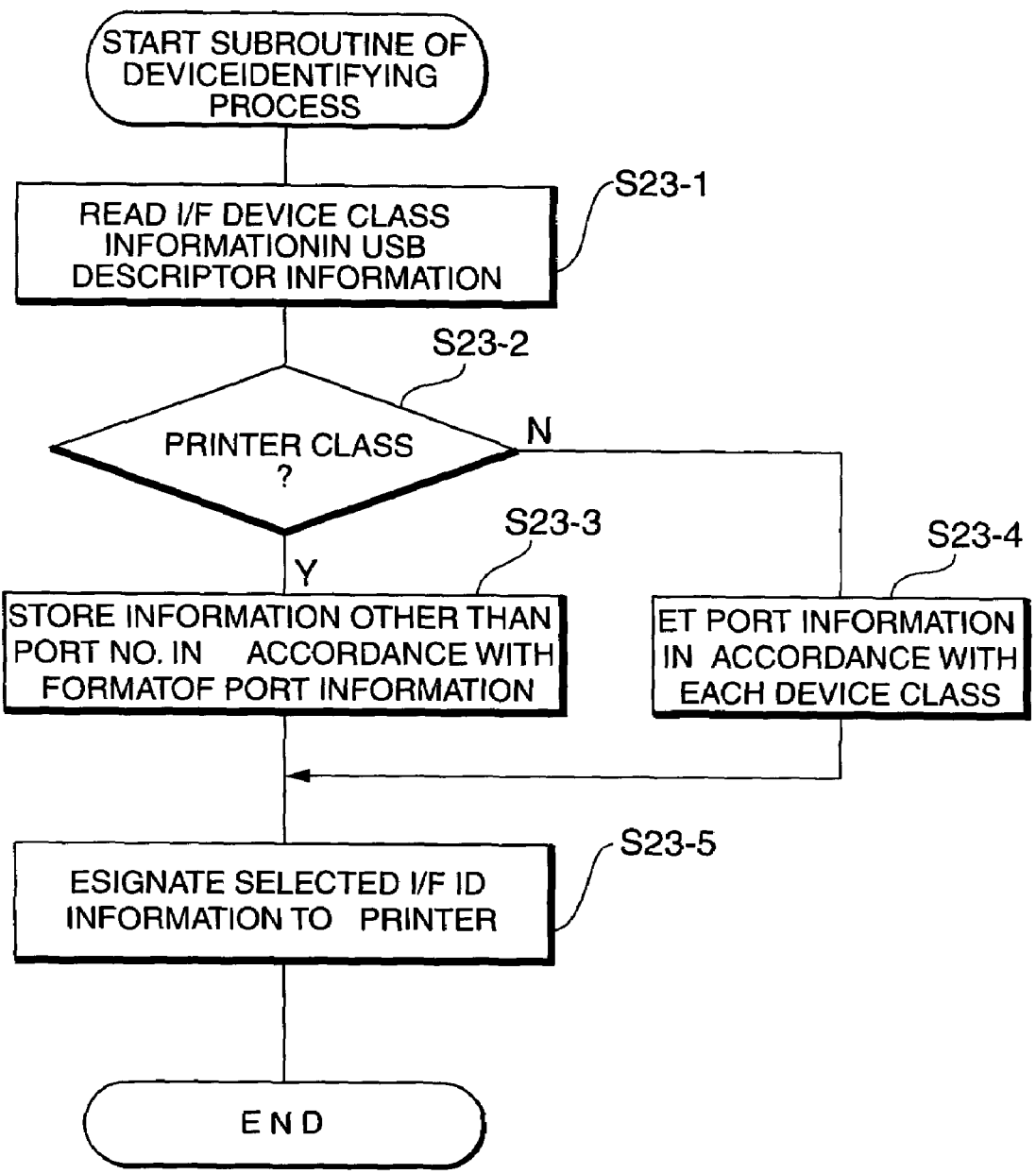
FIG. 14 is a flowchart showing a subroutine of a device identifying process in the first embodiment of the invention.

FIG. 14 is a diagram showing the subroutine of the device identifying process in the first embodiment of the invention.

First, the setup process 13 of the host 60 reads interface device class information from the USB descriptor information 31 (step S23-1). Whether the interface device class information is a printer class or not is discriminated (step S23-2). If the interface device class information is the printer class, information other than the port number information of the port information 15 is formed from the obtained USB descriptor information 31 in accordance with a format as shown in FIG. 6 (step S23-3). If the interface device class information is not the printer class, the port information 15 is formed in accordance with each device class (step S23-4). The interface ID information in the USB descriptor information 31 is transmitted to the printer 71, an interface to be communicated with is specified (step S23-5), and the processing routine is finished.

Subsequently, a subroutine of the port registering process in step S25 in FIG. 10 will be described.

Figure 15:
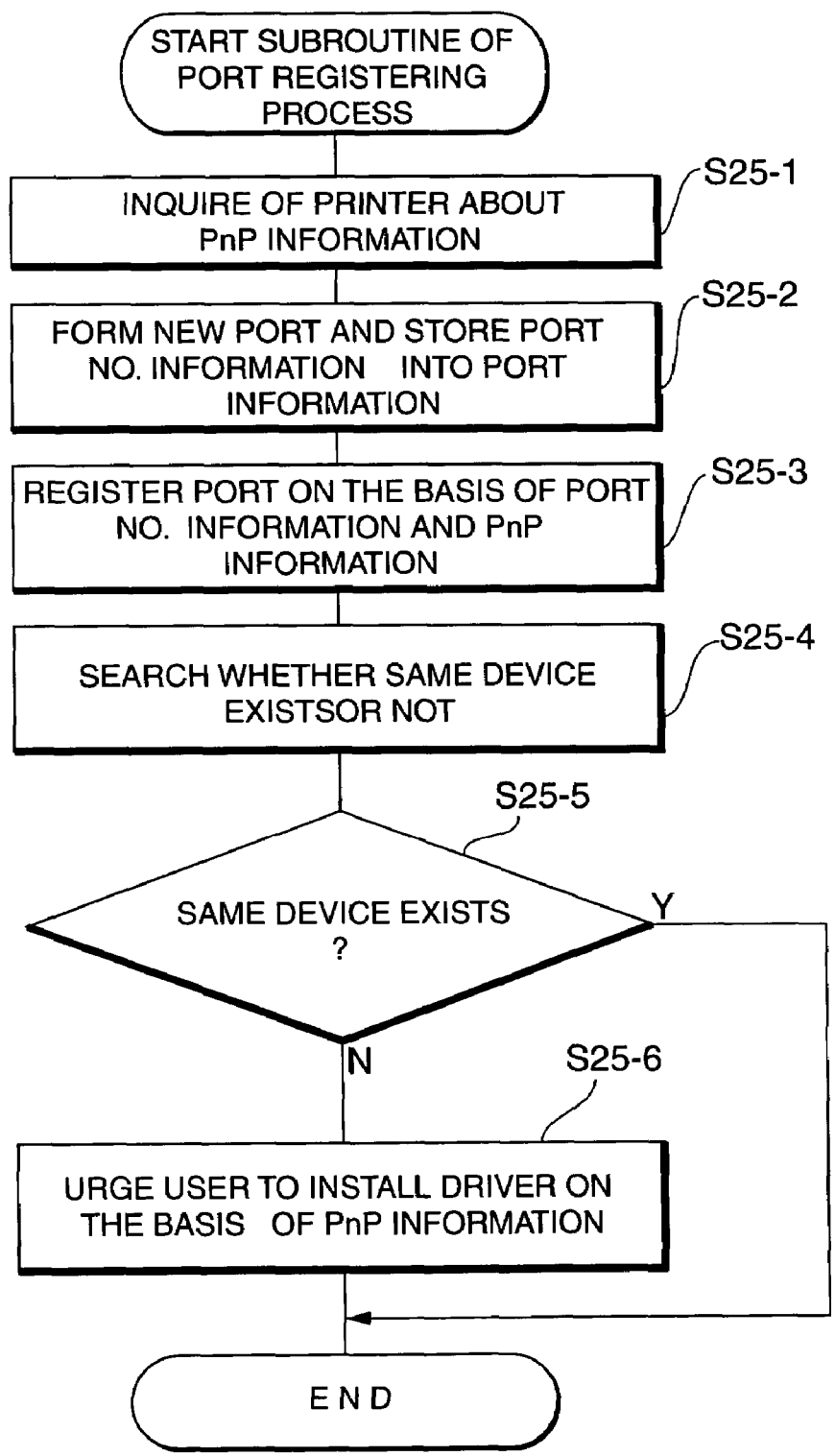
FIG. 15 is a flowchart showing a subroutine of a port registering process in the first embodiment of the invention.

FIG. 15 is a diagram showing the subroutine of the port registering process in the first embodiment of the invention.

First, the transfer control unit 14 of the host 60 inquires of the USB devices 81 and 82 of the printer 71 about the PnP information 32 and obtains the PnP information 32 (step S25-1). A new port is opened and its port number information is stored into the port information 15 (step S25-2). Subsequently, the port is registered on the basis of the obtained PnP information and the formed port number information (step S25-3). The registered ports are searched to discriminate whether the same device information already exists or not (step S25-4). Whether the same device exists or not is discriminated (step S25-5). If the same device exists, the processing routine is finished. If the same device does not exist, installation of a driver is displayed to the user on the basis of the PnP information 32 (step S25-6) and the processing routine is finished.

Subsequently, the operation of the receiving function "Call Back Function" for the setup process will be described.

Figure 16:
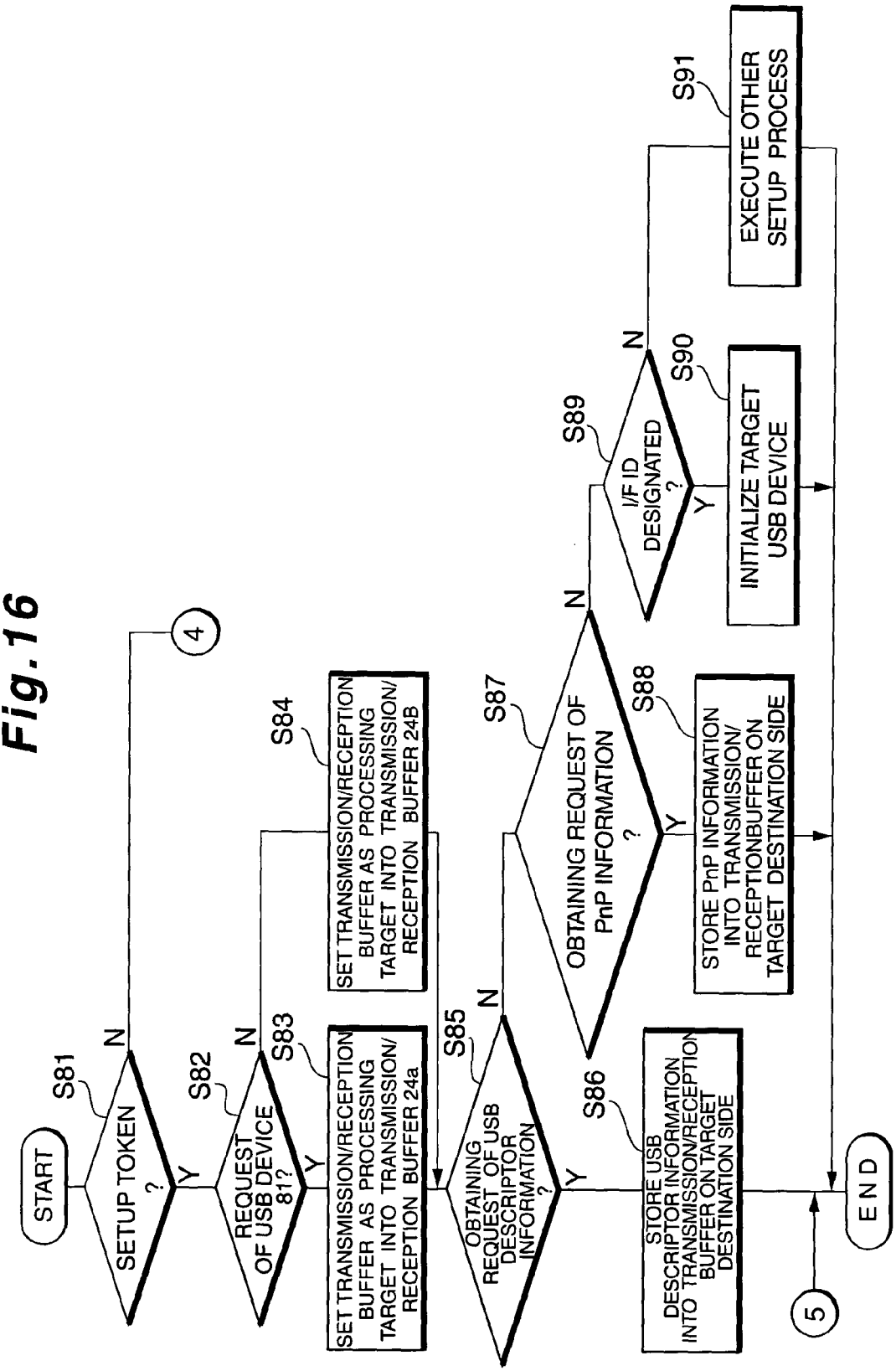
FIG. 16 is a first flowchart showing the operation of a receiving function for a setup process in the first embodiment of the invention.
Figure 17:
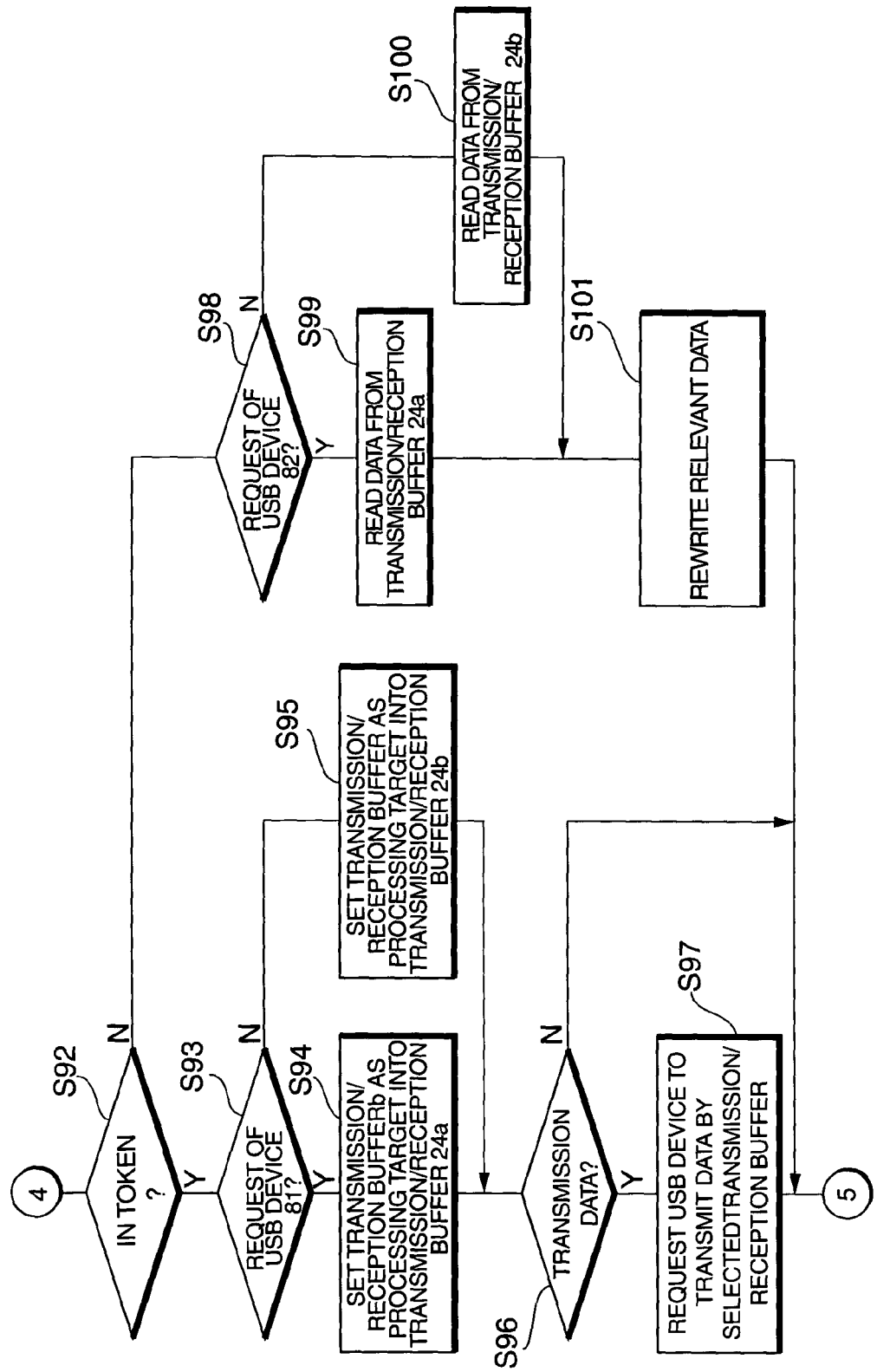
FIG. 17 is a second flowchart showing the operation of the receiving function for the setup process in the first embodiment of the invention.

FIG. 16 is a first flowchart showing the operation of the receiving function for the setup process in the first embodiment of the invention. FIG. 17 is a second flowchart showing the operation of the receiving function for the setup process in the first embodiment of the invention.

First, the setup process 13 which received the reception notification discriminates whether it is a SETUP token or not (step S81). If it is the SETUP token, the setup process 13 which received the SETUP token discriminates whether a request has been made to the USB device 81 or not (step S82). If the request has been made to the USB device 81, a data packet is read out from the transmission/reception buffer 24a (step S83). If the request has been made to the USB device 82, a data packet is read out from the transmission/reception buffer 24b (step S84).

Subsequently, the setup process 13 discriminates whether the command is a request for obtaining the USB descriptor information 31 or not (step S85). If it is the obtaining request of the USB descriptor information 31, the USB descriptor information 31 of the relevant USB device is stored into the relevant transmission buffer (step S86). If it is not the obtaining request of the USB descriptor information 31, the setup process 13 discriminates whether the command is a request for obtaining the PnP information 32 or not (step S87).

If it is the obtaining request of the PnP information 32, the PnP information 32 of the relevant USB device is stored into the relevant transmission buffer (step S88). If it is not the obtaining request of the PnP information 32, the setup process 13 discriminates whether the command is the designation of the interface ID or not (step S89). If it is the designation of the interface ID, the relevant USB device is initialized (step S90). If it is not the designation of the interface ID, a process corresponding to another command is executed (step S91).

Whether the reception notification is the SETUP token or not is discriminated as mentioned above. If it is not the SETUP token, the setup process 13 which received the reception notification discriminates whether it is the IN token or not (step S92). If it is the IN token, the setup process 13 discriminates whether the request has been made to the USB device 81 or not (step S93). If the request has been made to the USB device 81, the transmission/reception buffer as a processing target is set into the transmission/reception buffer 24a (step S94). If the request has been made to the USB device 82, the transmission/reception buffer as a processing target is set into the transmission/reception buffer 24b (step S95).

Subsequently, the setup process 13 discriminates whether the transmission data exists in the transmission/reception buffer 24a or the transmission/reception buffer 24b or not (step S96). If the transmission data exists, the transmission data is read out from the relevant transmission/reception buffer, the USB device is requested to transmit the data (step S97), and the processing routine is finished. If there is no transmission data, the processing routine is finished.

Whether the reception notification is the IN token or not is discriminated as mentioned above. If it is not the IN token, the setup process 13 which recognized that the OUT token has been received discriminates whether the request has been made to the USB device 82 or not (step S98). If the request has been made to the USB device 82, the data is read out from the transmission/reception buffer 24a (step S99). If no request is made to the USB device 82, the data is read out from the transmission/reception buffer 24*b* (step S100). The data is rewritten on the basis of the read-out data (step S101). The processing routine is finished.

By making the device which handles the print data and the device which handles the control data different as mentioned above in the embodiment, even if a jam or the like occurs and the printing process becomes busy, the real-time status of the printer 71 can be obtained. The cancellation of the data which is being printed can be easily instructed.

Subsequently, the second embodiment of the invention will be described. Component elements having the same structure as those in the first embodiment are designated by the same reference numerals and their description is omitted.

Figure 18:
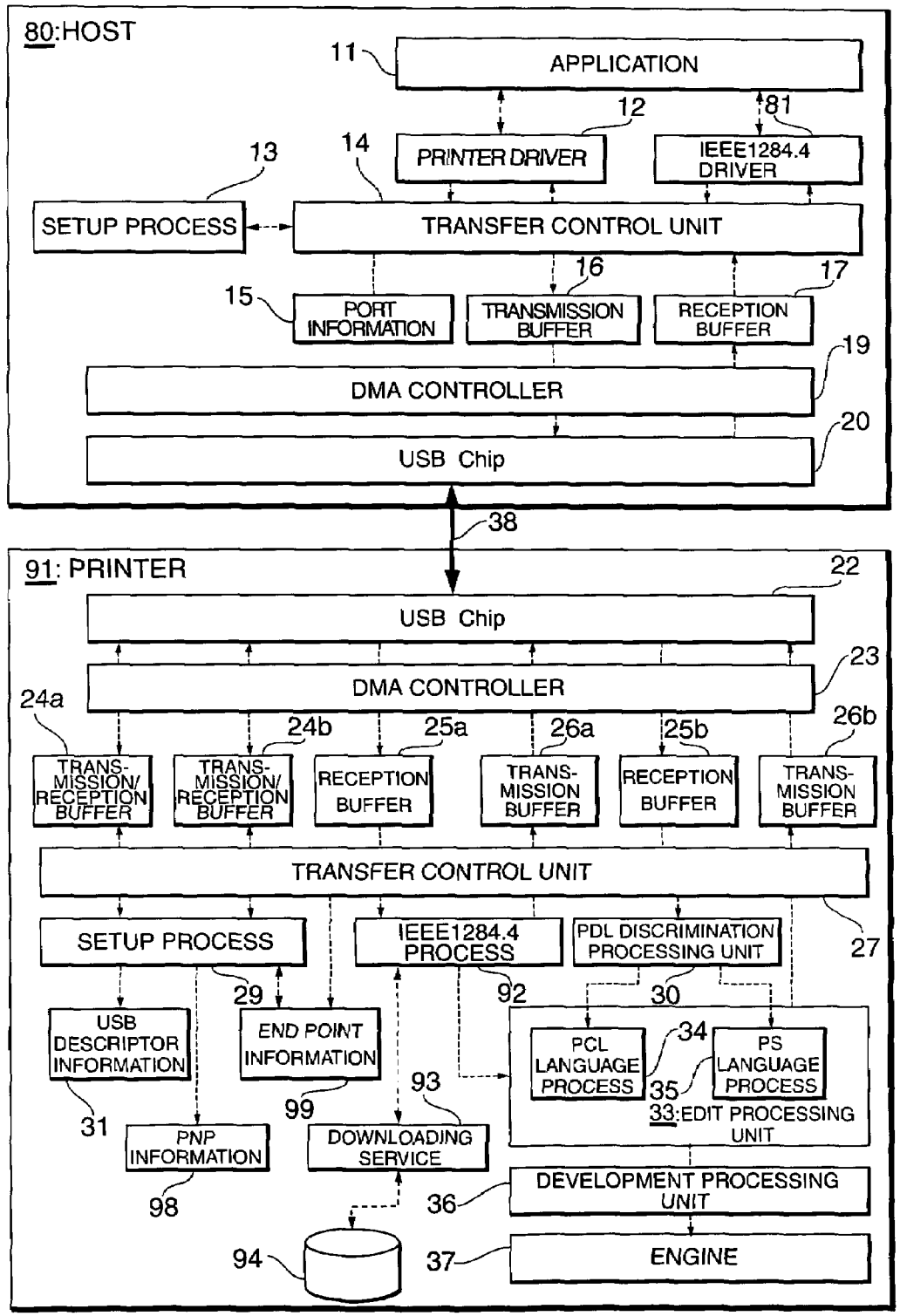
FIG. 18 is a schematic diagram of a printer system in the second embodiment of the invention.

FIG. 18 is a schematic diagram of a printer system in the second embodiment of the invention.

Although the printer control driver 61 has been provided for the host 60 (FIG. 1) in the first embodiment, in the second embodiment as shown in FIG. 18, in place of the printer control driver 61, an IEEE1284.4 driver 81 for packetizing the print data and the control data and realizing a virtual channel function and a flow control function is provided for a host 90.

Although the printer control process 72 has been provided for the printer 71 in the first embodiment, in the second embodiment, in place of the printer control process 72, IEEE1284.4 process 92 for packetizing the print data and the control data and realizing the virtual channel function and the flow control function is provided for a printer 91.

Further, a downloading service 93 for downloading data such as font data or the like onto an HDD 94 as a hard disk and the HDD 94 for storing the downloaded data are provided. Contents of PnP information 98 and end point information 99 are different from those in the first embodiment.

Subsequently, a construction of the USB chip 22 of the printer 91 will be described.

Figure 19:
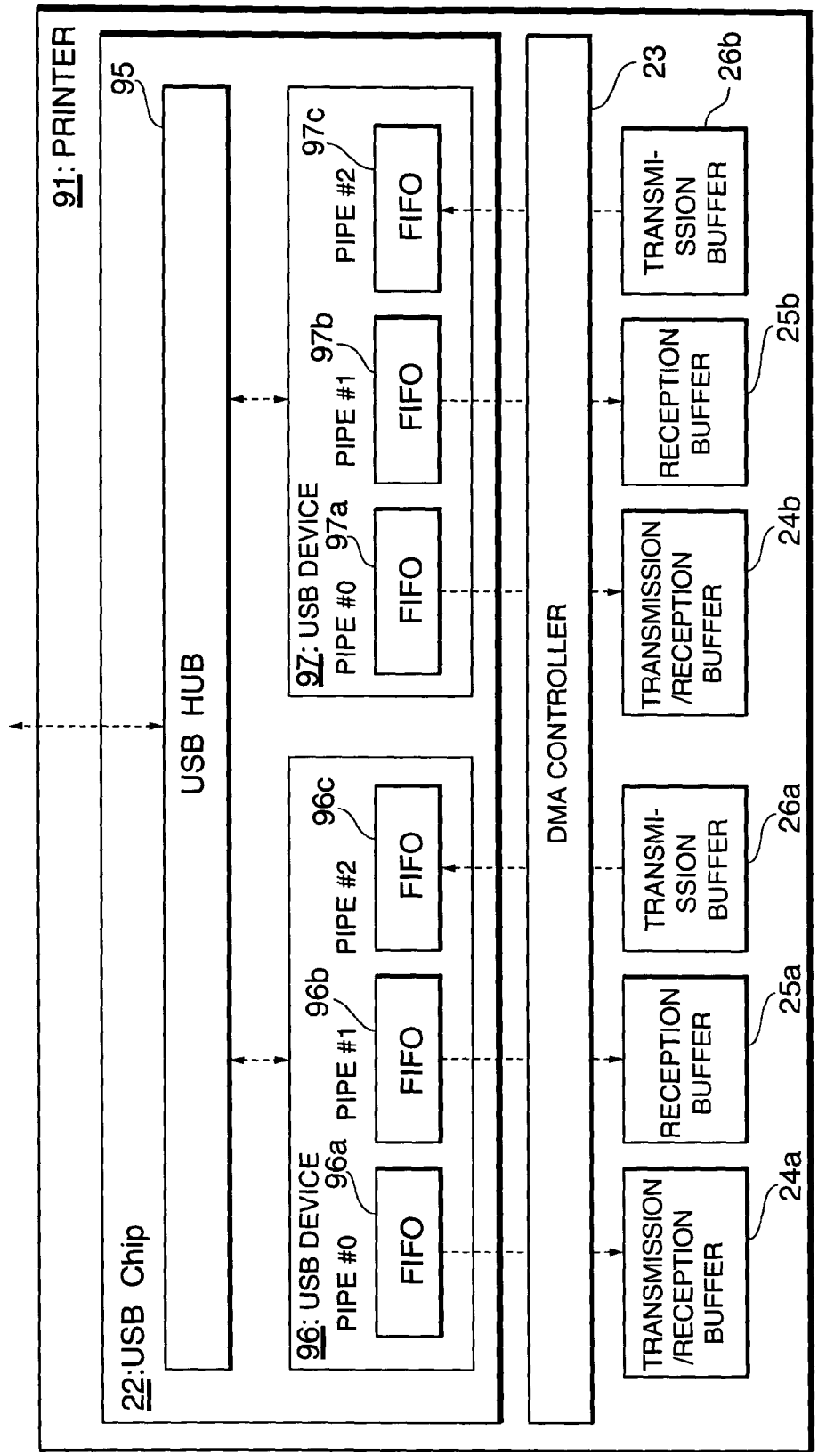
FIG. 19 is a diagram showing a structure of a USB chip in the second embodiment of the invention.

FIG. 19 is a diagram showing a structure of the USB chip in the second embodiment of the invention.

As shown in FIG. 19, the USB chip 22 of the printer 91 has USB devices 96 and 97 and a USB hub 95 having a function for expanding those two USB devices 96 and 97.

The USB device 96 has: an FIFO 96*a* as a queue for data storage associated with the transmission/reception buffer 24*a* for transmitting/receiving the data of the setup process 29; an FIFO 96*b* associated with the reception buffer 25*a* for receiving the data of the IEEE1284.4 driver 84 of the host 90; and an FIFO 96*c* associated with the transmission buffer 26*a* for transmitting the data of the IEEE1284.4 driver 84.

The USB device 97 has: an FIFO 97*a* associated with the transmission/reception buffer 24*b* for transmitting/receiving the data of the setup process 29; an FIFO 97*b* associated with the reception buffer 25*b* for receiving the data of the PDL discrimination processing unit 30; and an FIFO 97*c* associated with the transmission buffer 26*b* for transmitting the data of the PDL discrimination processing unit 30.

Subsequently, a construction of the PnP information 98 will be described.

Figure 20:
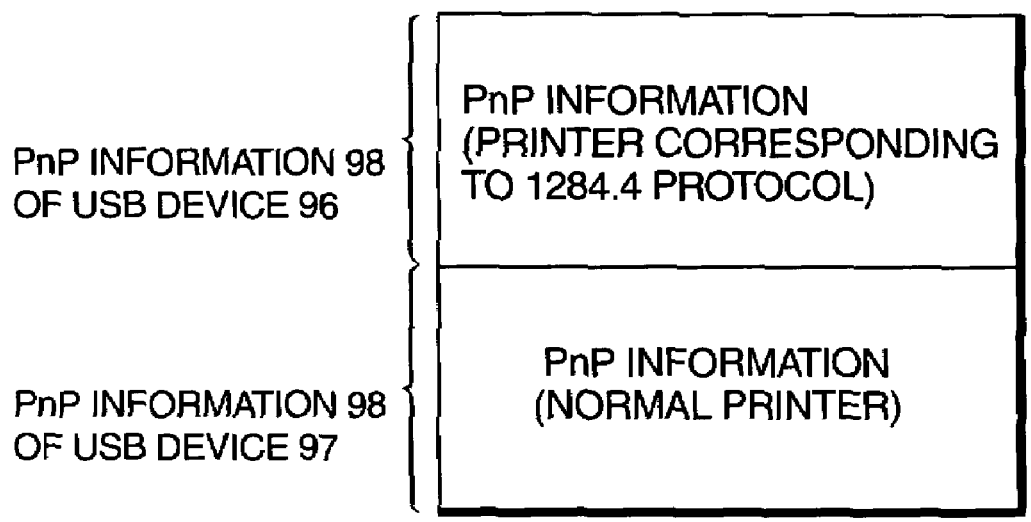
FIG. 20 is a diagram showing a construction of PnP information in the second embodiment of the invention.

FIG. 20 is a diagram showing the construction of the PnP information in the second embodiment of the invention.

As shown in FIG. 20, in the embodiment, the PnP information 98 is constructed by: the PnP information 98 corresponding to a 1284.4 protocol for the USB device 96; and the PnP information 98 corresponding to the 1284.4 protocol for the USB device 97.

Subsequently, a construction of the end point information 99 will be described.

Figure 21:
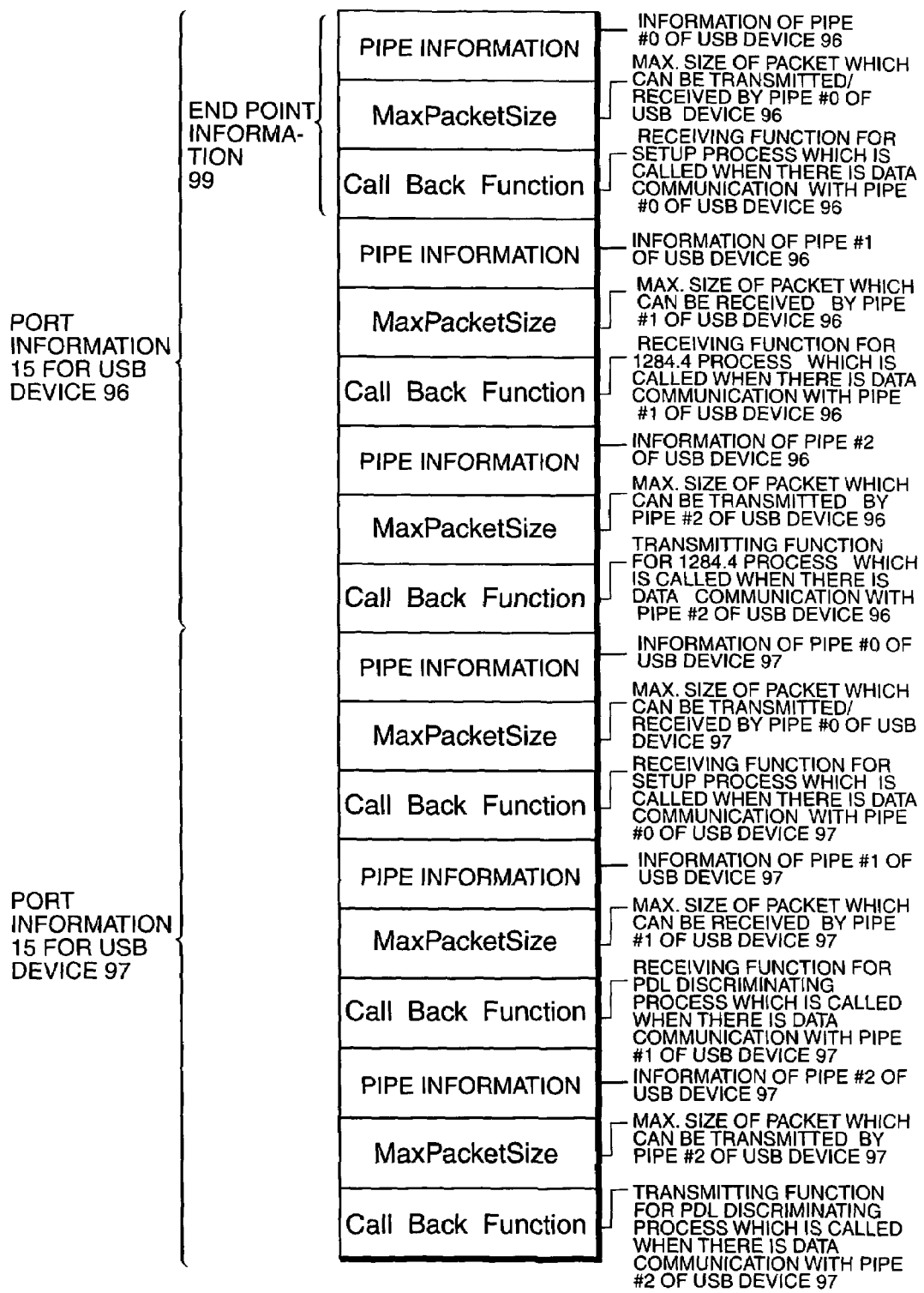
FIG. 21 is a diagram showing a construction of end point information in the second embodiment of the invention.

FIG. 21 is a diagram showing the construction of the end point information in the second embodiment of the invention.

As shown in FIG. 21, in the embodiment, in the end point information 99, "Call Back Function" information of a pipe #1 is a receiving function for the IEEE1284.4 process 92 and "Call Back Function" information of a pipe #2 is a transmitting function for the IEEE1284.4 process 92. When data is received, transmitting/receiving processes prepared by the IEEE1284.4 process 92 can be notified of the data.

Since the port information 15 and the USB descriptor information 31 in the embodiment are similar to those in the first embodiment, they will be explained also with reference to FIGS. 6 and 7.

Subsequently, the operation of the USB data transfer in the printer system with the foregoing construction will be described.

Figure 22:
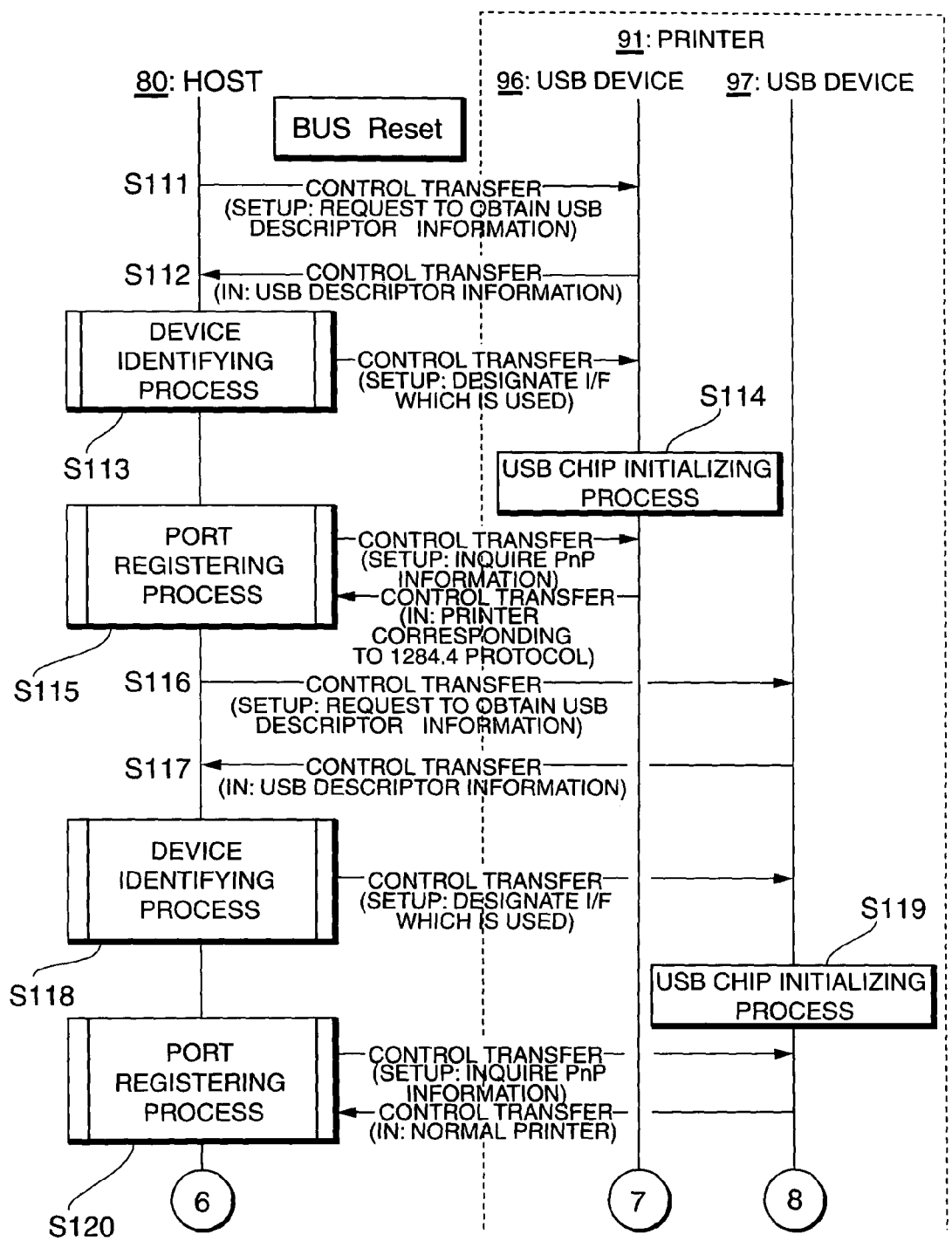
FIG. 22 is a first flowchart showing the operation of USB data transfer in the printer system in the second embodiment of the invention.
Figure 23:
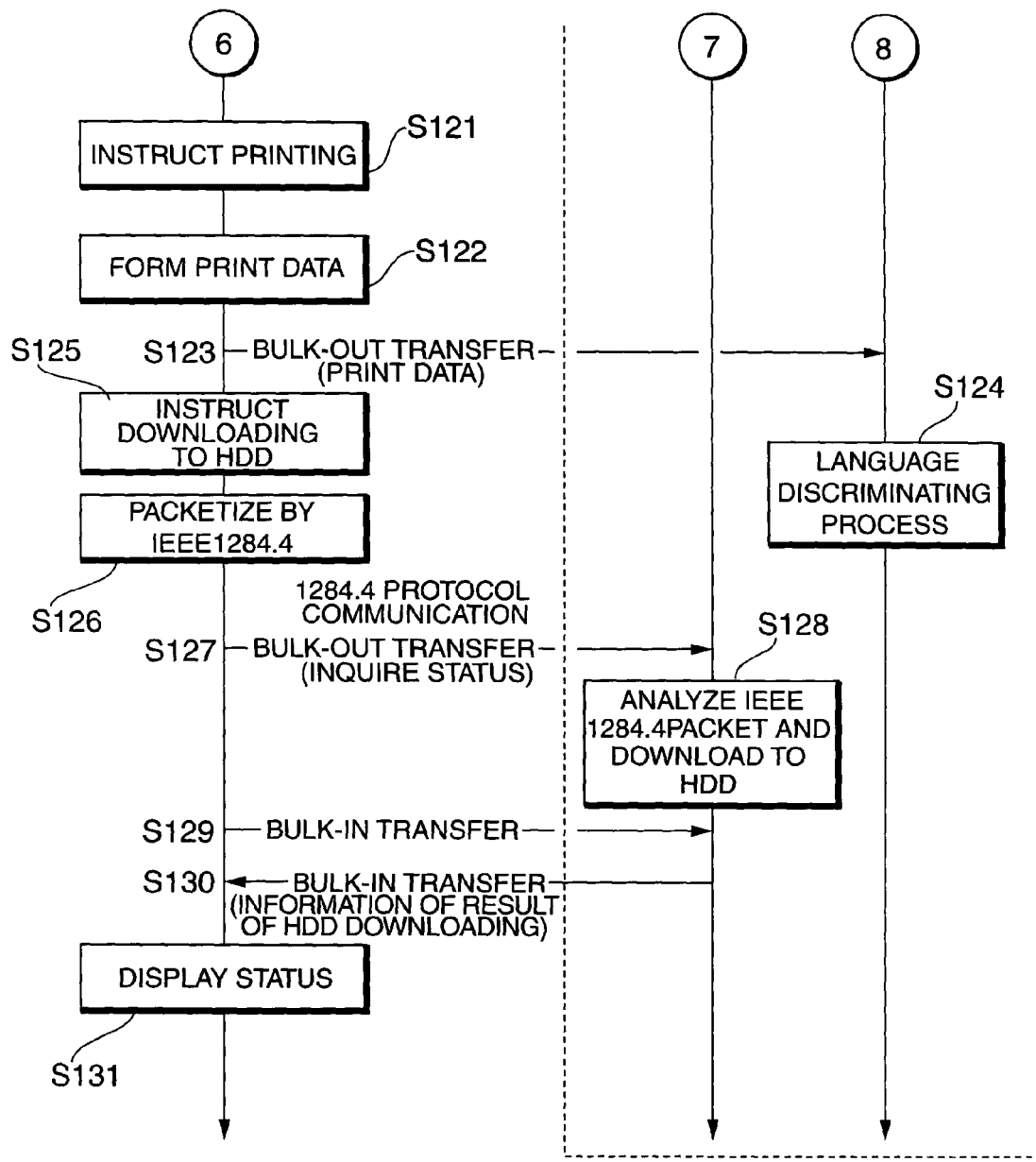
FIG. 23 is a second flowchart showing the operation of USB data transfer in the printer system in the second embodiment of the invention.

FIG. 22 is a first flowchart showing the operation of the USB data transfer in the printer system in the second embodiment of the invention. FIG. 23 is a second flowchart showing the operation of USB data transfer in the printer system in the second embodiment of the invention.

First, when the bus reset is detected, the setup process 13 of the host 90 inquires of the USB device 96 about the USB descriptor information 31 by using the control transfer (step S111). Thus, in response to the inquiry about the USB descriptor information 31 from the host 90, the USB device 96 returns the USB descriptor information 31 prepared for the USB device 96 to the host 90 by using the control transfer (step S112). The setup process 13 on the host 90 recognizes device information of the connected device and a supporting state of the transfer means by the obtained USB descriptor information 31, determines the interface which is used, and notifies the printer 91 of the ID information of the interface which is used (step S113).

Subsequently, the setup process 29 of the printer 91 sets the USB device 96 by the notified interface ID information (step S114). After that, the transfer control unit 14 obtains the PnP information 98 prepared for the IEEE1284.4 process 92 in the USB device 96 from the printer 91 by using the control transfer and registers the port information 15. If the driver which coincides with the registered port information 15 does not exist, the user is notified that the new device has been detected (step S115). The setup process 13 of the host 90 inquires of the USB device 97 about the USB descriptor information 31 by using the control transfer (step S116). Thus, in response to the inquiry about the USB descriptor information 31 from the host 90, the USB device 97 returns the USB descriptor information 31 prepared for the USB device 97 to the host 90 by using the control transfer (step S117).

Subsequently, the setup process 13 of the host 90 recognizes the device information of the connected device and the supporting state of the transfer means by the obtained USB descriptor information 31, determines the interface which is used, and notifies the printer 91 of the ID information of the interface which is used (step S118). The setup process 29 of the printer 91 sets the USB device 97 by the notified interface ID information (step S119). After that, the transfer control unit 14 obtains the PnP information 98 prepared for the PDL discrimination processing unit 30 in the USB device 97 from the printer 91 by using the control transfer and registers the port information 15. If the driver which coincides with the registered port information 15 does not exist, the user is notified that the new device has been detected (step S120).

Subsequently, the application 11 to which the printing has been instructed by the user instructs the printer driver 12 to print (step S121). The printer driver 12 to which the printing has been instructed forms print data and requests the transfer control unit 14 to transmit it (step S122). The transfer control unit 14 of which the transmission has been requested specifies a transfer destination and notifies the USB device 97 of the print data by the bulk-out transfer (step S123). The notified print data is transmitted to the PDL discrimination processing unit 30 by the transfer control unit 27 (step S124). If the application 11 wants to download the font data onto the HDD 94, a downloading request is made to the IEEE1284.4 driver 84 (step S125).

Subsequently, the IEEE1284.4 driver 84 packetizes the downloaded data in response to the downloading request and requests the transfer control unit 14 to transmit it (step S126). The transfer control unit 14 of which the transmission has been requested specifies a transfer destination and notifies the USB device 96 of the downloaded data with the IEEE1284.4 packet by the bulk-out transfer (step S127). The printer 91 of which the downloading of the font data has been requested removes the IEEE1284.4 packet and downloads the data onto the HDD 94 (step S128).

After that, the IEEE1284.4 driver 84 requests the transfer control unit 14 to read information of a result showing whether the downloading has normally been finished or not (step S129). In response to the permission of the transfer of the reverse data, the printer 91 transfers the downloading result information of the HDD 94 to the host 90 by the bulk-in transfer (step S130).

The transfer control unit 14 receives the downloading result information of the HDD 94, transfers the data to the application 11, and displays the downloading result information of the HDD 94 (step S131).

Since a host data transmitting process which is used in common when the host 90 transmits the data to the printer 91, a print data receiving process which is used in common when the notified data is received from the host 90, a device identifying process, a port registering process, and a process of the receiving function for the setup process are similar to those in the first embodiment, their description is omitted.

By making the device which handles the normal print data and the device which handles the data with the packet different as mentioned above in the second embodiment, the normal data and the packet data can be easily handled.

The third embodiment of the invention will now be described. Component elements having the same structure as those in the first and second embodiments are designated by the same reference numerals and their description is omitted.

Figure 24:
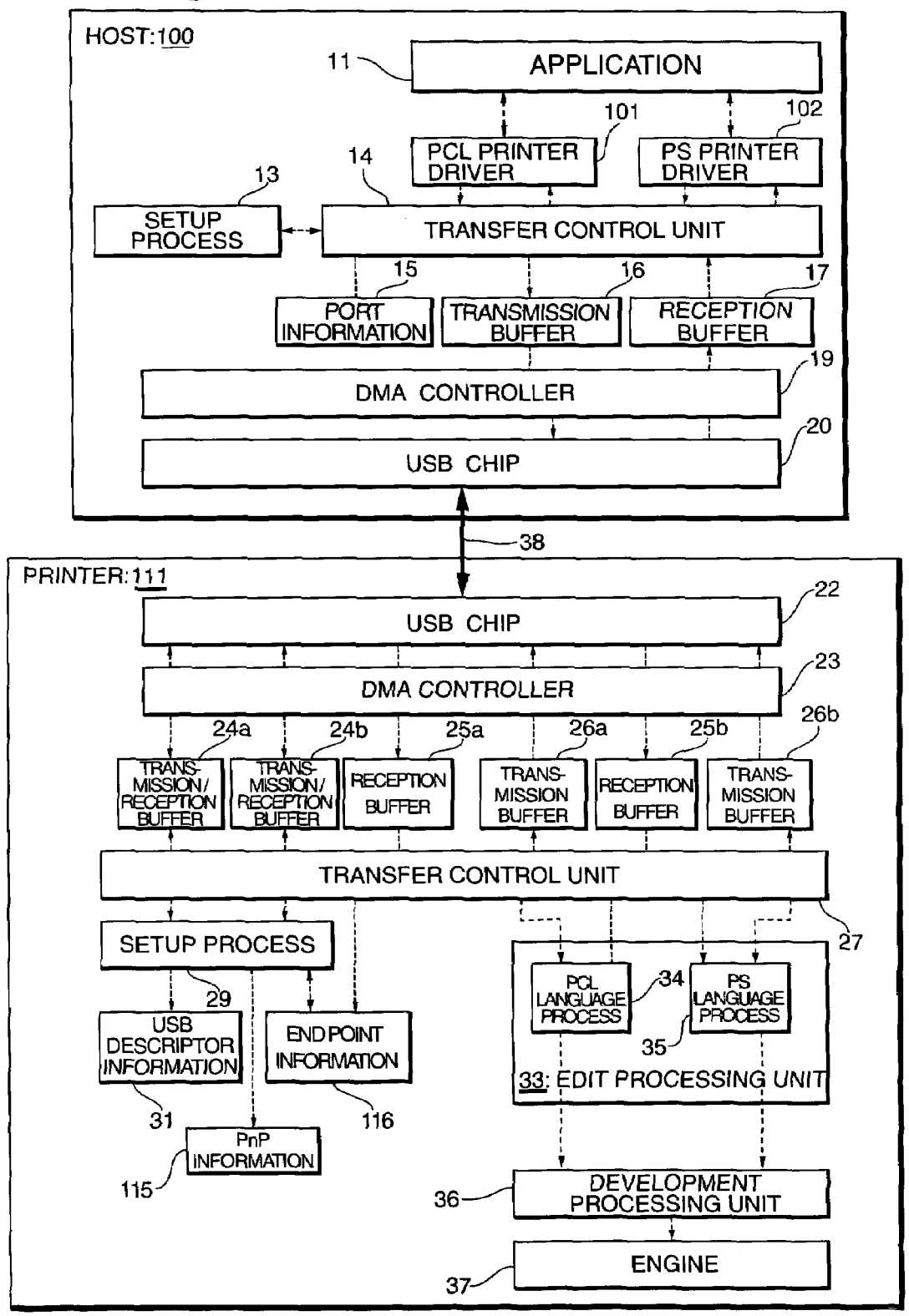
FIG. 24 is a schematic diagram of a printer system in the third embodiment of the invention.

FIG. 24 is a schematic diagram of a printer system in the third embodiment of the invention.

Although the printer driver 12 and the printer control driver 61 have been provided for the host 60 (FIG. 1) in the first embodiment, in the third embodiment as shown in FIG. 24, in place of the printer driver 12 and the printer control driver 61, a PCL printer driver 101 which handles PCL data and a PS printer driver 102 are provided for the host 100.

Although the printer control process 72 and the PDL discrimination processing unit 30 have been provided for the printer 71 in the first embodiment, in the third embodiment, the printer control process 72 and the PDL discrimination processing unit 30 are omitted from a printer 111, the PCL language processing unit 34 is associated with the reception buffer 25a and the transmission buffer 26a, and the PS language processing unit 35 is associated with the reception buffer 25b and the transmission buffer 26b, respectively.

Contents of PnP information 115 and end point information 116 are different from those in the first embodiment.

Subsequently, a construction of the USB chip 22 of the printer 111 will be described.

Figure 25:
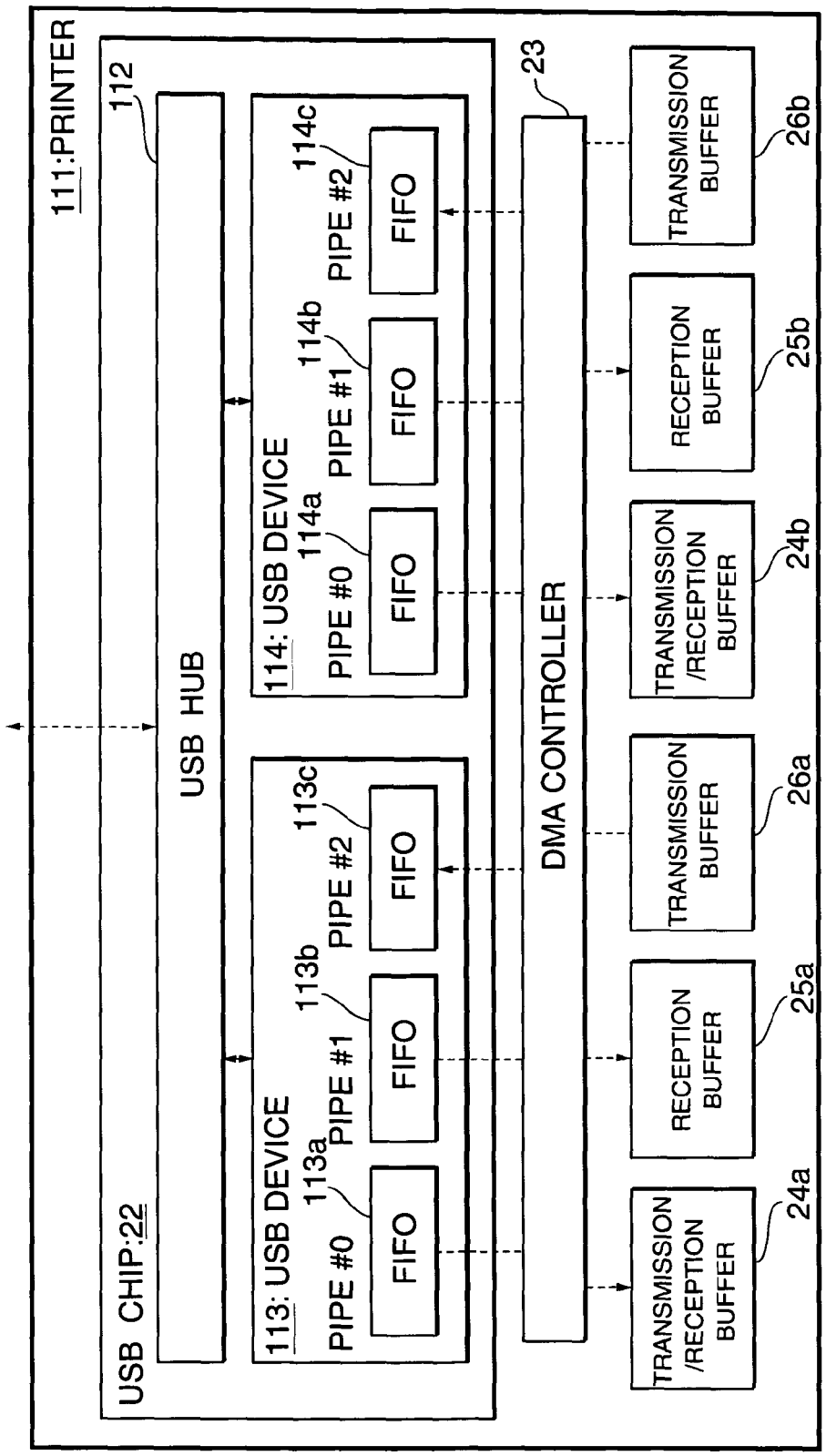
FIG. 25 is a diagram showing a structure of a USB chip in the third embodiment of the invention.

FIG. 25 is a diagram showing a structure of the USB chip in the third embodiment of the invention.

As shown in FIG. 25, the USB chip 22 on the printer 111 has USB devices 113 and 114 and a USB hub 112 having a function for expanding those two USB devices 113 and 114.

The USB device 113 has: an FIFO 113a as a queue for data storage associated with the transmission/reception buffer 24a for transmitting/receiving the data of the setup process 29; an FIFO 113b associated with the reception buffer 25a for receiving the data of the PCL language processing unit 34; and an FIFO 113c associated with the transmission buffer 26a for transmitting the data of the PCL language processing unit 34.

The USB device 114 has: an FIFO 114a associated with the transmission/reception buffer 24b for transmitting/receiving the data of the setup process 29; an FIFO 114b associated with the reception buffer 25b for receiving the data of the PS language processing unit 35; and an FIFO 114c associated with the transmission buffer 26b for transmitting the data of the PS language processing unit 35.

Subsequently, a construction of the PnP information 115 will be described.

Figure 26:
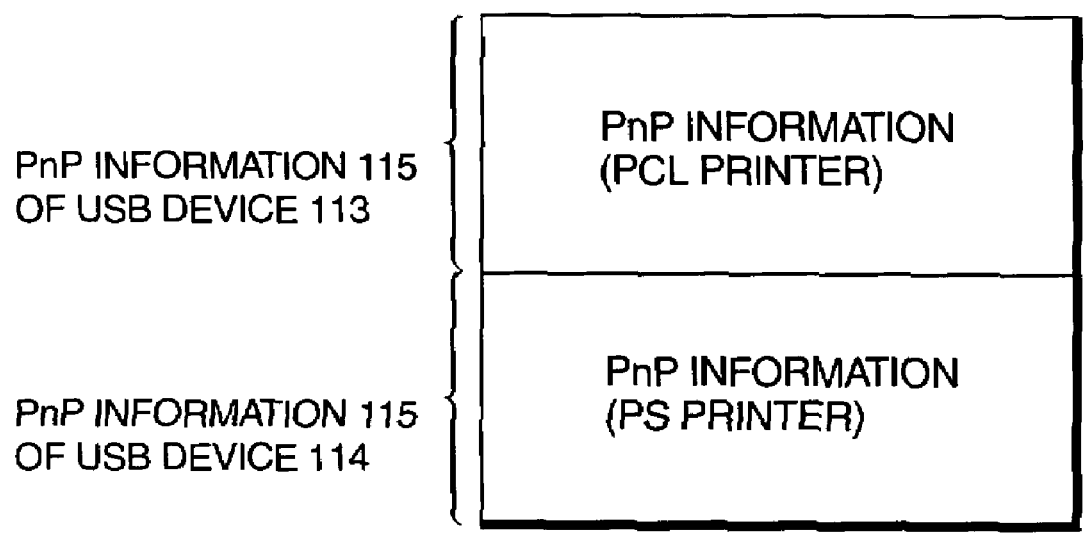
FIG. 26 is a diagram showing a construction of PnP information in the third embodiment of the invention.

FIG. 26 is a diagram showing the construction of the PnP information in the third embodiment of the invention.

As shown in FIG. 26, in the embodiment, the PnP information 115 is constructed by: the PnP information 115 of the PCL printer for the USB device 113; and the PnP information 115 of the PS printer for the USB device 114.

Subsequently, a construction of the end point information 116 will be described.

Figure 27:
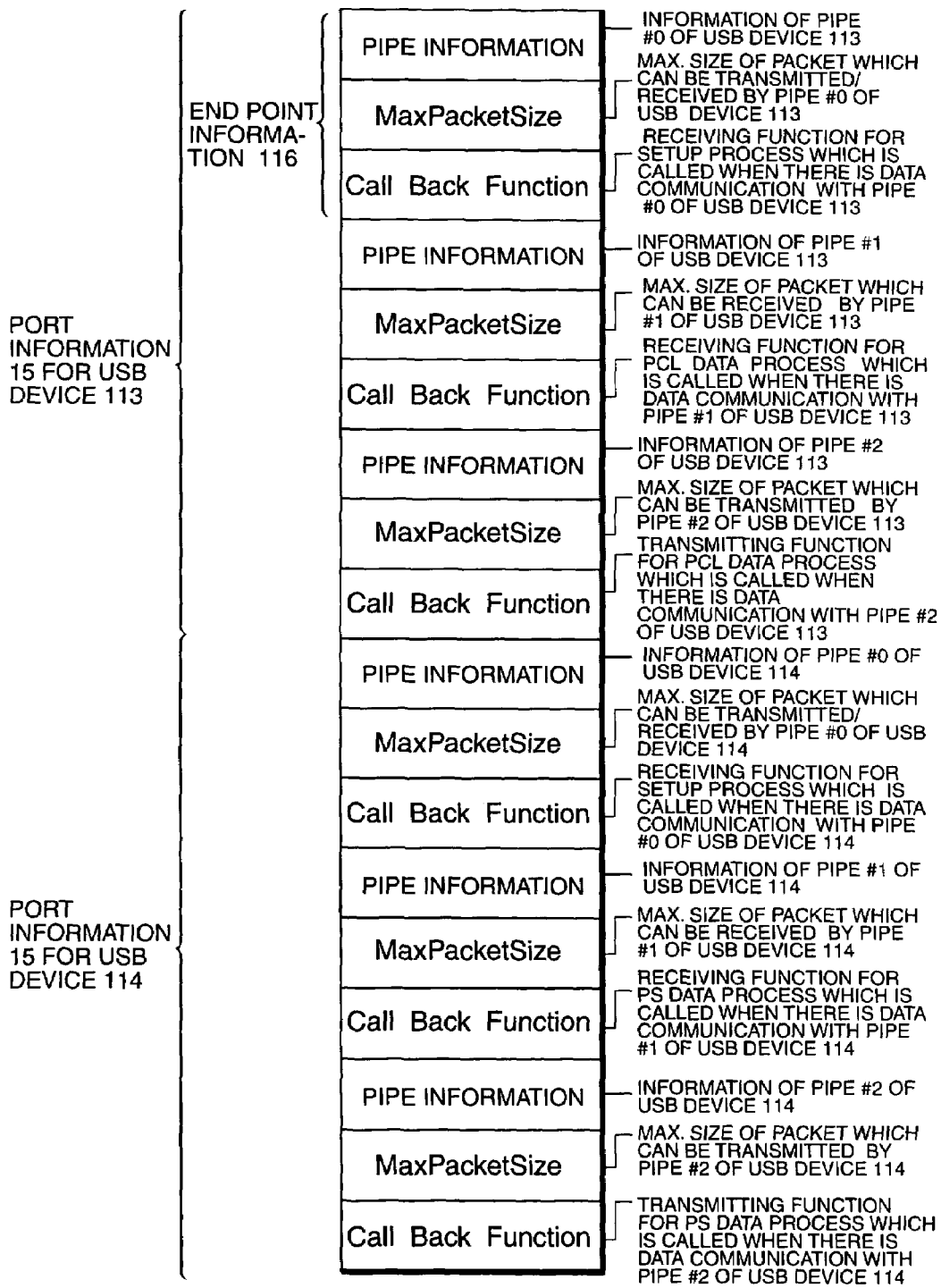
FIG. 27 is a diagram showing a construction of end point information in the third embodiment of the invention.

FIG. 27 is a diagram showing the construction of the end point information in the third embodiment of the invention.

As shown in FIG. 27, in the embodiment, in the end point information 116, "Call Back Function" information of a pipe #1 for the USB device 113 is a receiving function for the PCL language processing unit 34 and "Call Back Function" information of a pipe #2 is a transmitting function for the PCL language processing unit 34. "Call Back Function" information of a pipe #1 for the USB device 114 is a receiving function for the PS language processing unit 35 and "Call Back Function" information of a pipe #2 is a transmitting function for the PS language processing unit 35.

When data is received, transmitting/receiving processes prepared by the PCL language processing unit 34 and the PS language processing unit 35 can be notified of the data.

Since the port information 15 and the USB descriptor information 31 in the third embodiment are similar to those in the first embodiment, they will be explained also with reference to FIGS. 6 and 7.

Subsequently, the operation of the USB data transfer in the printer system with the foregoing construction will be described.

Figure 28:
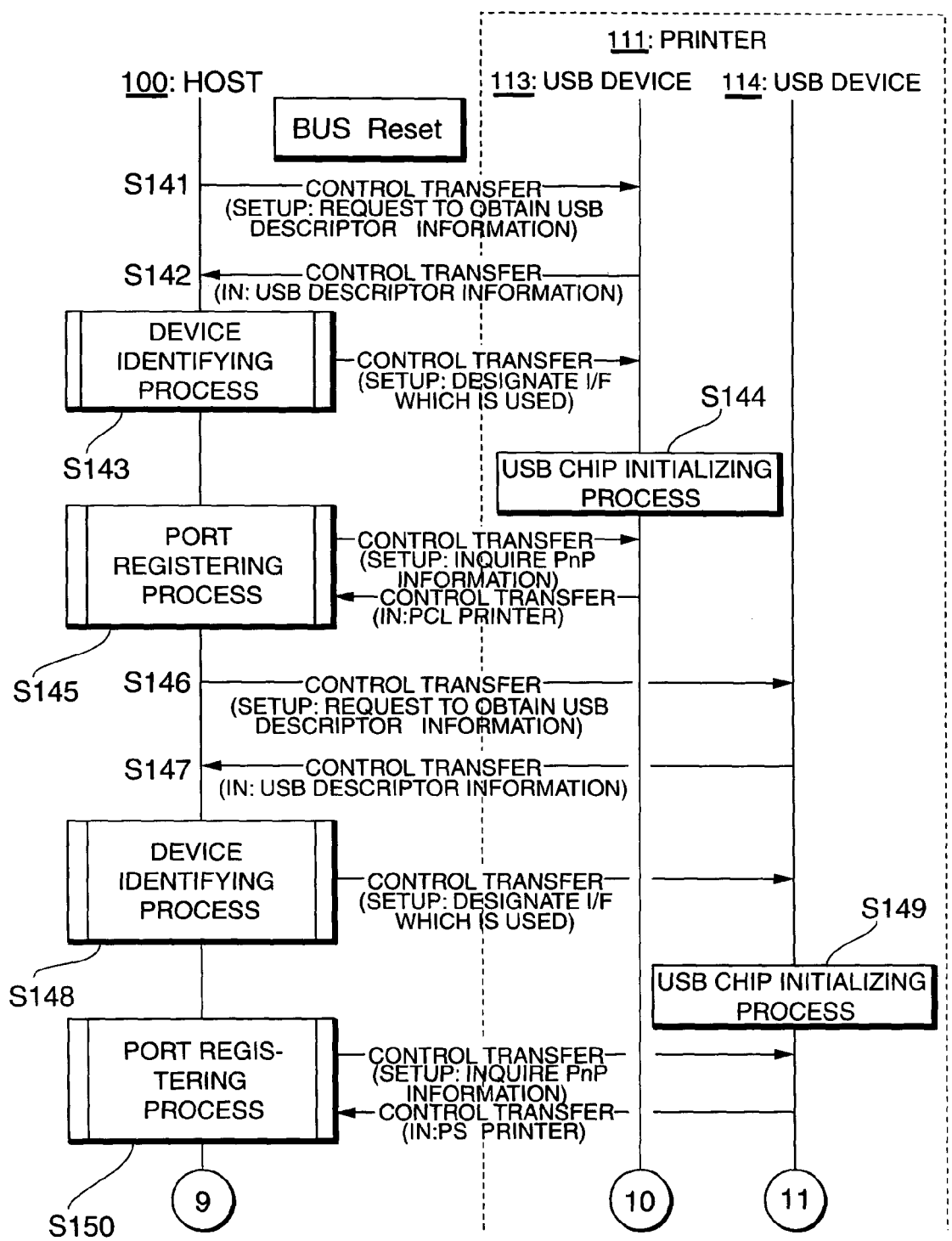
FIG. 28 is a first flowchart showing the operation of USB data transfer in the printer system in the third embodiment of the invention.
Figure 29:
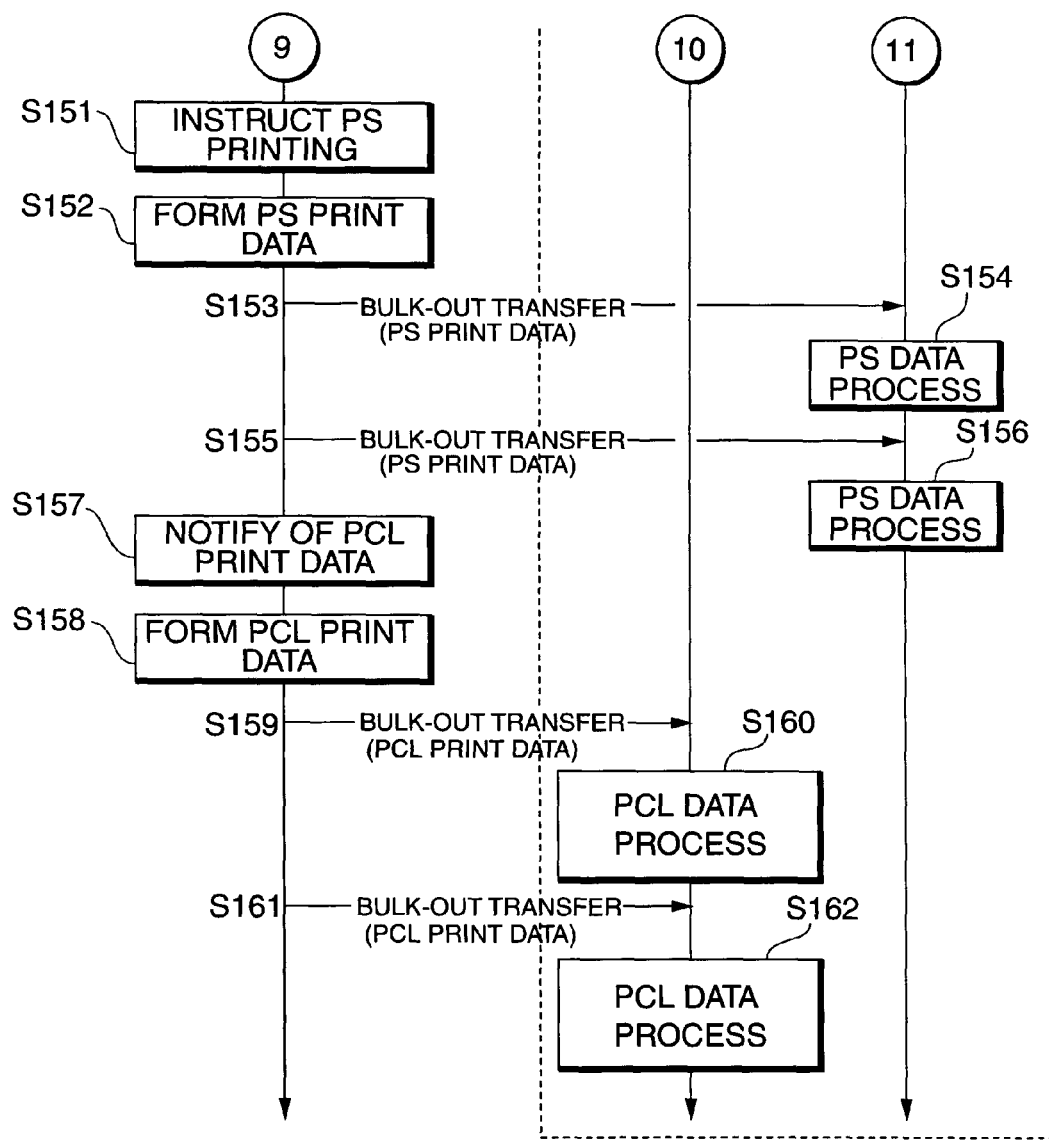
FIG. 29 is a second flowchart showing the operation of USB data transfer in the printer system in the third embodiment of the invention.

FIG. 28 is a first flowchart showing the operation of the USB data transfer in the printer system in the third embodiment of the invention. FIG. 29 is a second flowchart showing the operation of the USB data transfer in the printer system in the third embodiment of the invention.

First, when the bus reset is detected, the setup process 13 of a host 100 inquires of the USB device 113 about the USB descriptor information 31 by using the control transfer (step S141). Thus, in response to the inquiry about the USB descriptor information 31 from the host 100, the USB device 113 returns the USB descriptor information 31 prepared for the USB device 113 to the host 100 by using the control transfer (step S142). The setup process 13 of the host 100 recognizes device information of the connected device and a supporting state of the transfer means by the obtained USB descriptor information 31, determines the interface which is used, and notifies the printer 111 of the ID information of the interface which is used (step S143).

Subsequently, the setup process 29 of the printer 111 sets the USB device 113 by the notified interface ID information (step S144). After that, the transfer control unit 14 obtains the PnP information 115 prepared for the PCL language processing unit 34 in the USB device 113 from the printer 111 by using the control transfer and registers the port information 15. If the driver which coincides with the registered port information 15 does not exist, the user is notified that the new device has been detected (step S145). The setup process 13 of the host 100 inquires of the USB device 114 about the USB descriptor information 31 by using the control transfer (step S146). In response to the inquiry about the USB descriptor information 31 from the host 100, the USB device 114 returns the USB descriptor information 31 prepared for the USB device 114 to the host 100 by using the control transfer (step S147).

Subsequently, the setup process 13 of the host 100 recognizes the device information of the connected device and the supporting state of the transfer means by the obtained USB descriptor information 31, determines the interface which is used, and notifies the printer 111 of the ID information of the interface which is used (step S148). The setup process 29 on the printer 111 sets the USB device 114 by the notified interface ID information (step S149). After that, the transfer control unit 14 obtains the PnP information 115 prepared for the PS language processing unit 35 in the USB device 114 from the printer 111 by using the control transfer and registers the port information 15. If the driver which coincides with the registered port information 15 does not exist, the user is notified that the new device has been detected (step S150).

Subsequently, the application 11 to which the printing has been instructed by the user instructs the PS printer driver 102 to print (step S151). The PS printer driver 102 to which the printing has been instructed forms print data for the PS language and requests the transfer control unit 14 to transmit it (step S152). The transfer control unit 14 of which the transmission has been requested specifies a transfer destination and notifies the USB device 114 of the print data by the bulk-out transfer (step S153). The notified print data is transmitted to the PS language processing unit 35 by the transfer control unit 27 (step S154). The application 11 to which the printing has been instructed by the user instructs the PCL printer driver 101 to print (step S155).

Subsequently, the PCL printer driver 101 to which the printing has been instructed forms print data for a PCL language and requests the transfer control unit 14 to transmit it (step S156). The transfer control unit 14 of which the transmission has been requested specifies a transfer destination and notifies the USB device 113 of the print data by the bulk-out transfer (step S157). The notified print data is transmitted to the PCL language processing unit 34 by the transfer control unit 27 (step S158).

Since a host data transmitting process which is used in common when the host 100 transmits the data to the printer 111, a print data receiving process which is used in common when the notified data is received from the host 100, a device identifying process, a port registering process, and a process of the receiving function for the setup process are similar to those in the first embodiment, their description is omitted.

Since the PCL printer driver 101 and the PS printer driver 102 can be handled as different devices as mentioned above in the embodiment, the data can be transmitted/received to/from each PDL without executing a surplus language discriminating process and throughput can be improved.

Also when a new PDL language is added, since there is no need to add a complicated language discriminating process, transportability of the PDL can be improved.

The fourth embodiment of the invention will now be described. Component elements having the same structure as those in the first to third embodiments are designated by the same reference numerals and their description is omitted.

Figure 30:
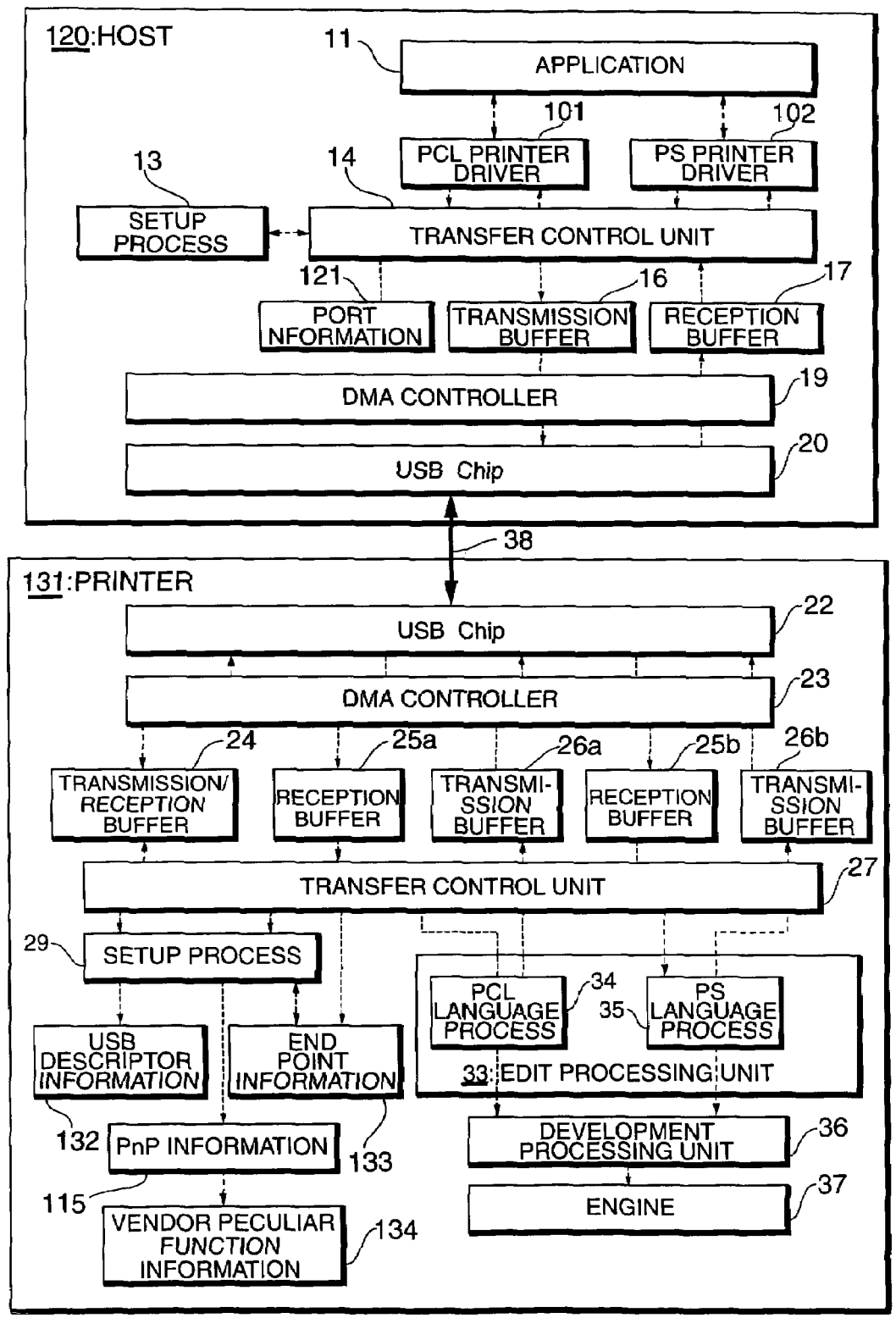
FIG. 30 is a schematic diagram of a printer system in the fourth embodiment of the invention.

FIG. 30 is a schematic diagram of a printer system in the fourth embodiment of the invention.

As shown in FIG. 30, in a host 120, contents which are managed by port information 121 are different from those in the third embodiment.

In a printer 131, contents of USB descriptor information 132 and end point information 133 are different from those in the third embodiment and vendor peculiar function information 134 is added to the third embodiment.

Further, since one USB device 135, which will be explained hereinlater, is merely installed in the USB chip 22, it is sufficient to also use one transmission/reception buffer 24 for the setup process 29.

Subsequently, a construction of the USB chip 22 of the printer 131 will be described.

Figure 31:
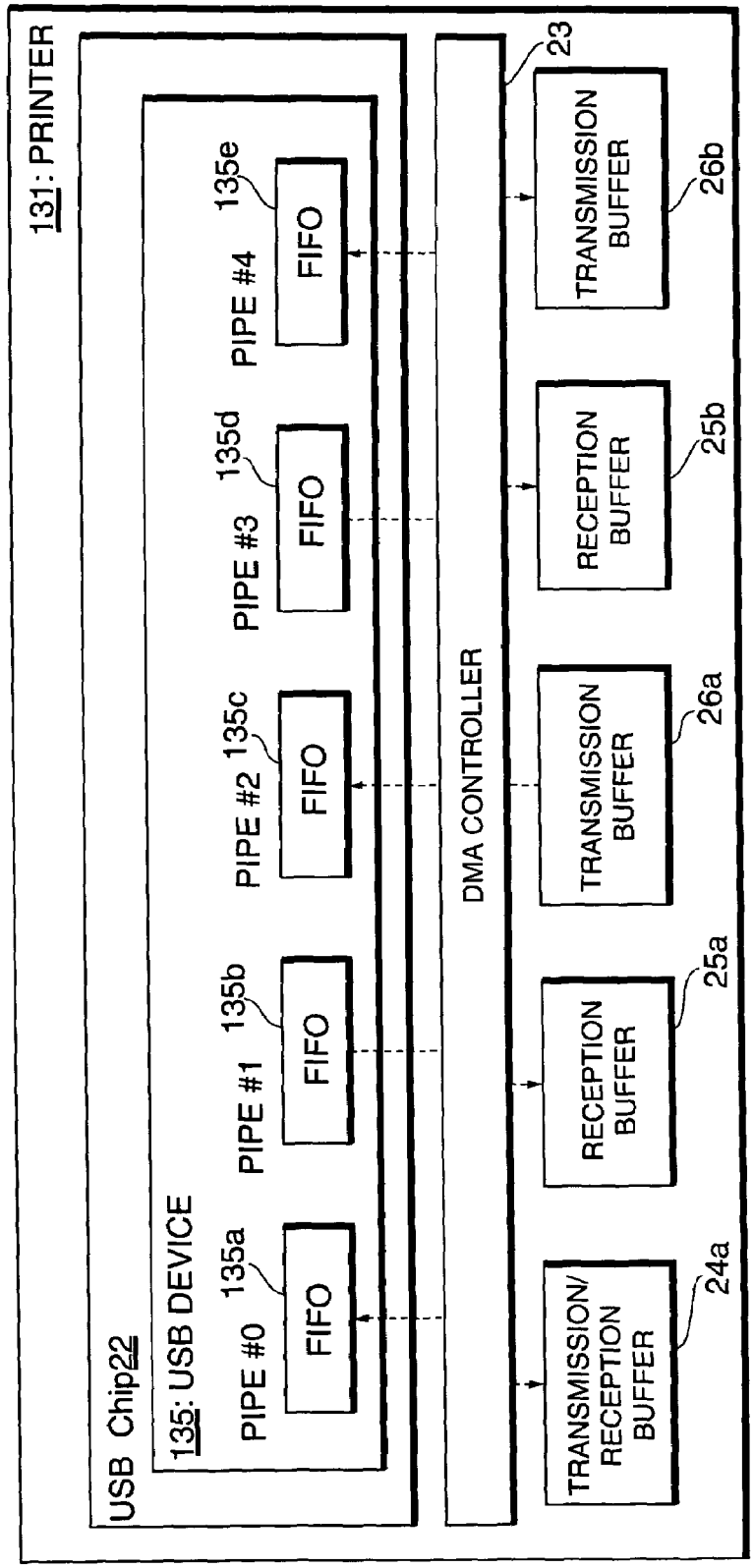
FIG. 31 is a diagram showing a structure of a USB chip in the fourth embodiment of the invention.

FIG. 31 is a diagram showing a structure of the USB chip in the fourth embodiment of the invention.

As shown in FIG. 31, the USB chip 22 on the printer 131 has only the USB device 135.

The USB device 135 has: an FIFO 135a as a queue for data storage associated with the transmission/reception buffer 24a for transmitting/receiving the data of the setup process 29; an FIFO 135b associated with the reception buffer 25a for receiving the data of the PCL language processing unit 34; an FIFO 135c associated with the transmission buffer 26a for transmitting the data of the PCL language processing unit 34; an FIFO 135d associated with the reception buffer 25b for receiving the data of the PS language processing unit 35; and an FIFO 135e associated with the transmission buffer 26b for transmitting the data of the PS language processing unit 35.

Subsequently, a construction of the port information 121 will be described.

FIG. 32 is a diagram showing a construction of the port information in the fourth embodiment of the invention.

As shown in FIG. 32, although the port information 121 has a format similar to that in the first embodiment, the port information is not constructed every USB device but a plurality of port information is formed for one USB device 135.

For example, when two functions have been installed in the USB device 135, an end address of a port No. 10 can be constructed by end points #0, #1, and #2 of the USB device 135 and an end address of a port No. 11 can be also constructed by end points #0, #3, and #4 of the USB device 135.

Subsequently, a construction of the USB descriptor information 132 in the printer 131 will be described.

Figure 33:
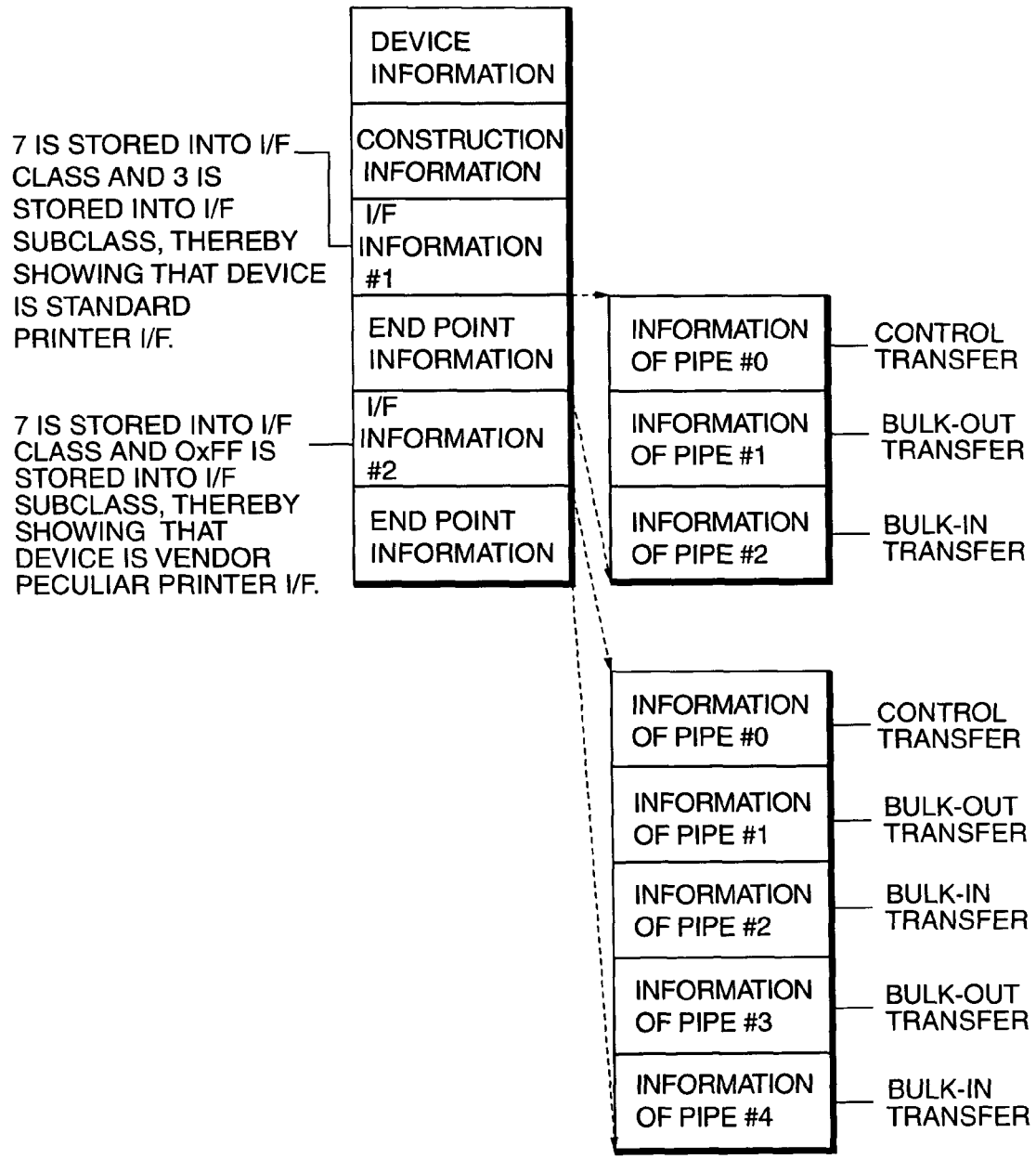
FIG. 33 is a diagram showing a construction of USB descriptor information in the fourth embodiment of the invention.

FIG. 33 is a diagram showing the construction of the USB descriptor information in the fourth embodiment of the invention.

As shown in FIG. 33, the USB descriptor information 132 is constructed by: as end point information, standard printer interface information #1 for supporting one control transfer, one bulk-out transfer, and one bulk-in transfer; and vendor peculiar interface information #2 for supporting one control transfer, two bulk-out transfers, and two bulk-in transfers.

A vendor peculiar interface sets device class information in the vendor peculiar interface information #2 to a printer class and stores 0xFF as vendor peculiar subclass information as a device subclass.

Subsequently, a construction of the vendor peculiar function information 134 will be described.

Figure 34:
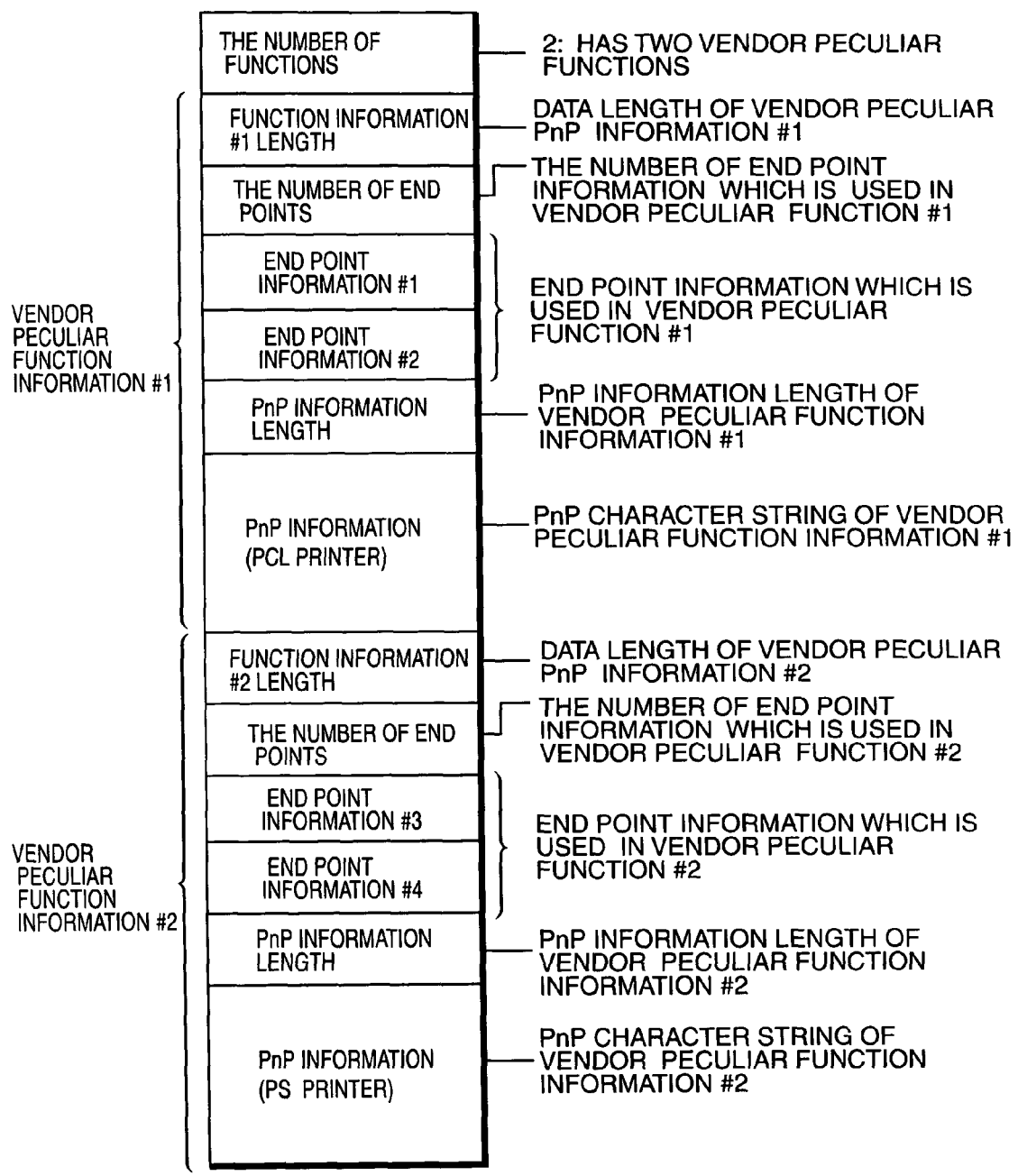
FIG. 34 is a diagram showing a construction of vendor peculiar function information in the fourth embodiment of the invention.

FIG. 34 is a diagram showing the construction of the vendor peculiar function information in the fourth embodiment of the invention.

As shown in FIG. 34, the vendor peculiar function information 134 is constructed by: the number of functions which are supported by the vendor; a data length of the function information; the number of end points which are used by the function; end point information which is used by the function; a data length of the PnP information 115 in the function; and PnP character string information of the function.

In the embodiment, information regarding a PCL printer is stored as function information #1 and information regarding a PS printer is stored as function information #2.

Subsequently, a construction of the end point information 133 will be described.

FIG. 35 is a diagram showing the construction of the end point information in the fourth embodiment of the invention.

As shown in FIG. 35, the end point information 133 is only the information for one USB device 135, "Call Back Function" information of a pipe #1 comprises a receiving function for the PCL language, "Call Back Function" information of a pipe #2 comprises a transmitting function for the PCL language, "Call Back Function" information of a pipe #3 comprises a receiving function for the PS language, and "Call Back Function" information of a pipe #4 comprises a transmitting function for the PS language, respectively.

Since the PnP information 115 in the fourth embodiment is similar to that in the third embodiment, it will be explained also with reference to FIG. 26.

Subsequently, the operation of the USB data transfer in the printer system with the foregoing construction will be described.

Figure 36:
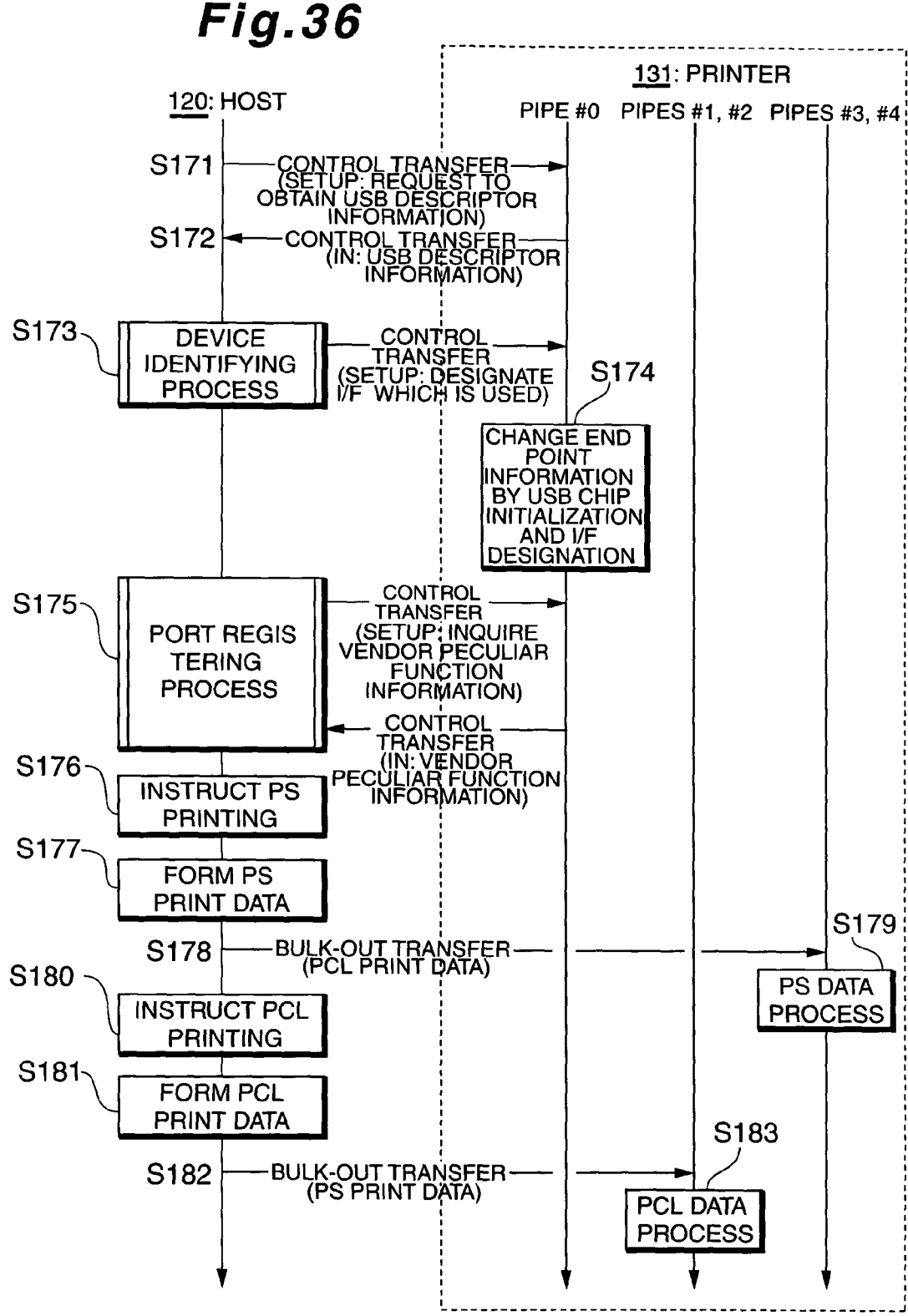
FIG. 36 is a flowchart showing the operation of USB data transfer in the printer system in the fourth embodiment of the invention.

FIG. 36 is a flowchart showing the operation of the USB data transfer in the printer system in the fourth embodiment of the invention. In the embodiment, explanation will be made on the assumption that the vendor peculiar interface is selected.

First, when the bus reset is detected, the setup process 13 of the host 120 inquires of the USB device 135 about the USB descriptor information 132 by using the control transfer (step S171). Thus, in response to the inquiry about the USB descriptor information 132 from the host 120, the USB device 135 returns the USB descriptor information 132 to the host 120 by using the control transfer (step S172). The setup process 13 of the host 120 recognizes device information of the connected device and a supporting state of the transfer means by the obtained USB descriptor information 132, and if the vendor peculiar interface is supported, the setup process 13 notifies the printer 131 of the vendor peculiar interface ID information (step S173).

Subsequently, the setup process 29 of the printer 131 sets the USB device 135 by the notified interface ID information (step S174). The transfer control unit 14 obtains the vendor peculiar function information 134 from the printer 131 by using the control transfer and registers the port information 121. If the driver which coincides with the registered port information 121 does not exist, the user is notified that the new device has been detected (step S175). After that, the application 11 to which the printing has been instructed by the user instructs the PS printer driver 102 to print (step S176). The PS printer driver 102 to which the printing has been instructed forms the print data for the PS language and requires the transfer control unit 14 to transmit it (step S177). The transfer control unit 14 of which the transmission has been required specifies a transfer destination and notifies the pipe #3 of the USB device 135 of the print data by the bulk-out transfer (step S178).

Subsequently, the notified print data is sent to the PS language processing unit 35 by the transfer control unit 27 (step S179). After that, the application 11 to which the printing has been instructed by the user instructs the PCL printer driver 101 to print (step S180). The PCL printer driver 101 to which the printing has been instructed forms the print data for the PCL language and requires the transfer control unit 14 to transmit it (step S181). The transfer control unit 14 of which the transmission has been required specifies a transfer destination and notifies the pipe #1 of the USB device 135 of the print data by the bulk-out transfer (step S182). The notified print data is sent to the PCL language processing unit 34 by the transfer control unit 27 (step S183).

Subsequently, a subroutine of the device identifying process in step S173 in FIG. 36 will be described.

Figure 37:
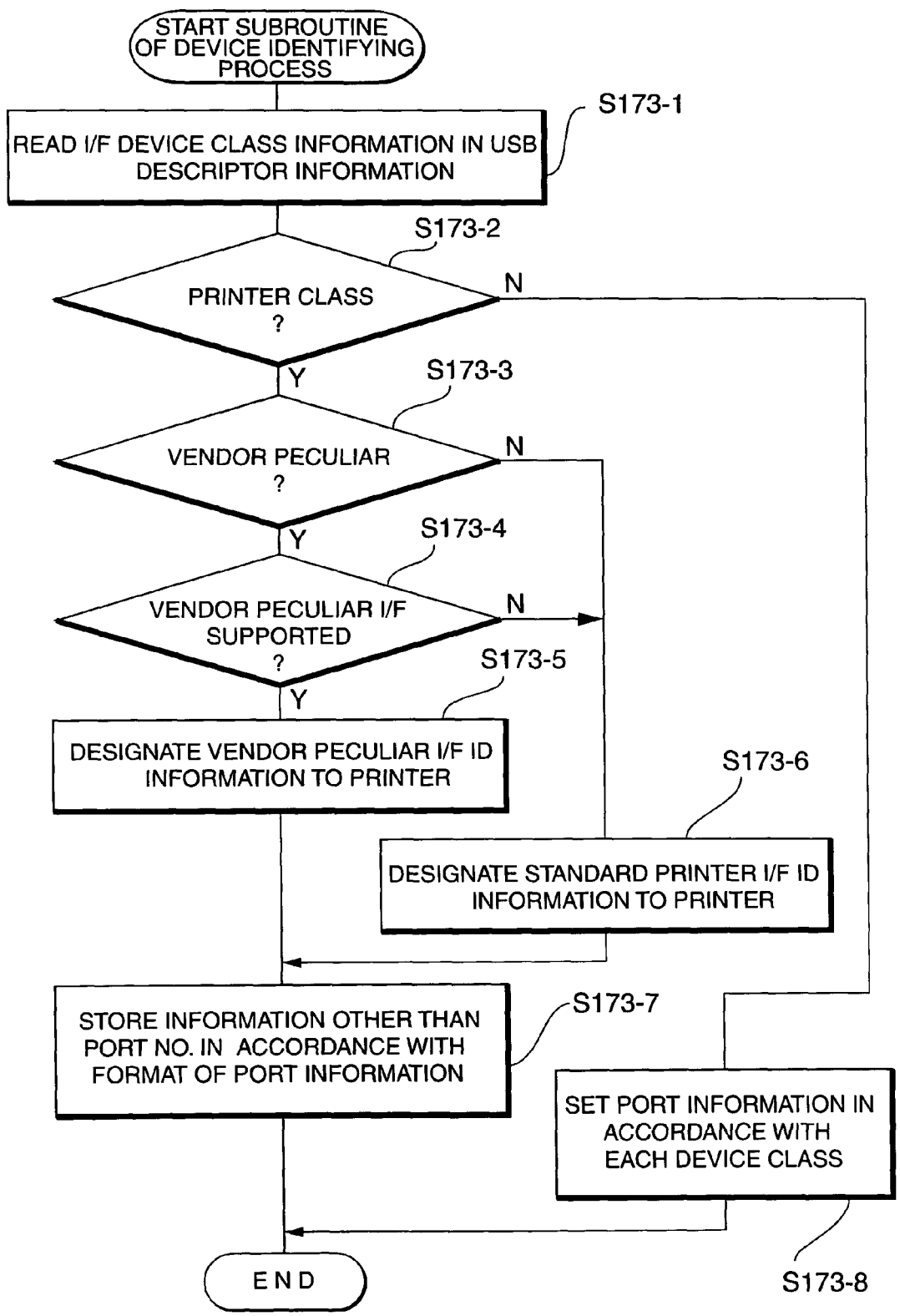
FIG. 37 is a flowchart showing a subroutine of a device identifying process in the fourth embodiment of the invention.

FIG. 37 is a flowchart showing the subroutine of the device identifying process in the fourth embodiment of the invention.

First, the setup process 13 of the host 120 reads the interface device class information from the USB descriptor information 132 (step S173-1). Whether the interface device class information is the printer class or not is discriminated (step S173-2). If the interface device class information is the printer class, whether the subclass information is the vendor peculiar information or not is discriminated from the obtained USB descriptor information 132 (step S173-3). If the subclass information is the vendor peculiar information, whether the transfer control unit 27 supports the vendor peculiar interface or not is discriminated (step S173-4). If it supports the vendor peculiar interface, the interface to be selected is determined to be the vendor peculiar interface and the vendor peculiar interface ID information is transmitted by the control transfer in order to notify the printer 131 that the vendor peculiar interface has been selected (step S173-5).

As mentioned above, whether the subclass information is the vendor peculiar information or not is discriminated from the obtained USB descriptor information 132, and if the subclass information is not the vendor peculiar information, whether the transfer control unit 27 supports the vendor peculiar interface or not is discriminated. If it does not support the vendor peculiar interface, the interface to be selected is determined to be a standard printer class interface and the standard printer class interface ID information is transmitted by the control transfer in order to notify the printer 131 that the standard printer class interface has been selected (step S173-6). Data other than port number information is stored into the port information 121 in a predetermined format (step S173-7) and the processing routine is finished.

As mentioned above, whether the interface device class information is the printer class or not is discriminated and if the interface device class information is not the printer class, the data is stored into the port information 15 in a predetermined format in accordance with each device class (step S173-8). The processing routine is finished.

Subsequently, a subroutine of the port registering process in step S175 in FIG. 36 will be described.

Figure 38:
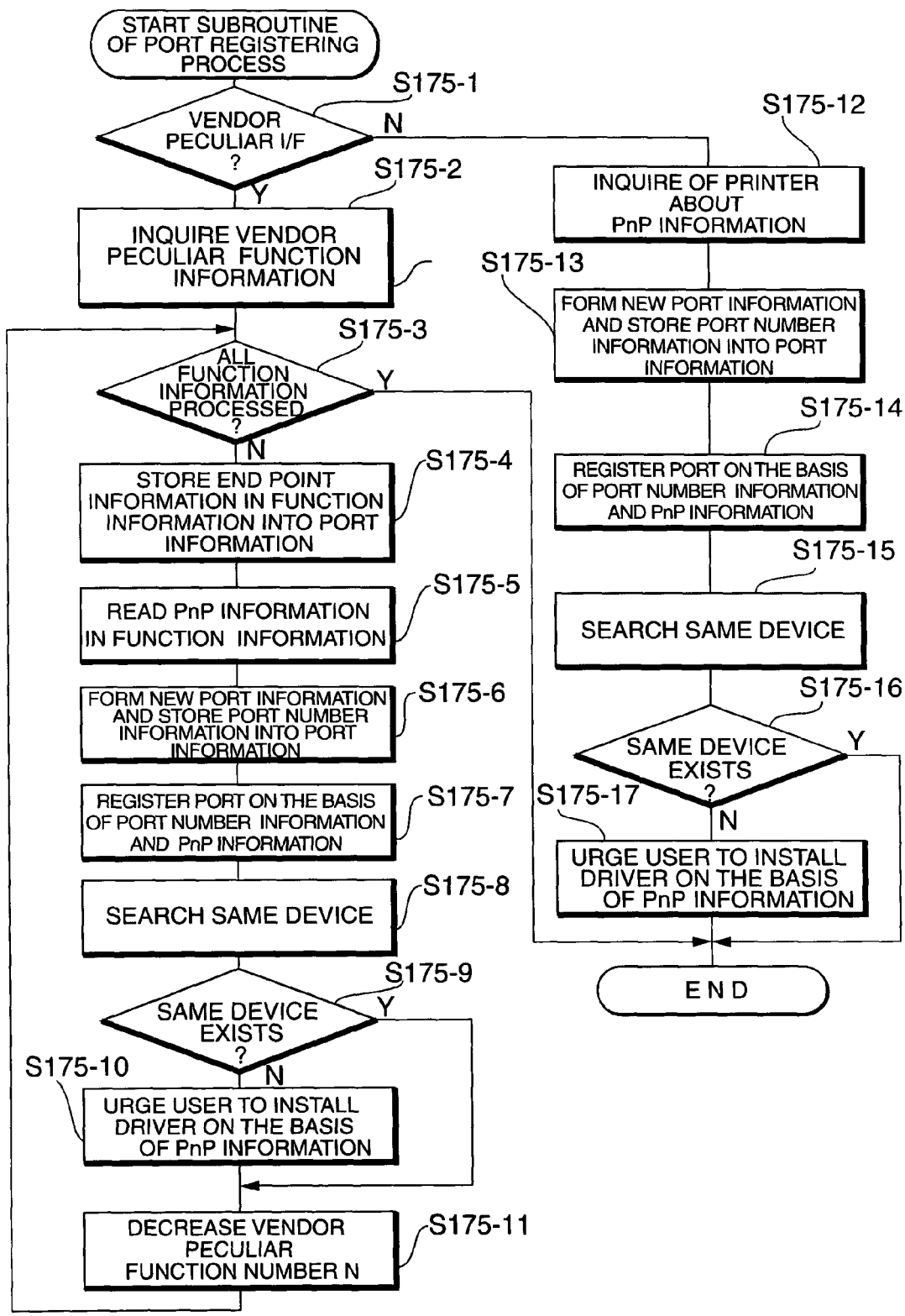
FIG. 38 is a flowchart showing a subroutine of a port registering process in the fourth embodiment of the invention.

FIG. 38 is a flowchart showing the subroutine of the port registering process in the fourth embodiment of the invention.

First, the transfer control unit 14 of the host 120 discriminates whether the vendor peculiar interface has been selected or not (step S175-1). If the vendor peculiar interface has been selected, the transfer control unit 14 inquires of the printer 131 about the vendor peculiar function information 134 (step S175-2). Whether the function information as many as the number of functions in the obtained vendor peculiar function information 134 has been processed or not is discriminated (step S175-3). If the function information as many as the number of functions has been processed, the processing routine is finished. If the function information as many as the number of functions is not processed, the end point information 133 of the function information #n in the vendor peculiar function information 134 is stored into the port information 121 (step S175-4).

Subsequently, the transfer control unit 14 specifies the PnP information 115 of the function information #n in the vendor peculiar function information 134 (step S175-5). A new port is opened and its port number information is stored into the port information 121 (step S175-6). The port information 121 is registered on the basis of the specified PnP information 115 and the formed port number information (step S175-7). Further, the registered ports are searched to discriminate whether the same device information already exists or not (step S175-8).

Subsequently, the transfer control unit 14 discriminates whether the same device exists or not (step S175-9). If the same device exists, a count value of a vendor peculiar function number counter is decreased by "1" (step S175-11). If the same device does not exist, a message for urging the user to install the driver is displayed on the basis of the registered PnP information 115 (step S175-10). After that, the count value of the vendor peculiar function number counter is decreased by "1" (step S175-11). Whether the function information as many as the number of functions in the obtained vendor peculiar function information 134 has been processed or not is discriminated again (step S175-3).

As mentioned above, whether the vendor peculiar interface has been selected or not is discriminated and if the vendor peculiar interface is not selected, the printer 131 is inquired of about the PnP information 115, thereby obtaining the PnP information 115 (step S175-12). A new port is opened and its port number information is stored into the port information 121 (step S175-13). Further, the port information 121 is registered on the basis of the obtained PnP information 115 and the formed port number information (step S175-14). The registered ports are searched to discriminate whether the same device information already exists or not (step S175-15).

Subsequently, the transfer control unit 14 discriminates whether the same device exists or not (step S175-16). If the same device exists, the processing routine is finished. If the same device does not exist, a message for urging the user to install the driver is displayed on the basis of the PnP information 115 (step S175-17). The processing routine is finished.

Subsequently, the operation of the receiving function "Call Back Function" for the setup process will be described.

Figure 39:
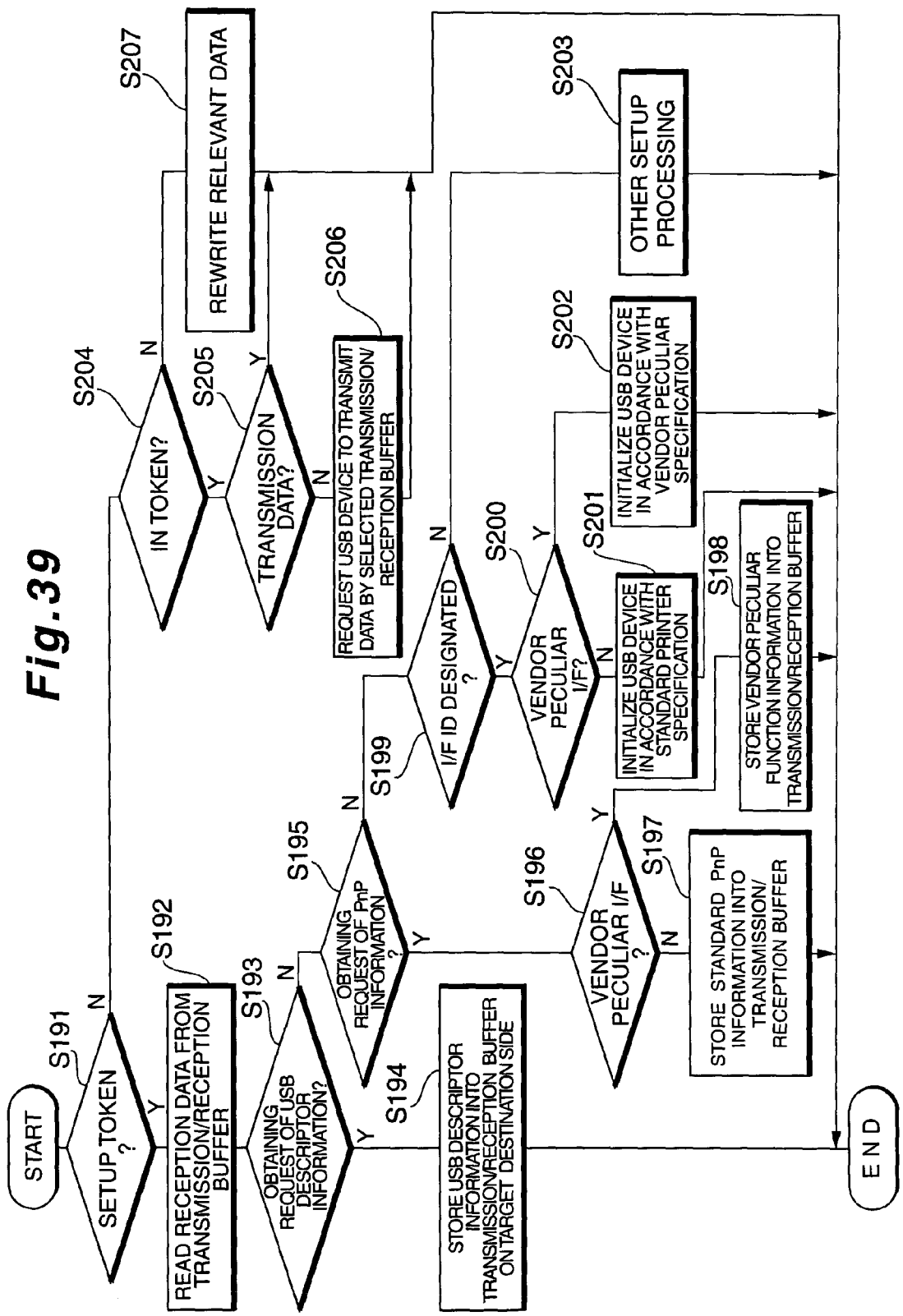
FIG. 39 is a flowchart showing the operation of a receiving function for a setup process in the fourth embodiment of the invention.

FIG. 39 is a flowchart showing the operation of the receiving function for the setup process in the fourth embodiment of the invention.

In this case, as a receiving function for the setup process in the fourth embodiment, a process for discriminating set interface information from the host 120 when there is a request for obtaining the PnP information is added to the receiving function for the setup process in the first embodiment. A process for storing the vendor peculiar function information 134 into the transmission/reception buffer 24 in the case where the set interface is the vendor peculiar interface is added. Further, a process for discriminating the set interface information from the host 120 when a set interface ID is designated by the host 120 and an initializing process of the USB device according to the vendor peculiar specification when the interface is the vendor peculiar interface are added.

The setup process 13 which received the reception notification discriminates whether it is the SETUP token or not (step S191). If it is the SETUP token, the reception data is read out from the transmission/reception buffer 24 (step S192). Whether the reception data is a request for obtaining the USB descriptor information 132 or not is discriminated (step S193). If it is the obtaining request of the USB descriptor information 132, the USB descriptor information 132 is stored into the transmission/reception buffer 24 on a target destination side (step S194) and the processing routine is finished.

If it is not the obtaining request of the USB descriptor information 132, whether the reception data is a request for obtaining the PnP information 115 or not is discriminated (step S195). If it is the obtaining request of the PnP information 115, whether the set interface is the vendor peculiar interface or not is discriminated (step S196). If the set interface is not the vendor peculiar interface, the standard PnP information 115 is stored into the transmission/reception buffer 24 (step S197) and the processing routine is finished. If the set interface is the vendor peculiar interface, the vendor peculiar function information 134 is stored into the transmission/reception buffer 24 (step S198) and the processing routine is finished.

As mentioned above, whether the reception data is the obtaining request of the PnP information 115 or not is discriminated and if it is not the obtaining request of the PnP information 115, whether the interface ID has been designated or not is discriminated (step S199). If the interface ID is not designated, the process corresponding to another command is executed (step S203) and the processing routine is finished. If the interface ID has been designated, whether the set interface is the vendor peculiar interface or not is discriminated (step S200). If the set interface is the vendor peculiar interface, the USB device is initialized in accordance with the vendor peculiar specification (step S202) and the processing routine is finished. If the set interface is not the vendor peculiar interface, that is, if it is the standard interface, the USB device is initialized in accordance with the standard printer specification (step S201) and the processing routine is finished.

As mentioned above, whether the reception notification is the SETUP token or not is discriminated and if it is not the SETUP token, the setup process 13 which received the reception notification discriminates whether the reception notification is an IN token or not (step S204). If it is not the IN token, the data is rewritten on the basis of the read-out data (step S207) and the processing routine is finished. If it is the IN token, whether transmission data exists in the transmission/reception buffer 24 or not is discriminated (step S205). If no transmission data exists, the processing routine is finished. If the transmission data exists, the transmission data is read out from the relevant transmission/reception buffer 24 and the USB device 135 is requested to transmit the data (step S206) and the processing routine is finished.

Since a host data transmitting process which is used in common when the host 120 transmits the data to the printer 131 and a print data receiving process which is used in common when the notified data is received from the host 120 are similar to those in the first embodiment, their description is omitted.

As mentioned above, in the fourth embodiment, since the functions of the first to third embodiments can be realized without providing the hub function and a plurality of USB device functions in the USB chip 22, the costs can be reduced more than those in the first to third embodiments.

Subsequently, the fifth embodiment of the invention will be described. Component elements having the same structure as those in the first to fourth embodiments are designated by the same reference numerals and their description is omitted.

Figure 40:
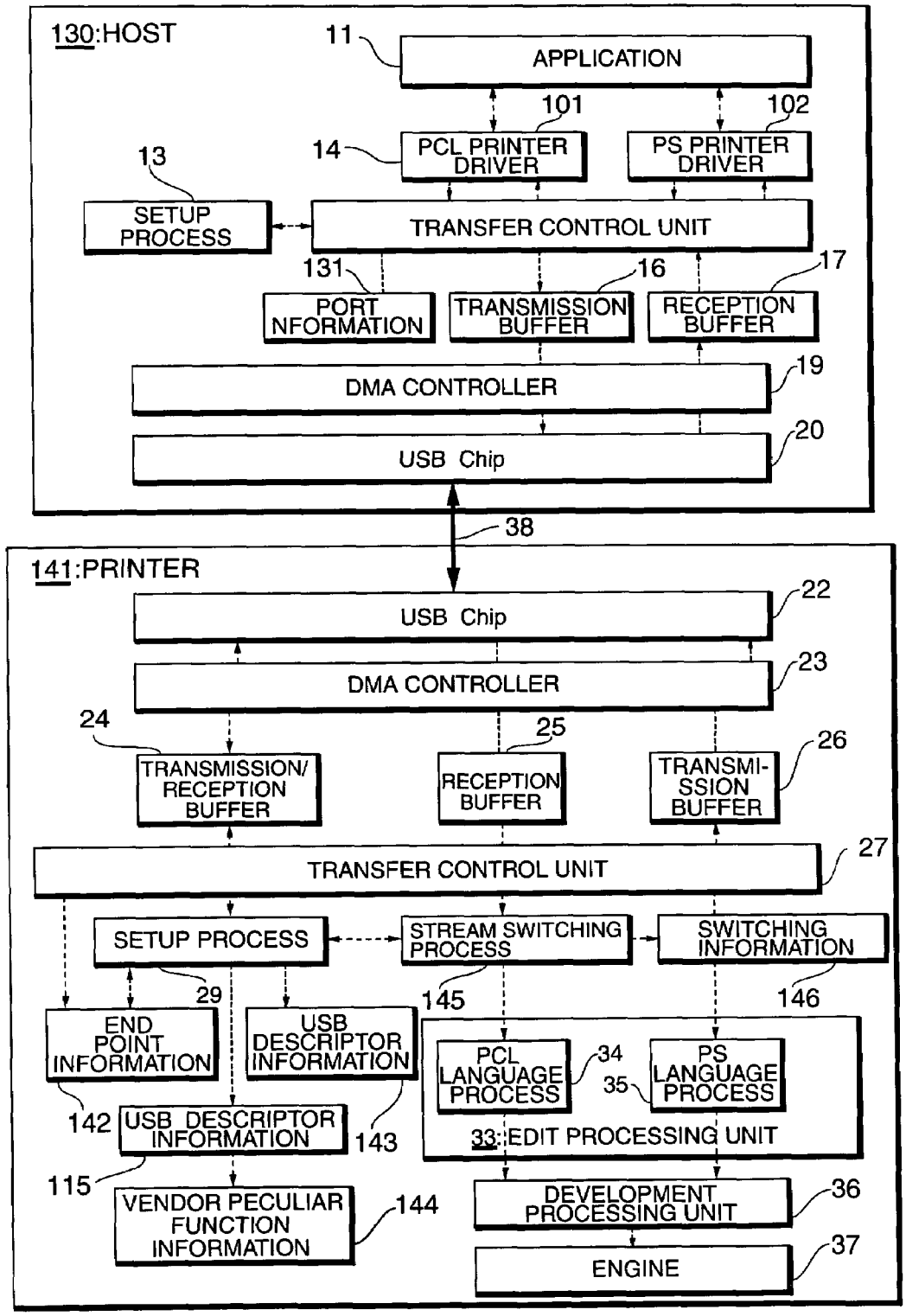
FIG. 40 is a schematic diagram of a printer system in the fifth embodiment of the invention.

FIG. 40 is a schematic diagram of a printer system in the fifth embodiment of the invention.

As shown in FIG. 40, in the host 130, contents which are managed by the port information 151 are different from those in the fourth embodiment.

In a printer 141, contents of USB descriptor information 143, end point information 142, and vendor peculiar function information 144 are different from those in the fourth embodiment.

A stream switching process 145 for distributing application data and switching information 146 are added. As buffers for transmission/reception, the printer 141 has: the transmission/reception buffer 24 for the setup process 29; a reception buffer 25 for the stream switching process 145; and a transmission buffer 26 for the stream switching process 145.

Subsequently, a construction of the USB chip 22 of the printer 141 will be described.

Figure 41:
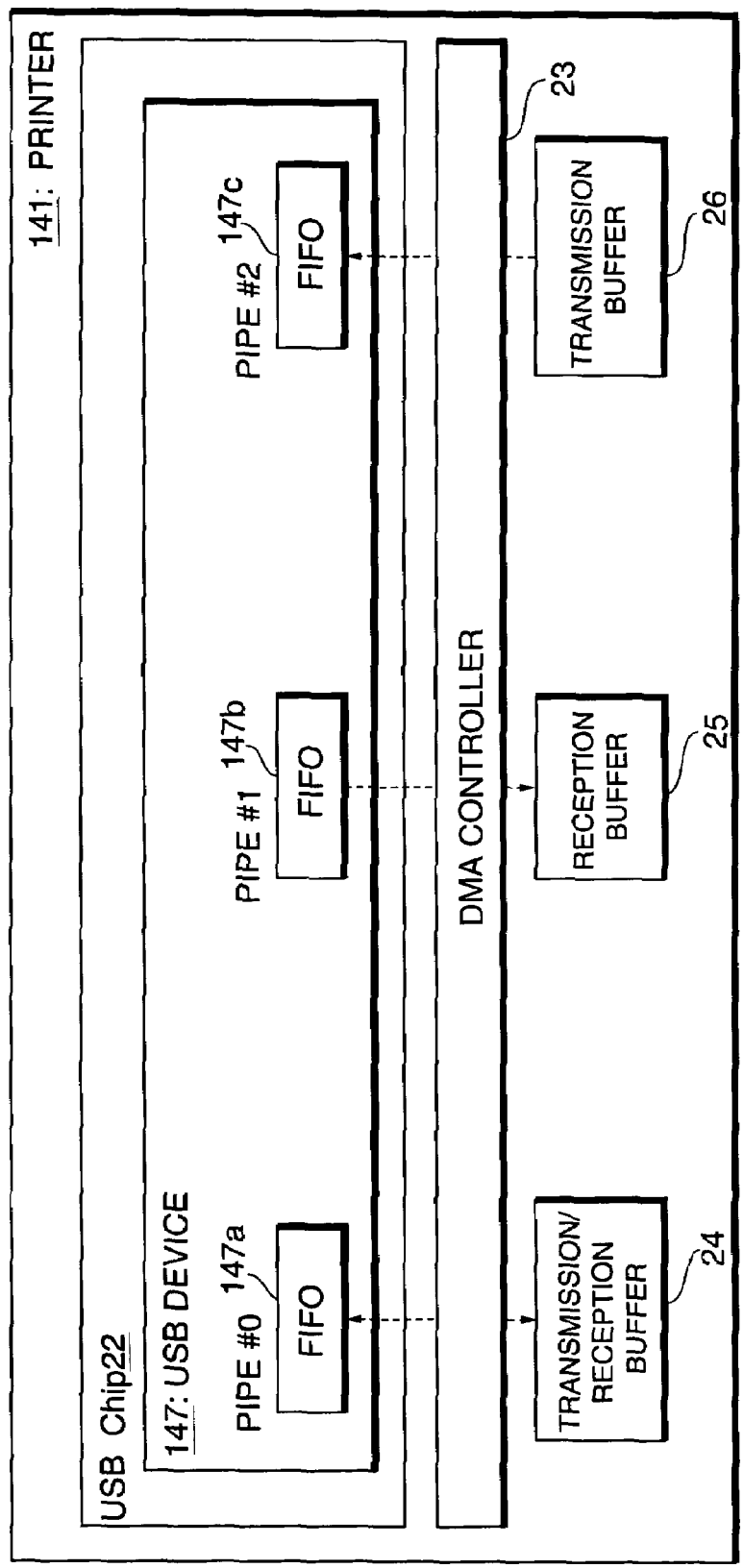
FIG. 41 is a diagram showing a structure of a USB chip in the fifth embodiment of the invention.

FIG. 41 is a diagram showing a structure of the USB chip in the fifth embodiment of the invention.

As shown in FIG. 41, the USB chip 22 on the printer 141 has only a USB device 147.

The USB device 147 has: an FIFO 147a as a queue for data storage associated with the transmission/reception buffer 24 for transmitting/receiving the data of the setup process 29; an FIFO 147b associated with the reception buffer 25 for receiving the data of the stream switching process 145; and an FIFO 147c associated with the transmission buffer 26 for transmitting the data of the stream switching process 145.

Subsequently, a construction of the port information 151 will be described.

Figure 42:
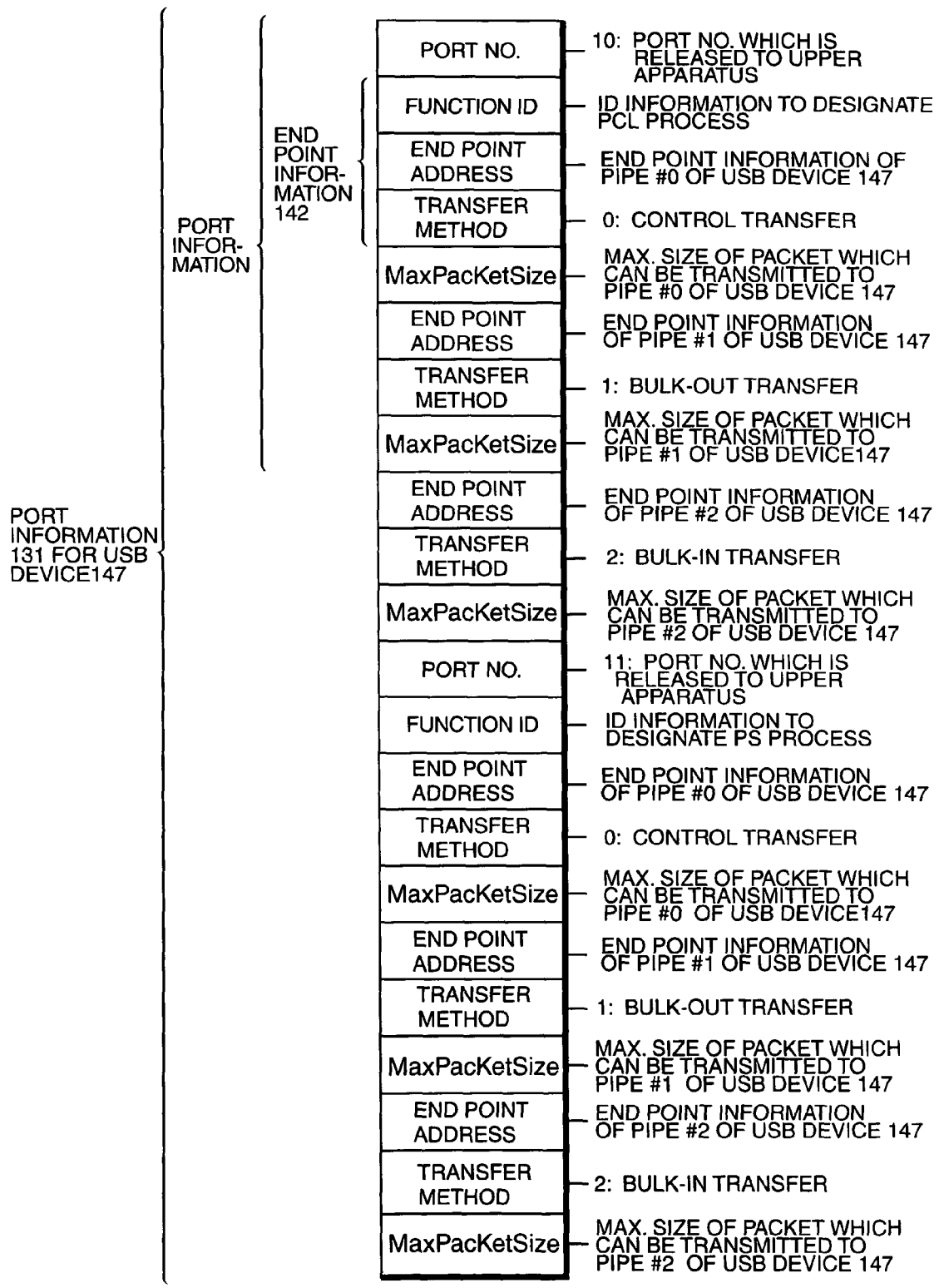
FIG. 42 is a diagram showing a construction of port information in the fifth embodiment of the invention.

FIG. 42 is a diagram showing the construction of the port information in the fifth embodiment of the invention.

As shown in FIG. 42, function ID information to designate the functions on the printer 141 is added to the port information 151 in the fourth embodiment every port information 151.

Subsequently, a construction of the USB descriptor information 143 in the printer 141 will be described.

Figure 43:
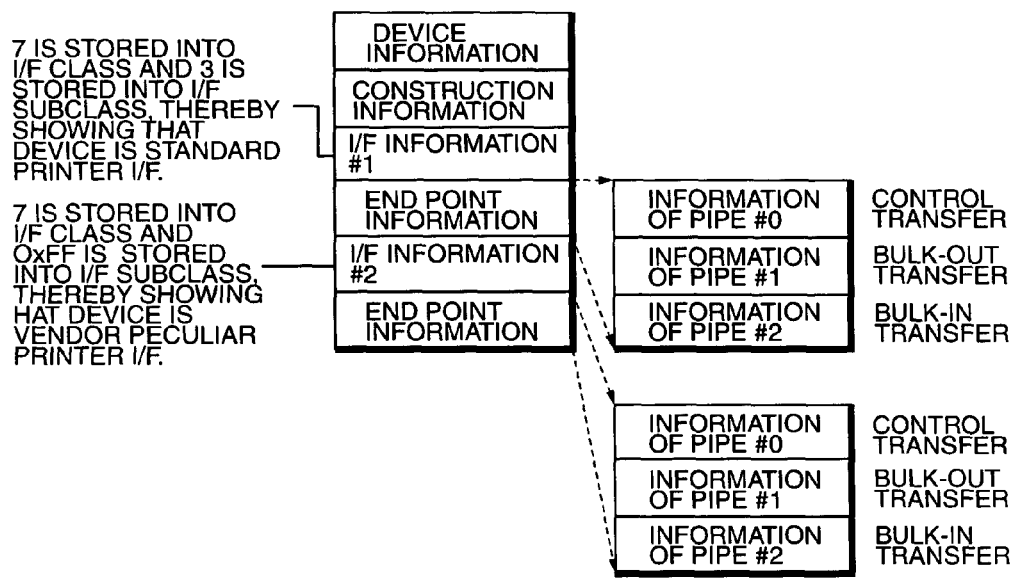
FIG. 43 is a diagram showing a construction of USB descriptor information in the fifth embodiment of the invention.

FIG. 43 is a diagram showing the construction of the USB descriptor information in the fifth embodiment of the invention.

As shown in FIG. 43, the USB descriptor information 143 is constructed by: as end point information, standard printer interface information #1 for supporting one control transfer, one bulk-out transfer, and one bulk-in transfer; and vendor peculiar interface information #2 for supporting one control transfer, one bulk-out transfer, and one bulk-in transfer.

The vendor peculiar interface sets device class information in the vendor peculiar interface information #2 into a printer class and stores 0xFF as vendor peculiar subclass information as a device subclass, thereby making the host 130 recognize it.

Subsequently, a construction of the vendor peculiar function information 144 will be described.

Figure 44:
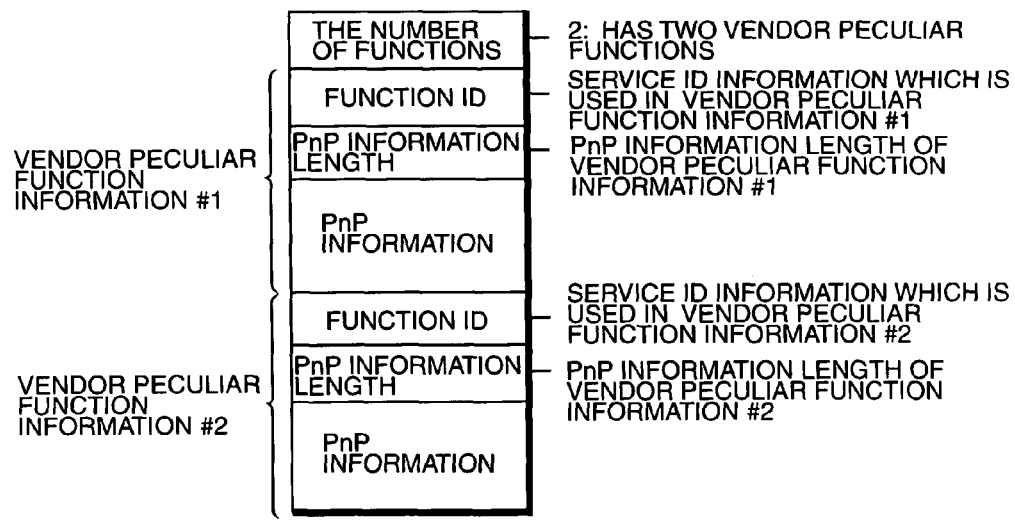
FIG. 44 is a diagram showing a construction of vendor peculiar function information in the fifth embodiment of the invention.

FIG. 44 is a diagram showing the construction of the vendor peculiar function information in the fifth embodiment of the invention.

As shown in FIG. 44, the vendor peculiar function information 144 is constructed by: the number of functions which are supported by the vendor; a function ID as ID information of the function information; a data length of PnP information in the function; and PnP character string information of the function.

In the embodiment, the information regarding the PCL printer is stored as function information #1 and the information regarding the PS printer is stored as function information #2.

Subsequently, a construction of the end point information 142 will be described.

Figure 45:
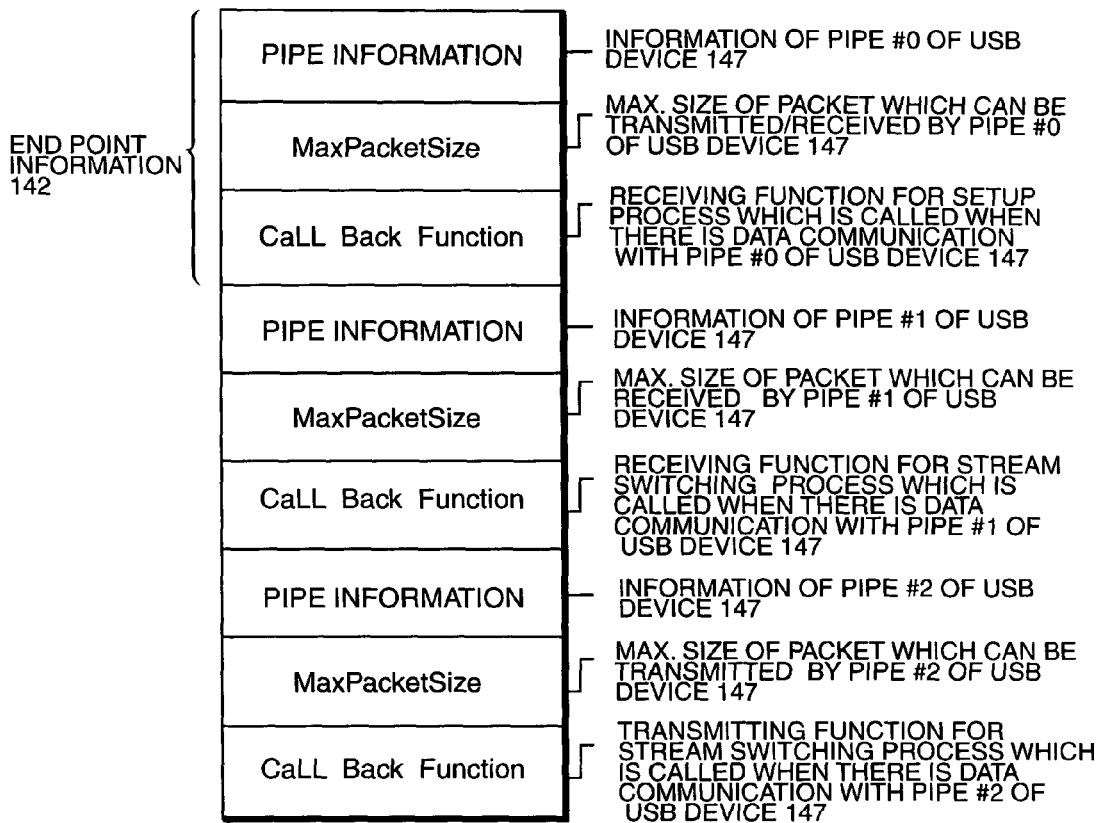
FIG. 45 is a diagram showing a construction of end point information in the fifth embodiment of the invention.

FIG. 45 is a diagram showing the construction of the end point information in the fifth embodiment of the invention.

As shown in FIG. 45, in the end point information 142, transmitting/receiving processes for the stream switching process 145 has been stored as "Call Back Function" information.

Subsequently, a construction of the switching information 146 will be described.

Figure 46:
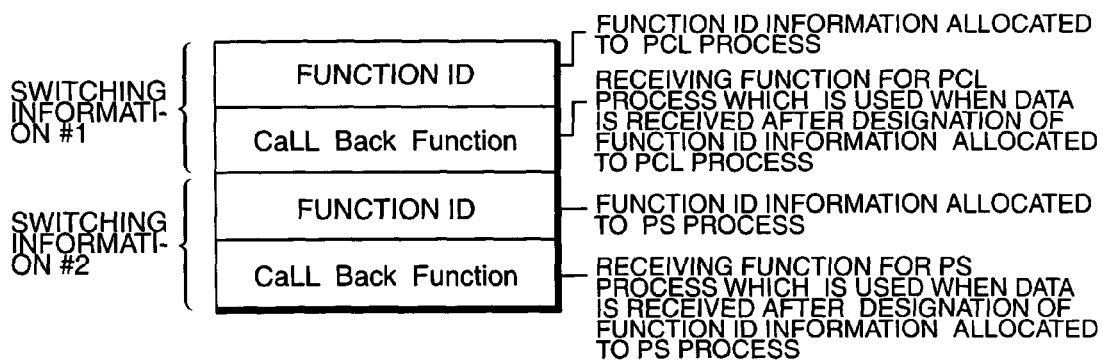
FIG. 46 is a diagram showing a construction of switching information in the fifth embodiment of the invention.

FIG. 46 is a diagram showing the construction of the switching information in the fifth embodiment of the invention.

As shown in FIG. 46, the switching information 146 is constructed by: a function ID allocated to the function existing on the printer 141; and "Call Back Function" as a function which is used to notify of the received data after the designation of the function ID. Data as many as the number of functions which are installed on the printer 141 is stored into the switching information 146.

Since the PnP information 115 in the fifth embodiment is similar to that in the third embodiment, it will be explained also with reference to FIG. 26.

Subsequently, the operation of the USB data transfer in the printer system with the above construction will be described.

Figure 47:
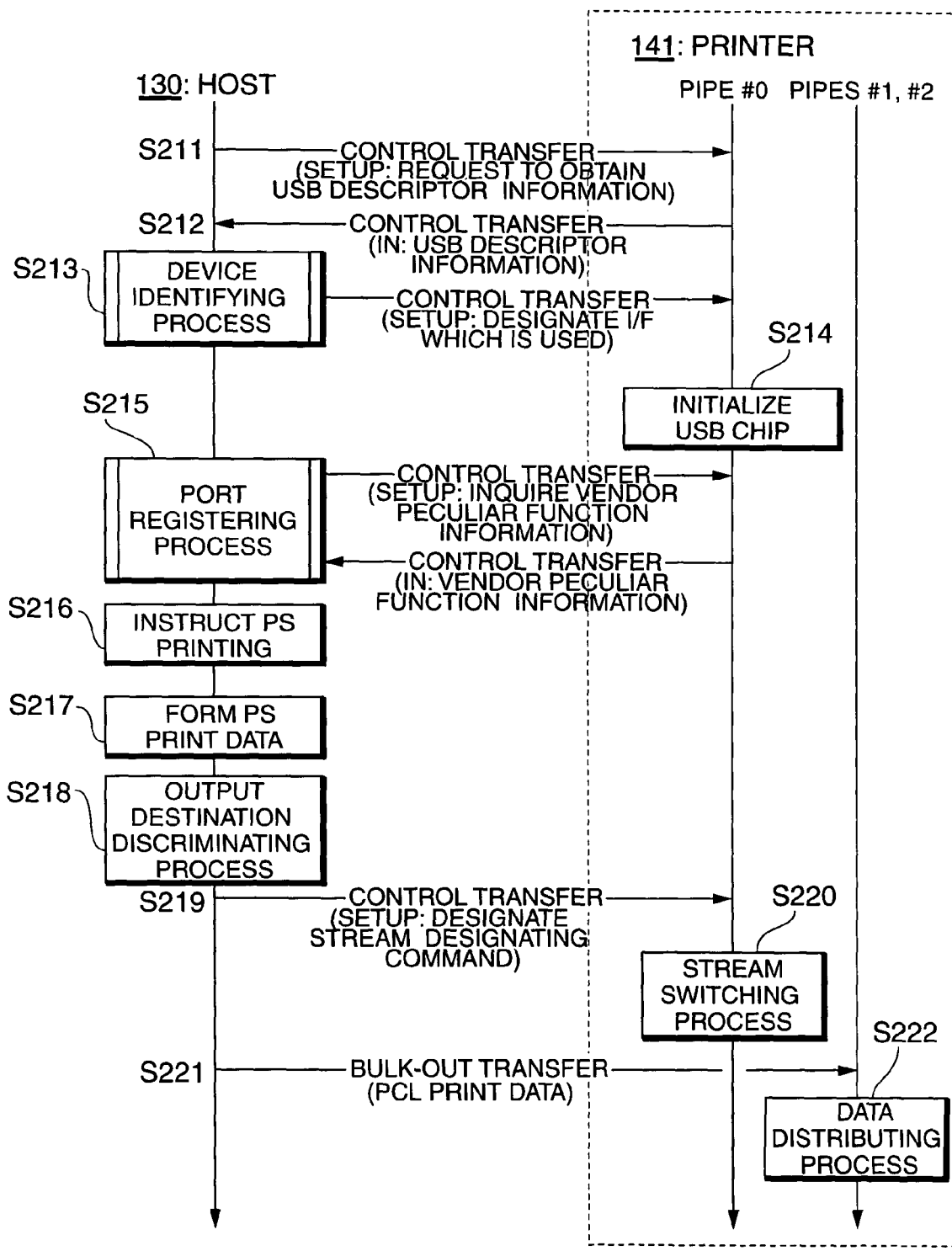
FIG. 47 is a flowchart showing the operation of USB data transfer in the printer system in the fifth embodiment of the invention.

FIG. 47 is a flowchart showing the operation of the USB data transfer in the printer system in the fifth embodiment of the invention. In the embodiment, explanation will be made on the assumption that the vendor peculiar interface is selected as a prerequisite.

First, when the bus reset is detected, the setup process 13 on the host 130 inquires of the USB device 147 about the USB descriptor information 143 by using the control transfer (step S211). Thus, in response to the inquiry about the USB descriptor information 143 from the host 130, the USB device 147 returns the USB descriptor information 143 to the host 130 by using the control transfer (step S212). The setup process 13 on the host 130 recognizes device information of the connected device and a supporting state of the transfer means by the obtained USB descriptor information 143, and if the vendor peculiar interface is supported, the setup process 13 notifies the printer 141 of the vendor peculiar interface ID information (step S213).

Subsequently, the setup process 29 on the printer 141 sets the USB device 147 by the notified interface ID information (step S214). The transfer control unit 14 obtains the vendor peculiar function information 144 from the printer 141 by using the control transfer and registers the port information 151. If the driver which coincides with the registered port information 151 does not exist, the user is notified that the new device has been detected (step S215). After that, the application 11 to which the printing has been instructed by the user instructs the PS printer driver 102 to print (step S216). The PS printer driver 102 to which the printing has been instructed forms the print data for the PS language and requires the transfer control unit 14 to transmit it (step S217). Further, a process for discriminating an output destination is executed (step S218). The transfer control unit 14 of which the transmission has been required transfers a stream designating command to the printer 141 by the control transfer when the application data transmitted before is not the PS data (step S219).

Subsequently, the setup process 29 which received the stream designating command changes stream selection information (step S220). The transfer control unit 14 notifies a pipe #1 of the USB device 147 of the print data by the bulk-out transfer (step S221). Further, the notified print data is sent to the stream switching process 145 by the transfer control unit 27 and notified to the relevant function of the data on the basis of the designated stream designation information (step S220) and a data distributing process is executed (step S222).

Subsequently, the operation of a host data transmitting process which is used in common when the host 130 transmits the data to the printer 141 will now be described.

Figure 48:
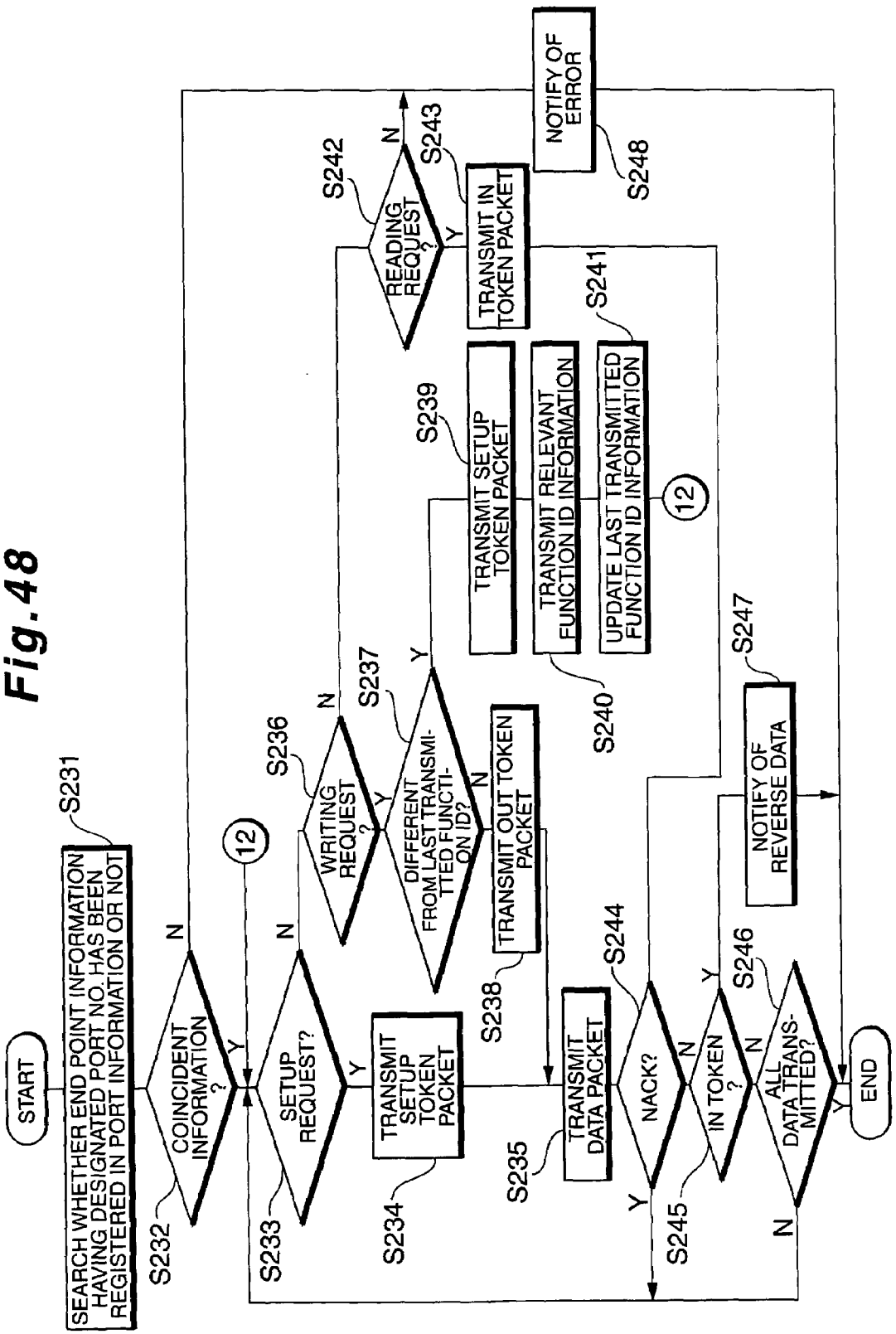
FIG. 48 is a flowchart showing the operation of a host data transmitting/receiving process in the fifth embodiment of the invention.

FIG. 48 is a flowchart showing the operation of the host data transmitting/receiving process in the fifth embodiment of the invention.

In this case, a process for discriminating whether the function ID information transmitted last is different from the function ID information of the data to be transmitted this time or not when there is a writing request is added. If the function ID information transmitted last is different from the function ID information of the data which is transmitted this time, a process for forming and transmitting a SETUP token packet as a process for transmitting the stream designating command by the control transfer is added. Further, a process for forming and transmitting a data packet for designating the relevant function ID information and a process for storing the function ID information which was transmitted last are added to the first embodiment.

First, when a request is made to the printer 141, the transfer control unit 14 searches whether the port which coincides with the number of the requested port has been registered in the port information 151 or not (step S231). Whether the port which coincides with the number of the requested port exists or not is discriminated (step S232). If the coincident port exists, whether the request to the printer 141 is the setup request or not is discriminated (step S233). If the coincident port does not exist, an error is notified (step S248) and the processing routine is finished.

Subsequently, the transfer control unit 14 discriminates whether the request to the printer 141 is the setup request or not (step S233). If it is the setup request, a SETUP token packet is formed and the transmission of it is requested (step S234). If it is not the setup request, whether the request to the printer 141 is the writing request or not is discriminated (step S236). If it is the writing request, whether the function ID information which was transmitted last and the function ID information of the data which is transmitted this time are different or not is discriminated (step S237). If the function ID information is not different, an OUT token packet is formed and the transmission of it is requested (step S238).

As mentioned above, whether the request to the printer 141 is the writing request or not is discriminated and if it is not the writing request, the transfer control unit 14 discriminates whether the request to the printer 141 is the reading request or not (step S242). If it is the reading request, an IN token packet is formed and the transmission of it is requested (step S243). If it is not the reading request, an error is notified of the process of which the reading has been requested (step S248) and the processing routine is finished.

As mentioned above, whether the function ID information which was transmitted last and the function ID information of the data which is transmitted this time are different or not is discriminated and if the function ID information is different, the transfer control unit 14 forms the SETUP token packet and requests the transmission of it (step S239). A data packet for designating the relevant function ID information is formed and transmitted (step S240). The function ID information which was transmitted last is stored (step S241). Whether the request to the printer 141 is the setup request or not is discriminated again (step S233).

As mentioned above, whether the request to the printer 141 is the setup request or not is discriminated and if it is the setup request, the transfer control unit 14 forms the SETUP token packet and requests the transmission of it (step S234). Subsequently, the transfer control unit 14 forms the data packet and requests the transmission of it (step S235). The transfer control unit 14 which requested the transmission discriminates whether the response from the printer 141 is NACK or not (step S244). If it is NACK, whether the request to the printer 141 is the setup request or not is discriminated (step S233). If the response is ACK, the transfer control unit 14 discriminates whether the request to the printer 141 is the IN token or not (step S245). If it is the IN token, reverse data is notified (step S247) and the processing routine is finished. If it is not the IN token, whether all data to be transferred has been transmitted or not is discriminated (step S246). If all the data has been transmitted, the processing routine is finished. If NO, whether the request to the printer 141 is the setup request or not is discriminated (step S233).

Subsequently, a subroutine of the port registering process in step S215 in FIG. 47 will be described.

Figure 49:
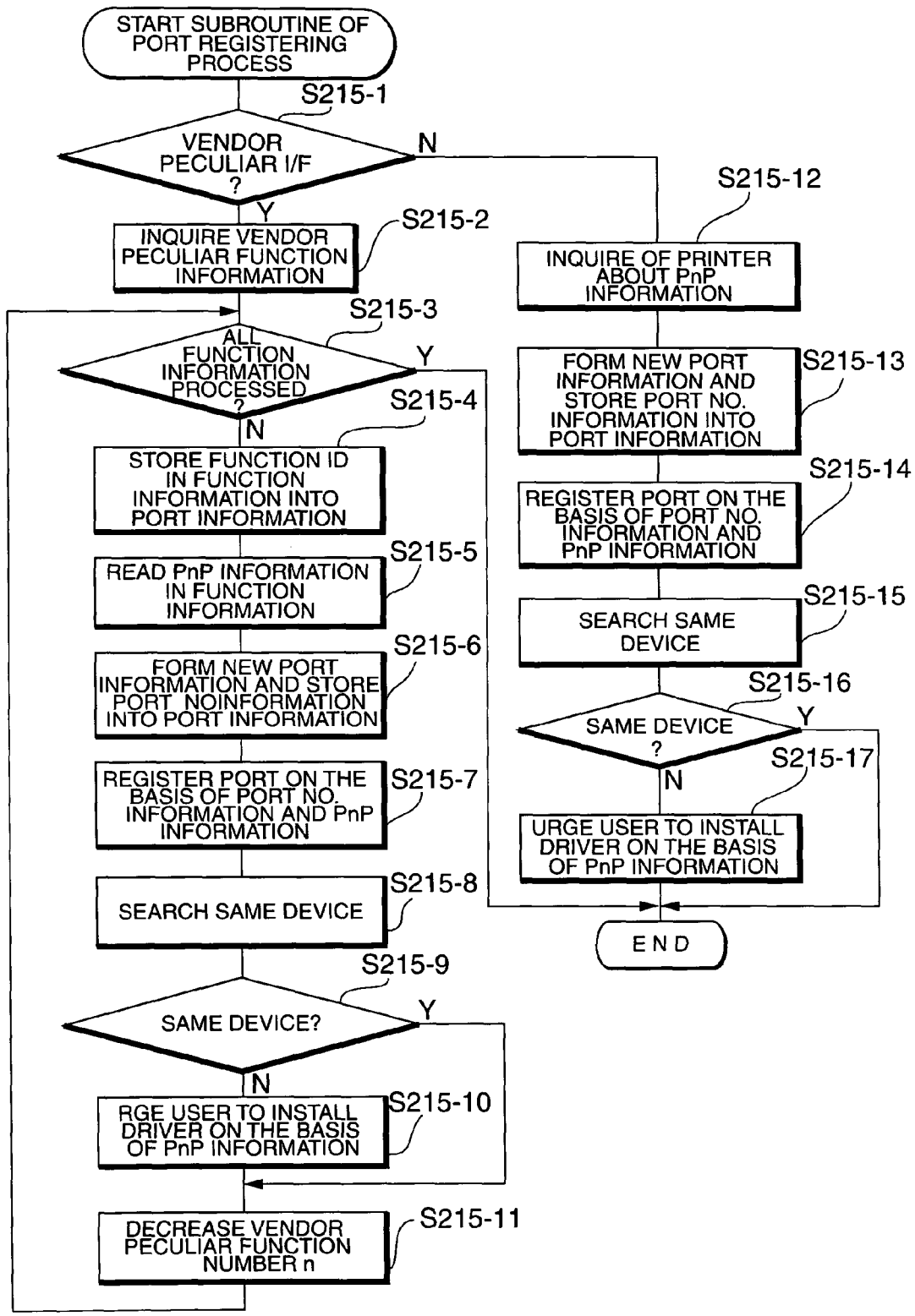
FIG. 49 is a flowchart showing a subroutine of a port registering process in the fifth embodiment of the invention.

FIG. 49 is a flowchart showing the subroutine of the port registering process in the fifth embodiment of the invention.

In this case, in the port registering process, a process for storing the function ID information from the vendor peculiar function information 144 of the printer 141 into the port information 151 is different from that in the fourth embodiment.

First, the transfer control unit 14 of the host 130 discriminates whether the vendor peculiar interface has been selected or not (step S215-1). If the vendor peculiar interface has been selected, the transfer control unit 14 inquires of the printer 141 about the vendor peculiar function information 144 (step S215-2). Whether the function information as many as the number of functions in the obtained vendor peculiar function information 144 has been processed or not is discriminated (step S215-3). If the function information as many as the number of functions has been processed, the processing routine is finished. If the function information as many as the number of functions are not processed, the function ID in the vendor peculiar function information 144 is stored into the port information 151 (step S215-4).

Subsequently, the transfer control unit 14 specifies the PnP information 115 of the function information #n in the vendor peculiar function information 144 (step S215-5). A new port is opened and its port number information is stored into the port information 151 (step S215-6). The port information 151 is registered on the basis of the specified PnP information 115 and the formed port number information (step S215-7). Further, the registered ports are searched to discriminate whether the same device information already exists or not (step S215-8).

Subsequently, the transfer control unit 14 discriminates whether the same device exists or not (step S215-9). If the same device exists, the count value of the vendor peculiar function number counter is decreased by "1" (step S215-11). If the same device does not exist, the message for urging the user to install the driver is displayed on the basis of the registered PnP information 115 (step S215-10). After that, the count value of the vendor peculiar function number counter is decreased by "1" (step S215-11). Whether the function information as many as the number of functions in the obtained vendor peculiar function information 144 has been processed or not is discriminated again (step S215-3).

As mentioned above, whether the vendor peculiar interface has been selected or not is discriminated and if the vendor peculiar interface is not selected, the printer 141 is inquired of about the PnP information 115, thereby obtaining the PnP information 115 (step S215-12). A new port is opened and its port number information is stored into the port information 151 (step S215-13). Further, the port information 151 is registered on the basis of the obtained PnP information 115 and the formed port number information (step S215-14). Whether the same device information already exists or not is discriminated (step S215-15).

Subsequently, the transfer control unit 14 discriminates whether the same device exists or not (step S215-16). If the same device exists, the processing routine is finished. If the same device does not exist, the message for urging the user to install the driver is displayed on the basis of the PnP information 115 (step S215-17). The processing routine is finished.

Subsequently, the operation of the receiving function "Call Back Function" for the setup process will be described.

Figure 50:
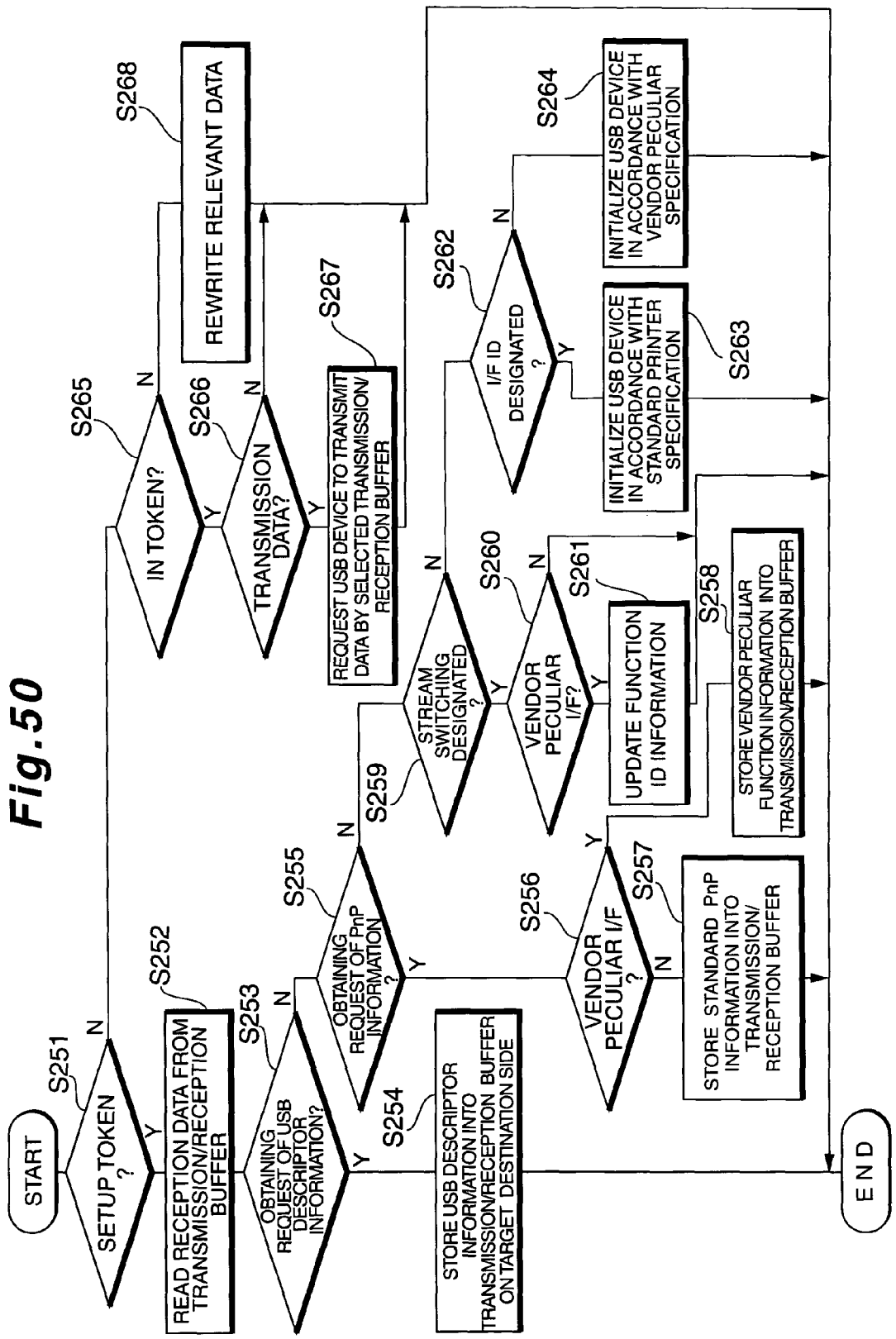
FIG. 50 is a flowchart showing the operation of a receiving function of a setup process in the fifth embodiment of the invention.

FIG. 50 is a flowchart showing the operation of the receiving function for the setup process in the fifth embodiment of the invention.

In this case, in the setup operation in the fifth embodiment, the following processes are different from those in the fourth embodiment: whether the command is a stream switching command as a vendor option command or not is discriminated, if it is the stream switching command, whether the interface set in the printer 141 at present is the vendor peculiar interface or not is discriminated, if it is the vendor peculiar interface, whether the function ID information notified by the host 130 exists in the switching information 146 or not is discriminated, and if the relevant function ID exists, the stream switching information is changed to the function ID notified by the host 130.

The setup process 13 which received the reception notification discriminates whether it is the SETUP token or not (step S251). If it is the SETUP token, the reception data is read out from the transmission/reception buffer 24 (step S252). Whether it is the obtaining request of the USB descriptor information 143 or not is discriminated (step S253). If it is the obtaining request of the USB descriptor information 143, the USB descriptor information 143 is stored into the transmission/reception buffer 24 on the target destination side (step S254) and the processing routine is finished.

If it is not the obtaining request of the USB descriptor information 143, whether it is the obtaining request of the PnP information 115 or not is discriminated (step S255). If it is the obtaining request of the PnP information 115, whether the set interface is the vendor peculiar interface or not is discriminated (step S256). If the set interface is not the vendor peculiar interface, the standard PnP information 115 is stored into the transmission/reception buffer 24 (step S257) and the processing routine is finished. If the set interface is the vendor peculiar interface, the vendor peculiar function information 144 is stored into the transmission/reception buffer 24 (step S258) and the processing routine is finished.

As mentioned above, whether the obtaining request is the obtaining request of the PnP information 115 or not is discriminated and if it is not the obtaining request of the PnP information 115, whether the command is the stream switching command or not is discriminated (step S259). If it is the stream switching command, whether the interface set in the printer 141 at present is the vendor peculiar interface or not is discriminated (step S260). If the set interface is the vendor peculiar interface, whether the function ID information notified by the host 130 exists in the switching information 146 or not is discriminated. If the relevant function ID exists, the stream switching information is changed to the function ID notified by the host 130 (step S261) and the processing routine is finished. If the set interface is not the vendor peculiar interface, that is, if it is the standard interface, the processing routine is finished.

As mentioned above, whether the command is the stream switching command or not is discriminated and if it is not the stream switching command, whether the interface ID has been designated or not is discriminated (step S262). If the interface ID has been designated, the USB device is initialized in accordance with the standard printer specification (step S263) and the processing routine is finished. If the interface ID is not designated, the USB device is initialized in accordance with the vendor peculiar specification (step S264) and the processing routine is finished.

As mentioned above, whether the reception notification is the SETUP token or not is discriminated and if it is not the SETUP token, the setup process 13 which received the reception notification discriminates whether it is the IN token or not (step S265). If it is not the IN token, the data is rewritten on the basis of the read-out data (step S268) and the processing routine is finished. If it is the IN token, whether the transmission data exists in the transmission/reception buffer 24 or not is discriminated (step S266). If there is no transmission data, the processing routine is finished. If the transmission data exists, the transmission data is read out from the relevant transmission/reception buffer 24 and the setup process 13 requests the USB device 147 to transmit the data (step S267) and the processing routine is finished.

Subsequently, a subroutine of the stream switching process in step S220 in FIG. 47 will be described.

Figure 51:
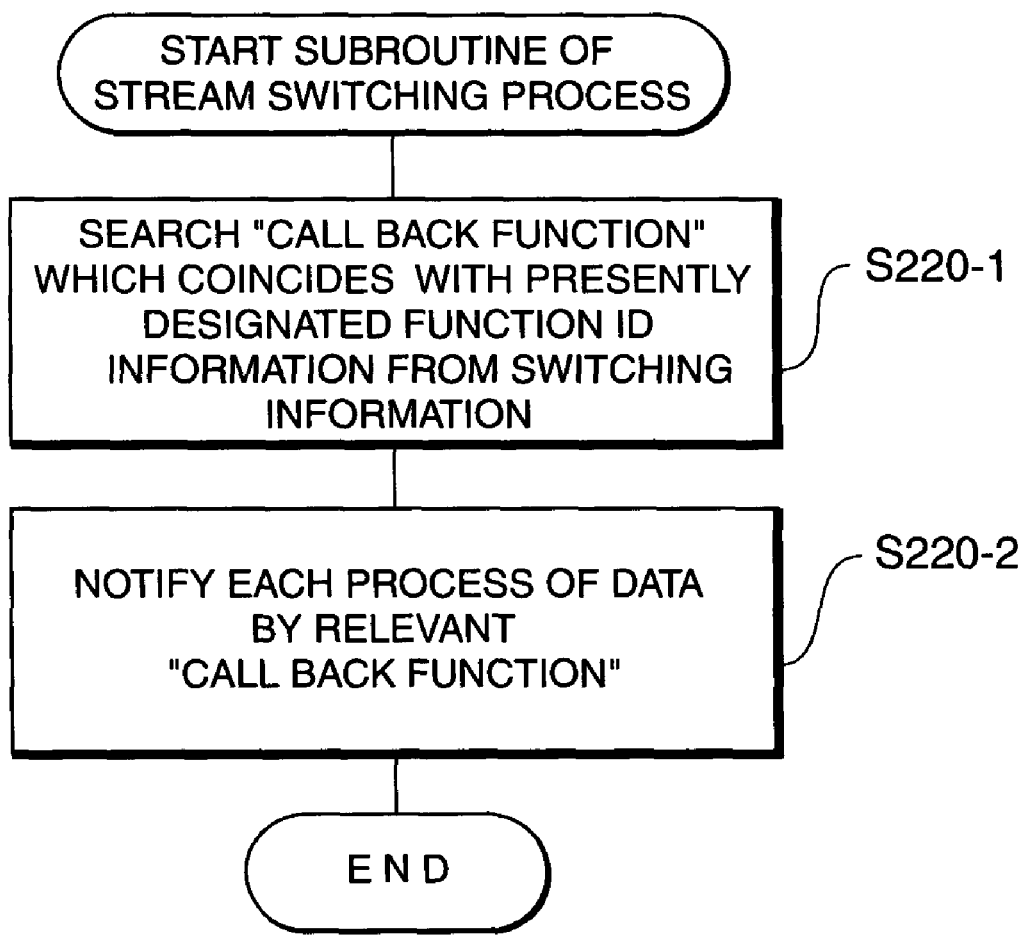
FIG. 51 is a flowchart showing a subroutine of a stream switching process in the fifth embodiment of the invention.

FIG. 51 is a flowchart showing the subroutine of the stream switching process in the fifth embodiment of the invention.

First, the transfer control unit 14 reads out the "Call Back Function" information which coincides with the function ID in the switching information 146 by using the set function ID information as a key (step S220-1). The transfer control unit 14 notifies the relevant function of the received data by using the searched "Call Back Function" (step S220-2) and the processing routine is finished.

Since a printer data receiving process which is used in common when the notified data is received from the host 120 is similar to that in the first embodiment, its explanation is omitted. Since a device identifying process is similar to that in the third embodiment, its explanation is omitted.

As mentioned above, since the functions of the first to fourth embodiments can be realized by the minimum construction of the USB chip in the fifth embodiment, the costs can be reduced.

Since the function can be added independent of the construction of the USB chip, expandability can be improved.

The invention is not limited to the foregoing embodiments but many modifications and variations are possible within the spirit and scope of the appended claims of the invention.

As described in detail above, according to the invention, there is provided the image forming system comprising: the host having the communication function unit; and the image forming apparatus having the first and second communication units and the relay unit, wherein the first communication unit communicates data with the communication function unit via the relay unit and the second communication unit communicates the data with the communication function unit via the relay unit.

In this case, even if a jam or the like occurs in the peripheral device and the printing process enters a busy state, the real-time status of the peripheral device can be obtained. The cancellation of the data which is being printed can be easily instructed.

What is claimed is:

1. An image forming system comprising an image forming apparatus which receives print data from a host apparatus and performs an image formation based on the print data,
the host apparatus comprising:
a general-purpose communication unit; and
a first setup processing section that performs a setup of the communication unit, and
the image forming apparatus comprising:
a first communication unit having a first port number;
a second communication unit having a second port number;
a relay unit;
a second setup processing section that performs a setup of the first communication unit and the second communication unit;
a first language processing section to process a first language; and
a second language processing section to process a second language;
wherein the host apparatus further comprises a first transfer control unit that obtains from the image forming apparatus first plug and play (PnP) information used for processing the first language by the first communication unit and second PnP information used for processing the second language by the second communication unit, and registers port number information that are contained in the first and the second PnP information and which correspond respectively to the first and the second communication units, the first transfer control unit, after registering the port number information, specifying a transfer destination of the print data and notifying the image forming apparatus of the destination of the print data, and
wherein the image forming apparatus further includes a second transfer control unit, the second transfer control unit transferring the print data formed in the first language to the first language processing section via the first communication unit; and transferring the print data formed in the second language to the second language processing section via the second communication unit.

2. The image forming system according to claim 1, wherein said image forming apparatus further comprises a function information communication unit which communicates function information of at least one of said first and second communication units via said relay unit, and wherein
said host obtains the function information from said function information communication unit via said relay unit by said communication function unit, discriminates whether said function information corresponds to the host or not, and if it does not correspond to the host, notifies of such a fact.

3. The image forming system according to claim 2, wherein when a function information obtaining request of at least one of said first and second communication units is received from said host, said function information communication unit communicates function information of a processing apparatus connected to the relevant communication unit via said relay unit.

4. The image forming system according to claim 1, wherein said relay unit and said host are connected by a set of I/F capable of receiving and transmitting.

5. The image forming system according to claim 4, wherein said relay unit and said host are connected by an I/F cable of a universal serial bus (USB).

6. An image forming apparatus which receives print data from a host apparatus having a general-purpose communication unit and which performs an image formation based on the print data, comprising:
a first communication unit that communicates with the general-purpose communication unit;
a second communication unit that communicates with the general-purpose communication unit;
a relay unit that performs a relay between the general-purpose communication unit and the first communication unit or the second communication unit;
a setup processing section that performs a setup of the first communication unit and the second communication unit;
a transfer control unit;
a first language processing section to process a first language; and
a second language processing section to process a second language;
wherein the first communication unit is notified of the print data using the first language from the host apparatus on the basis of port information contained in a first plug and play (PnP) information used for processing the first language in the first communication unit;
wherein the second communication unit is notified of the print data using a second language from the host apparatus on the basis of port information contained in a second PnP information used for processing the second language in the second communication unit; and
wherein the transfer control unit transfers the print data using the first language to the first language processing section via the first communication unit; and transfers the print data using the second language to the second language processing section via the second communication unit.

7. The image forming apparatus according to claim 6, further comprising:
a function information communication unit which communicates function information of at least one of said first and second communication units via said relay unit, wherein said host obtains the function information from said function information communication unit via said relay unit by said communication function unit, discriminates whether said function information corresponds to the host or not, and if it does not correspond to the host, notifies of such a fact.

8. The image forming apparatus according to claim 7, wherein when a function information obtaining request of at least one of said first and second communication units is received from said host, said function information communication unit communicates function information of a processing apparatus connected to the relevant communication unit via said relay unit.

9. The image forming apparatus according to claim 6, wherein said relay unit and said host are connected by a set of I/F capable of receiving and transmitting.

10. The image forming apparatus according to claim 9, wherein said relay unit and said host are connected by an I/F cable of USB.

11. The image forming system according to claim 1, wherein the image forming system further includes a first language processing unit that processes data received by the first communication unit as the first PDL, and a second language processing unit that processes data received by the second communication unit as the second PDL.

12. The image forming system according to claim 11, wherein the image forming system further includes a development processing unit that converts a display list processed by the first language processing unit and a display list processed by the second language processing unit into image data and sends the image data to an engine.

13. The image forming system according to claim 1, wherein the host further includes a first printer driver that converts an output of an application into the first PDL, and a second printer driver that converts the output of the application into the second PDL different from the first PDL.

14. The image forming system according to claim 1, wherein the image forming system further includes a first buffer that stores data received by the first communication unit in the first PDL, and a second buffer that stores data received by the second communication unit in the second PDL.

15. The image forming apparatus according to claim 6, further comprising:
   a first language processing unit that processes data received by the first communication unit as the first PDL; and
   a second language processing unit that processes data received by the second communication unit as the second PDL.

16. The image forming apparatus according to claim 15, further comprising:
   a development processing unit that converts a display list processed by the first language processing unit; and
   a display list processed by the second language processing unit into image data and sends the image data to an engine.

17. The image forming apparatus according to claim 6, wherein the host has a first printer driver that converts an output of an application into the first PDL, and a second printer driver that converts the output of the application into the second PDL different from the first PDL.

18. The image forming apparatus according to claim 6, further comprising:
   a first buffer that stores data received by the first communication unit in the first PDL; and
   a second buffer that stores data received by the second communication unit in the second PDL.

19. The image forming system according to claim 1, wherein the host apparatus further comprises:
   a first language printer driver that generates the print data using the first language and requests the first transfer control unit to transfer the generated print data using the first language; and
   a second language printer driver that generates the print data using the second language and requests the first transfer control unit to transfer the generated print data using the second language,
   wherein the first setup processing section of the host apparatus respectively decides interfaces and notifies the image forming apparatus of respective interface ID information, the second setup processing section of the image forming apparatus respectively setting the notified interface ID information to the first and the second communication units.

20. The image forming system according to claim 1, wherein the first transfer control unit notifies that a new device is detected when a driver corresponding to port information does not exist.

21. The image forming system according to claim 19, wherein the first transfer control unit notifies that a new device is detected when a driver corresponding to port information does not exist.

22. The image forming apparatus according to claim 6, wherein
   the second transfer control unit transfers the first PnP information to the host apparatus for using a first language printer driver that generates the print data using the first language and requests to transfer the generated print data using the first language in the host apparatus, transfers the second PnP information to the host apparatus for using a second language printer driver that generates the print data using the second language and requests to transfer the generated print data using the second language in the host apparatus, and receives interface ID information from the host apparatus; and
   the second setup processing section respectively sets the received interface ID information to the first and the second communication units.

* * * * *